United States Patent
Enomoto et al.

(10) Patent No.: US 10,457,117 B2
(45) Date of Patent: Oct. 29, 2019

(54) AIR CONDITIONER FOR VEHICLE

(71) Applicant: DENSO CORPORATION, Kariya, Aichi-pref. (JP)

(72) Inventors: Norihiko Enomoto, Kariya (JP); Nobuharu Kakehashi, Kariya (JP); Yoshiki Katoh, Kariya (JP); Kazutoshi Kuwayama, Kariya (JP); Masamichi Makihara, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 302 days.

(21) Appl. No.: 15/107,149

(22) PCT Filed: Nov. 28, 2014

(86) PCT No.: PCT/JP2014/005957
§ 371 (c)(1),
(2) Date: Jun. 22, 2016

(87) PCT Pub. No.: WO2015/097988
PCT Pub. Date: Jul. 2, 2015

(65) Prior Publication Data
US 2017/0028813 A1 Feb. 2, 2017

(30) Foreign Application Priority Data
Dec. 26, 2013 (JP) .................. 2013-268580

(51) Int. Cl.
*B60H 1/08* (2006.01)
*B60H 1/24* (2006.01)
*B60H 1/00* (2006.01)

(52) U.S. Cl.
CPC .......... *B60H 1/00899* (2013.01); *B60H 1/08* (2013.01); *B60H 1/24* (2013.01); *B60H 1/00278* (2013.01);
(Continued)

(58) Field of Classification Search
CPC ........ B60H 1/00899; B60H 1/24; B60H 1/08; B60H 2001/00307; B60H 1/00278; B60H 2001/00928
See application file for complete search history.

(56) References Cited

U.S. PATENT DOCUMENTS 9,649,909 B2 * 5/2017 Enomoto ................. B60K 6/22
2002/0014330 A1 2/2002 Guyonvarch
(Continued)

FOREIGN PATENT DOCUMENTS

| JP | 2000161722 A | 6/2000 |
|----|--------------|--------|
| JP | 2002096621 A | 4/2002 |

(Continued)

*Primary Examiner* — Nelson J Nieves
(74) *Attorney, Agent, or Firm* — Harness, Dickey & Pierce, P.L.C.

(57) ABSTRACT

An air conditioner for a vehicle including a pump that takes in and discharges a heat medium, a heat medium/air heat exchanger which regulates a temperature of ventilation air by conducting sensible-heat exchange between the ventilation air and the heat medium circulated by the pump, a heat transfer device having a passage through which the heat medium flows and conducts heat transfer with the heat medium, a compressor, a heat medium/refrigerant heat exchanger which regulates the temperature of the heat medium, and a controller which regulates a heat transfer amount with the heat medium in the heat transfer device or heat exchange capability of the heat medium/air heat exchanger such that a temperature of the ventilation air regulated by the heat medium/air heat exchanger approaches a target temperature.

21 Claims, 30 Drawing Sheets

(52) U.S. Cl.
CPC .............. *B60H 2001/00307* (2013.01); *B60H 2001/00928* (2013.01)

(56) References Cited

U.S. PATENT DOCUMENTS

| | | | |
|---|---|---|---|
| 2005/0039878 A1* | 2/2005 | Meyer | B60H 1/00878 165/42 |
| 2005/0138942 A1* | 6/2005 | Grimm | B60H 1/00885 62/180 |
| 2006/0032623 A1* | 2/2006 | Tsubone | B60H 1/00492 165/202 |
| 2010/0281901 A1* | 11/2010 | Kawase | B60H 1/00885 62/238.7 |
| 2011/0197611 A1* | 8/2011 | Hall | B60H 1/00378 62/238.7 |
| 2012/0037336 A1* | 2/2012 | Ishikawa | B60H 1/00314 165/51 |
| 2012/0037352 A1* | 2/2012 | Osaka | B60H 1/00021 165/202 |
| 2012/0222441 A1* | 9/2012 | Sawada | B60H 1/00392 62/238.1 |
| 2012/0255319 A1 | 10/2012 | Itoh et al. | |
| 2012/0291467 A1* | 11/2012 | Sasaki | B60H 1/3208 62/151 |
| 2013/0291577 A1* | 11/2013 | Miyakoshi | B60H 1/00392 62/151 |
| 2014/0144160 A1* | 5/2014 | Jackson | H01M 10/5004 62/62 |
| 2014/0338376 A1* | 11/2014 | Carpenter | B60L 1/003 62/115 |
| 2014/0374081 A1 | 12/2014 | Kakehashi et al. | |
| 2015/0000327 A1 | 1/2015 | Kakehashi et al. | |
| 2015/0159933 A1 | 6/2015 | Itoh et al. | |
| 2015/0298525 A1* | 10/2015 | Miyakoshi | F25B 49/005 62/160 |
| 2016/0109163 A1 | 4/2016 | Enomoto et al. | |

FOREIGN PATENT DOCUMENTS

| | | |
|---|---|---|
| JP | 2004050874 A | 2/2004 |
| JP | 2012225637 A | 11/2012 |
| JP | 2013230805 A | 11/2013 |
| JP | 2015123828 A | 7/2015 |

* cited by examiner

FIG. 30  ENGINE HEAT-ABSORPTION HEAT PUMP MODE

FIG. 31　ENGINE HEATING HEAT PUMP MODE

ENGINE HEAT-ABSORPTION HEAT PUMP MODE

ENGINE HEATING HEAT PUMP MODE

DIRECT ENGINE WASTE HEAT UTILIZATION MODE

AIR CONDITIONER FOR VEHICLE

CROSS REFERENCE TO RELATED APPLICATIONS

This application is a U.S. National Phase Application under 35 U.S.C. 371 of International Application No. PCT/JP2014/005957 filed on Nov. 28, 2014 and published in Japanese as WO 2015/097988 A1 on Jul. 2, 2015. This application is based on and claims the benefit of priority from Japanese Patent Application No. 2013-268580 filed on Dec. 26, 2013. The entire disclosures of all of the above applications are incorporated herein by reference.

This application is based on Japanese Patent Application No. 2013-268580 filed on Dec. 26, 2013, the contents of which are incorporated herein by reference in its entirety.

FIELD OF THE INVENTION

The present disclosure relates to an air conditioner used for a vehicle.

BACKGROUND ART

Conventionally, Patent Document 1 discloses a vehicle air conditioner that cools ventilation air blown into a vehicle interior using an evaporator and heats the air using a condenser.

The evaporator is a heat exchanger which exchanges heat between a low-pressure side refrigerant and ventilation air in a refrigeration cycle so as to evaporate the low-pressure side refrigerant and simultaneously cool the ventilation air. The condenser is a heat exchanger which exchanges heat between a high-pressure side refrigerant and ventilation air in the refrigeration cycle so as to condense the refrigerant and simultaneously heat the ventilation air.

In the related art, the refrigeration cycle is controlled in order to control air blown into the vehicle interior.

CITATION LIST

Patent Document

[Patent Document 1]
Japanese Unexamined Patent Application Publication No. 2012-225637

SUMMARY OF INVENTION

In the related art, the evaporator and the condenser exchange heat between the air blown into the vehicle interior and the refrigerant in the refrigeration cycle. Accordingly, when the refrigerant leaks to the evaporator or the condenser, it may also leak into the vehicle interior.

In addition, since an exterior heat exchanger which performs one of the condensation and evaporation of a refrigerant is conventionally disposed in the forefront of a vehicle, the exterior heat exchanger may be destroyed even in the event of slight collision in which the critical components (frames, drive mechanisms, motors, etc.) of a vehicle body are not damaged. For this reason, the repair cost of the exterior heat exchanger may be increased due to the refilling of the refrigerant, or the refrigerant having a high warming potential may be discharged to the atmosphere.

Accordingly, the present applicant has considered a vehicle air conditioner (hereinafter, referred to as "consideration example") in which an evaporator and a condenser exchange heat between refrigerant and coolant in a refrigeration cycle, an air-cooling heat exchanger exchanges sensible heat between coolant cooled by the evaporator and ventilation air into a vehicle interior so as to cool the ventilation air, and an air-heating heat exchanger exchanges sensible heat between coolant heated by the condenser and ventilation air into the vehicle interior so as to heat the ventilation air.

According to the consideration example, since the heat exchange with ventilation air into the vehicle interior is not performed by the evaporator and the condenser, it is possible to prevent the refrigerant from leaking into the vehicle interior even though the refrigerant leaks to the evaporator or the condenser, it may also leak into the vehicle interior. In addition, since the exterior heat exchanger disposed in the forefront of the vehicle is replaced with a heat exchanger through coolant circulation, the refrigerant is not discharged in the event of slight collision, and it is possible to restrict and reduce repair costs and prevent environmental destruction.

However, the consideration example is markedly different from the related art in terms of system configurations. Therefore, even when the control of refrigeration cycle is performed similarly to the related art, it is impossible to properly control the temperature of air blown into the vehicle interior.

In addition, it is necessary to properly control the surface temperature of the air-cooling heat exchanger in the consideration example. That is, when the surface temperature of the air-cooling heat exchanger is below the freezing point, condensate adhered to the surface of the air-cooling heat exchanger is frozen and frost formation (frost) occurs. As a result, the air passage of the air-cooling heat exchanger is blocked so that an air flow rate is decreased, and air-conditioning performance is decreased. Meanwhile, when the temperature of the air-heating heat exchanger exceeds a predetermined temperature, condensate adhered to the surface of the air-heating heat exchanger is evaporated and the humidity of air blown into the vehicle interior is increased. As a result, window fog is brought, or odors are generated due to the mixture of steam with fungi and particles dissolved in the condensate, thereby deteriorating the comfort of occupants.

The present disclosure has been made in view of the above matters, and an object thereof is to provide a vehicle air conditioner for exchanging heat with ventilation air into a vehicle interior, capable of properly controlling a temperature of a heat exchanger which exchanges heat with the ventilation air into the vehicle interior.

An air conditioner for a vehicle according to an aspect of the present disclosure includes: a pump configured to take in and discharge a heat medium; a first heat medium/air heat exchanger that regulates a temperature of ventilation air blown into a vehicle interior by conducting sensible-heat exchange between the ventilation air and the heat medium circulated by the pump; a first heat transfer device having a passage through which the heat medium flows and configured to conduct heat transfer with the heat medium circulated by the pump; a heat medium temperature regulator that regulates the temperature of the heat medium circulated by the pump; and a heat exchanger regulator that regulates a heat transfer amount with the heat medium in the first heat transfer device or heat exchange capability of the first heat medium/air heat exchanger such that a temperature associated with a temperature of the ventilation air regulated by the first heat medium/air heat exchanger approaches a first target temperature.

According to the structure, the temperature of the first heat medium/air heat exchanger may be properly controlled.

An air conditioner for a vehicle according to a second aspect of the present disclosure includes: a first pump and a second pump disposed to take in and discharge a heat medium; a first heat medium/air heat exchanger regulating a temperature of ventilation air blown into a vehicle interior space by conducting sensible-heat exchange between the ventilation air and the heat medium circulated by one pump of the first pump and the second pump; a first heat transfer device having a passage through which the heat medium flows and disposed to conduct heat transfer with the heat medium circulated by the one pump; a second heat transfer device having a passage through which the heat medium flows and disposed to conduct heat transfer with the heat medium circulated by the other pump of the first pump and the second pump; a compressor disposed to take in and discharge a refrigerant; a heat medium-heating heat exchanger disposed to heat the heat medium by conducting heat exchange between the refrigerant discharged by the compressor and the heat medium circulated by the second pump; a decompression device decompressing and expanding the refrigerant flowing out of the heat medium-heating heat exchanger; a heat medium-cooling heat exchanger disposed to cool the heat medium by conducting heat exchange between the refrigerant decompressed and expanded in the decompression device and the heat medium circulated by the first pump; and a heat exchanger regulator that regulates a heat transfer amount with the heat medium in the second heat transfer device such that a temperature associated with a temperature of the ventilation air regulated by the first heat medium/air heat exchanger approaches a first target temperature.

According to the structure, the temperature of the first heat medium/air heat exchanger may be properly controlled.

In the present disclosure, the temperature associated with the temperature of ventilation air regulated by the first heat medium/air heat exchanger refers to a temperature itself of ventilation air regulated by the first heat medium/air heat exchanger, or a temperature associated with the surface temperature of the first heat medium/air heat exchanger, a temperature associated with the temperature of the heat medium flowing in the first heat medium/air heat exchanger, or the like.

DESCRIPTION OF EMBODIMENTS

Figure 1:
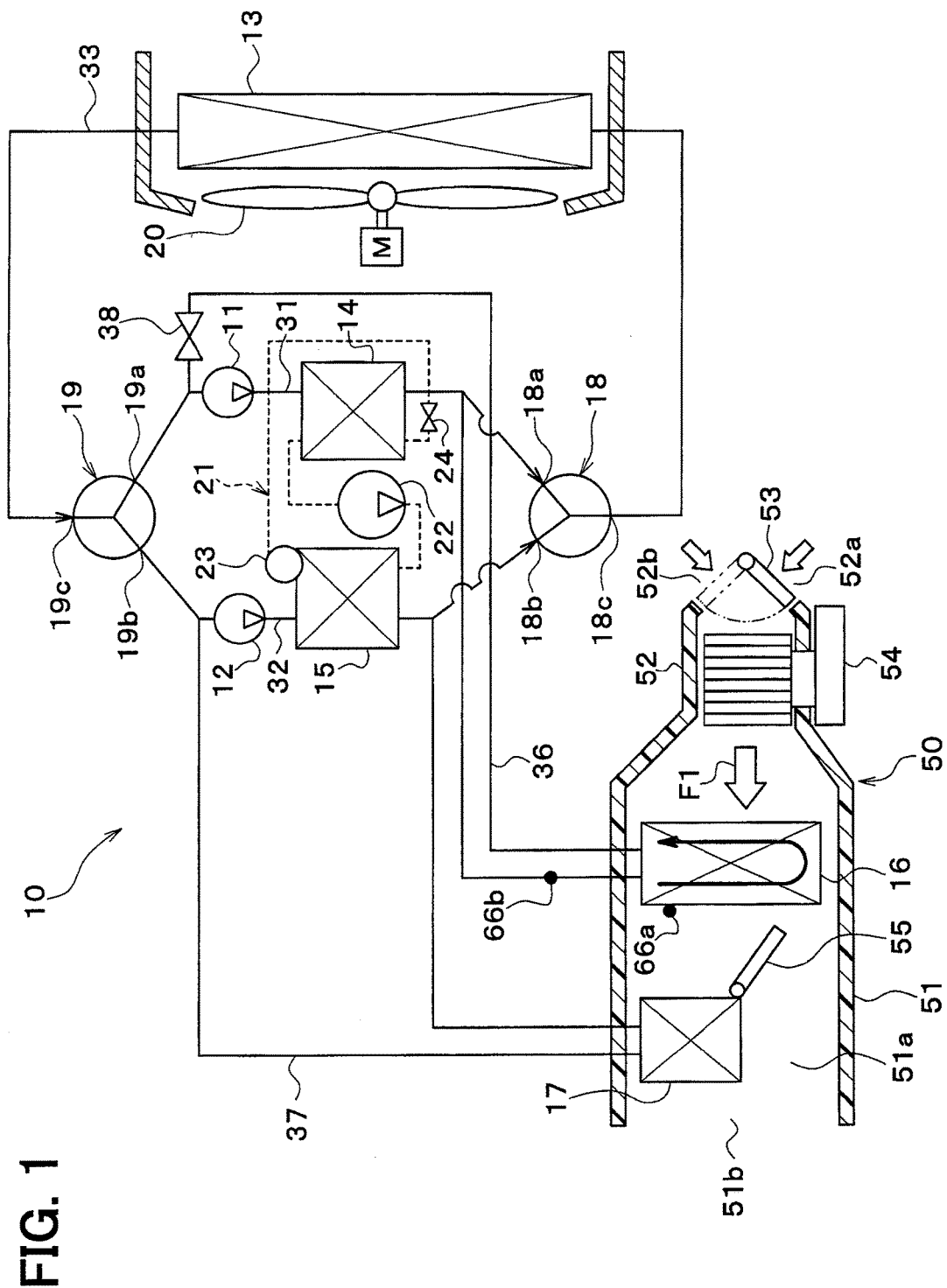
FIG. 1 is a diagram illustrating an overall configuration of a vehicle thermal management system according to a first embodiment.

Exemplary embodiments of the present disclosure will be described below with reference to the drawings. Throughout the disclosure, like reference numerals refer to like parts throughout the various drawings and embodiments of the present disclosure.

[First Embodiment]

A vehicle thermal management system 10 illustrated in FIG. 1 is used to properly regulate the temperatures of a variety of devices included in a vehicle and a vehicle interior. In the embodiment, the thermal management system 10 is applied to a hybrid vehicle which obtains driving force for vehicle traveling from an engine (internal combustion engine) and a traveling electric motor.

The hybrid vehicle of the embodiment is a plug-in hybrid vehicle in which electric power supplied from an external power source (commercial power source) may be charged to a battery mounted in the vehicle (in-vehicle battery) when the vehicle is stopped. A lithium-ion battery may be used as an example of the battery.

The driving force output from the engine is used to drive the vehicle and to operate a generator. The electric power generated by the generator and the electric power supplied from the external power source may be stored in the battery. The electric power stored in the battery is supplied to a variety of in-vehicle devices including electric components constituting the thermal management system 10, as well as the traveling electric motor.

As illustrated in FIG. 1, the thermal management system 10 includes a first pump 11, a second pump 12, a radiator 13, a coolant/cooler 14, a coolant/heater 15, a cooler core 16, a heater core 17, a first switching valve 18, and a second switching valve 19.

Each of the first and second pumps 11 and 12 is an electric pump which introduces and discharges coolant (heat medium). The coolant is a fluid as heat medium. In the embodiment, a liquid, which at least includes ethylene glycol, dimethyl polysiloxane, or nano-fluid, or an anti-freezing liquid is used as the coolant.

Each of the radiator 13, the coolant/cooler 14, the coolant/heater 15, the cooler core 16, and the heater core 17 is a coolant circulation device (heat medium circulation device) in which coolant is circulated.

The radiator 13 is a coolant/outside air heat exchanger (heat medium/outside air heat exchanger) which exchanges heat (sensible heat) between coolant and vehicle exterior air (hereinafter, referred to as "outside air"). Heat may be radiated from coolant to outside air when the coolant having a temperature equal to or greater than the temperature of the outside air flows in the radiator 13. Heat may be absorbed from outside air to coolant when the coolant having a temperature equal to or less than the temperature of the outside air flows in the radiator 13. In other words, the radiator 13 may exhibit a function as a heat radiator which radiates heat from coolant to outside air, and a function as a heat sink which absorbs heat from outside air to coolant.

The radiator 13 has a passage in which coolant is circulated, and is a heat transfer device which transfers heat between the same and coolant having a temperature regulated by the coolant/cooler 14 or the coolant/heater 15.

An exterior blower 20 is an electric blower (outside air blower) which blows outside air to the radiator 13. The radiator 13 and the exterior blower 20 are disposed in the forefront of the vehicle. Accordingly, when the vehicle travels, the radiator 13 may strike traveling wind.

Each of the coolant/cooler 14 and the coolant/heater 15 is a coolant temperature regulation heat exchanger (heat medium temperature regulation heat exchanger) which regulates the coolant temperature through heat exchange with the coolant. The coolant/cooler 14 is a coolant-cooling heat exchanger (heat medium-cooling heat exchanger) which cools coolant. The coolant/heater 15 is a coolant-heating heat exchanger (heat medium-heating heat exchanger) which heats coolant.

The coolant/cooler 14 is a low-pressure side heat exchanger (heat medium heat sink) which exchanges heat between coolant and a low-pressure side refrigerant in a refrigeration cycle 21 to absorb heat from the coolant to the low-pressure side refrigerant. The coolant/cooler 14 constitutes an evaporator of the refrigeration cycle 21.

The refrigeration cycle 21 is a vapor compression type refrigerator which includes a compressor 22, a coolant/heater 15, a receiver 23, an expansion valve 24, and a coolant/cooler 14. The refrigeration cycle 21 of the embodiment uses an HFC refrigerant as the refrigerant and constitutes a subcritical refrigeration cycle in which a high-pressure side refrigerant pressure does not exceed the critical pressure.

The compressor 22 is an electric compressor which is driven by the electric power supplied from the battery, and introduces, compresses, and discharges the refrigerant in the refrigeration cycle 21. The coolant/heater 15 is a condenser which exchanges heat between the high-pressure side refrigerant discharged from the compressor 22 and coolant to condense the high-pressure side refrigerant (to change sensible heat).

The receiver 23 is a gas-liquid separator which separates the two-phase gas-liquid refrigerant flowing out of the coolant/heater 15 into a gas-phase refrigerant and a liquid-phase refrigerant, and discharges the separated liquid-phase refrigerant to the expansion valve 24. The expansion valve 24 is a decompression device which decompresses and expands the liquid-phase refrigerant flowing out of the receiver 23.

The coolant/cooler 14 is an evaporator which exchanges heat between the low-pressure refrigerant decompressed and expanded by the expansion valve 24 and coolant to evaporate the low-pressure refrigerant (to change sensible heat). The gas-phase refrigerant evaporated by the coolant/cooler 14 is introduced into and compressed in the compressor 22.

The radiator 13 cools coolant using outside air, whereas the coolant/cooler 14 cools coolant using the low-pressure refrigerant in the refrigeration cycle 21. Therefore, the coolant cooled by the coolant/cooler 14 may have a lower temperature than the coolant cooled by the radiator 13. Specifically, the radiator 13 may not cool the coolant to a lower temperature than the temperature of outside air, whereas the coolant/cooler 14 may cool the coolant to a lower temperature than the temperature of outside air.

Each of the cooler core 16 and the heater core 17 is a heat medium/air heat exchanger which exchanges heat between coolant having a temperature regulated by the coolant/cooler 14 and the coolant/heater 15 and ventilation air into the vehicle interior so as to regulate the temperature of the ventilation air.

The cooler core 16 is an air-cooling heat exchanger which exchanges heat (sensible heat) between coolant and ventilation air into the vehicle interior to cool the ventilation air into the vehicle interior. The heater core 17 is an air-heating heat exchanger which exchanges heat (sensible heat) between coolant and ventilation air into the vehicle interior to heat the ventilation air into the vehicle interior.

The first pump 11 is disposed in a first pump passage 31. The coolant/cooler 14 is disposed at the discharge side of the first pump 11 in the first pump passage 31.

The second pump 12 is disposed in a second pump passage 32. The coolant/heater 15 is disposed at the discharge side of the second pump 12 in the second pump passage 32.

The radiator 13 is disposed in a radiator passage 33. The cooler core 16 is disposed in a cooler core passage 36. The heater core 17 is disposed in a heater core passage 37.

The first and second pump passages 31 and 32 and the radiator passage 33 are connected to the first and second switching valves 18 and 19. Each of the first and second switching valves 18 and 19 is a switching part to switch the flow of coolant.

The first switching valve 18 has first and second inlets 18a and 18b as the inlets for coolant, and has a first outlet 18c as the outlet for coolant. The second switching valve 19 has first and second outlets 19a and 19b as the outlets for coolant, and has a first inlet 19c as the inlet for coolant.

One end of the first pump passage 31 is connected to the first inlet 18a of the first switching valve 18. In other words, the coolant outlet side of the coolant/cooler 14 is connected to the first inlet 18a of the first switching valve 18.

One end of the second pump passage 32 is connected to the second inlet 18b of the first switching valve 18. In other words, the coolant outlet side of the coolant/heater 15 is connected to the second inlet 18b of the first switching valve 18.

One end of the radiator passage 33 is connected to the first outlet 18c of the first switching valve 18. In other words, the coolant inlet side of the radiator 13 is connected to the first outlet 18c of the first switching valve 18.

The other end of the first pump passage 31 is connected to the first outlet 19a of the second switching valve 19. In other words, the coolant suction side of the first pump 11 is connected to the first outlet 19a of the second switching valve 19.

The other end of the second pump passage 32 is connected to the second outlet 19b of the second switching valve 19. In other words, the coolant suction side of the second pump 12 is connected to the second outlet 19b of the second switching valve 19.

The other end of the radiator passage 33 is connected to the first inlet 19c of the second switching valve 19. In other words, the coolant outlet side of the radiator 13 is connected to the first inlet 19c of the second switching valve 19.

The first and second switching valves 18 and 19 have a structure that may arbitrarily or selectively switch communication states between the respective inlets and the respective outlets.

Specifically, the first switching valve 18 switches a state in which the coolant discharged from the first pump 11 flows into the radiator 13, a state in which the coolant discharged from the second pump 12 flows into the radiator 13, and a state in which the coolant discharged from the first pump 11 and the coolant discharged from the second pump 12 do not flow into the radiator 13.

The second switching valve 19 switches a state in which the coolant flows from the radiator 13 to the first pump 11, a state in which the coolant flows from the radiator 13 to the second pump 12, and a state in which the coolant does not flow from the radiator 13 to the first and second pumps 11 and 12.

Each opening degree of the first and second switching valves 18 and 19 is adjustable. Thus, it is possible to adjust the amount of coolant flowing in the radiator 13.

The first and second switching valves 18 and 19 mix the coolant discharged from the first pump 11 and the coolant discharged from the second pump 12 at any flow rate so that the mixed coolant may flow into the radiator 13.

One end of the cooler core passage 36 is connected to a portion of the coolant suction side of the first pump 11 in the first pump passage 31. The other end of the cooler core passage 36 is connected to a portion of the coolant outlet side of the coolant/cooler 14 in the first pump passage 31.

An on-off valve 38 is disposed in the cooler core passage 36. The on-off valve 38 is a passage opening/closing part which opens and closes the cooler core passage 36.

One end of the heater core passage 37 is connected to a portion of the coolant suction side of the second pump 12 in the second pump passage 32. The other end of the heater core passage 37 is connected to a portion of the coolant outlet side of the coolant/heater 15 in the second pump passage 32.

The cooler core 16 and the heater core 17 are accommodated in a case 51 of an interior air-conditioning unit 50 of a vehicle air conditioner.

The case 51 forms an air passage of ventilation air blown into the vehicle interior, and has a certain degree of elasticity, and is made of resin (e.g. polypropylene) having high strength.

An inside/outside air switching box 52 is disposed at the uppermost stream side of air flow in the case 51. The inside/outside air switching box 52 is an inside/outside air introduction part which switches and introduces inside air (vehicle interior air) and outside air (vehicle exterior air).

The inside/outside air switching box 52 has an inside air suction port 52a for introducing inside air into the case 51, and an outside air suction port 52b for introducing outside air into the case 51. An inside/outside air switching door 53 is disposed in the inside/outside air switching box 52.

The inside/outside air switching door 53 is an air volume ratio changing part which changes a ratio of air volume between the volumes of inside air and outside air introduced into the case 51. Specifically, the inside/outside air switching door 53 continuously adjusts the opening areas of the inside and outside air suction ports 52a and 52b, and changes a ratio of air volume between the volume of inside air and the volume of outside air. The inside/outside air switching door 53 is driven by an electric actuator (not shown).

An interior blower 54 is disposed downstream of the inside/outside air switching box 52 in the air flow direction. The interior blower 54 is a blower which blows the air (inside air and outside air) introduced through the inside/outside air switching box 52 toward the vehicle interior. The interior blower 54 is an electric blower which drives a centrifugal multi-blade fan (sirocco fan) using an electric motor.

In the case 51, the cooler core 16 and heater core 17 are disposed downstream of the interior blower 54 in the air flow direction.

In the case 51, a heater core bypass passage 51a is formed downstream of the cooler core 16 in the air flow direction. The heater core bypass passage 51a is an air passage in which the air passing through the cooler core 16 flows without passing through the heater core 17.

In the case 51, an air mix door 55 is disposed between the cooler core 16 and the heater core 17.

The air mix door 55 is an air volume ratio adjustment part which continuously changes a ration of air volume between the air flowing into the heater core 17 and the air flowing into the heater core bypass passage 51a. The air mix door 55 is a rotatable plate door, a slidable door, or the like, and is driven by an electric actuator (not shown).

By the ratio of air volume between the air passing through the heater core 17 and the air passing through the heater core bypass passage 51, the temperature of blowout air blown into the vehicle interior is changed. Accordingly, the air mix door 55 is a temperature regulation part which regulates the temperature of blowout air blown into the vehicle interior.

Air outlets 51b for blowing ventilation air into the vehicle interior which is a space to be air-conditioned are disposed at the lowermost stream side of air flow in the case 51. Specifically, the air outlets 51b include a defroster air outlet, a face air outlet, and a foot air outlet.

The defroster air outlet allows the conditioned air to be blown toward the inside surface of a vehicle front window glass. The face air outlet allows the conditioned air to be blown toward an occupant's upper half body. The foot air outlet allows the conditioned air to be blown toward an occupant's feet.

An air outlet mode door (not shown) is disposed upstream of the air outlet 51b in the air flow direction. The air outlet mode door is an air outlet mode switching part which switches air outlet modes. The air outlet mode door is driven by an electric actuator (not shown).

For example, the air outlet modes switched by the air outlet mode door include a face mode, a bi-level mode, a foot mode, and a foot/defroster mode.

The face mode is an air outlet mode in which the face air outlet is fully opened so that air is blown from the face air outlet toward an occupant's upper half body in the vehicle interior. The bi-level mode is an air outlet mode in which both of the face air outlet and the foot air outlet are opened so that air is blown toward an occupant's upper half body and feet in the vehicle interior.

The foot mode is an air outlet mode in which the foot air outlet is fully opened and the defroster air outlet is slightly opened so that air is blown mainly from the foot air outlet. The foot/defroster mode is an air outlet mode in which the foot air outlet and the defroster air outlet are equally opened so that air is blown from both of the foot air outlet and the defroster air outlet.

The first and second switching valves 18 and 19 will be described in detail with reference to FIGS. 2 to 7. The first and second switching valves 18 and 19 basically have the same structure, but differ from each other in that a coolant inlet is opposite to a fluid outlet.

Figure 2:
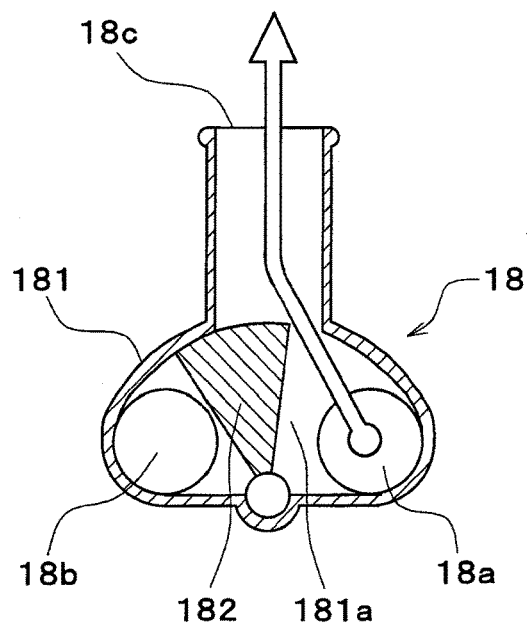
FIG. 2 is a cross-sectional view illustrating a first switching valve according to the first embodiment.

As illustrated in FIG. 2, the first switching valve 18 has a body part 181 which is formed with the first inlet 18a, the second inlet 18b, and the first outlet 18c. The body part 181 has a communication passage 181a formed therein, and the first and second inlets 18a and 18b and the first outlet 18c communicate with each other through the communication passage 181a.

The communication passage 181a is provided with a door type valve body 182 which switches a communication state between the first and second inlets 18a and 18b and the first outlet 18c.

When the valve body 182 rotates at a position illustrated in FIG. 2, the first inlet 18a communicates with the first outlet 18c, and the communication between the second inlet 18b and the first outlet 18c is cut off. Thus, the coolant introduced from the first inlet 18a flows out of the first outlet 18c, and the coolant introduced from the second inlet 18b does not flow out of the first outlet 18c.

The flow rate of coolant flowing from the first inlet 18a to the first outlet 18c may be regulated by adjusting the opening degree of the first outlet 18c in the state in which the valve body 182 closes the second inlet 18b.

Figure 3:
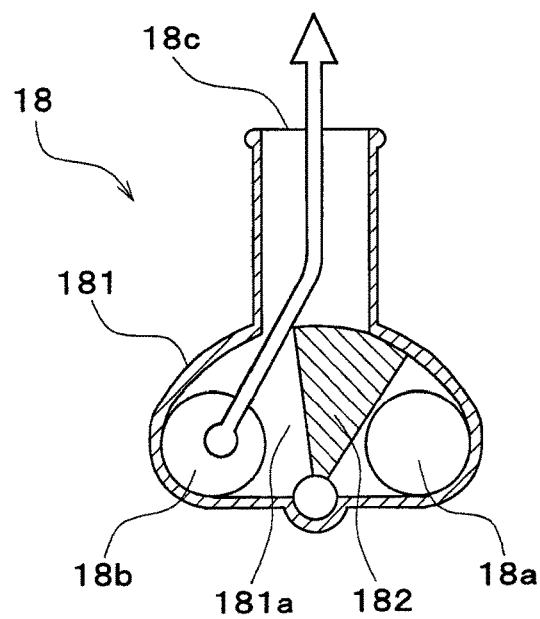
FIG. 3 is a cross-sectional view illustrating the first switching valve according to the first embodiment.

When the valve body 182 rotates at a position illustrated in FIG. 3, the communication between the first inlet 18a and the first outlet 18c is cut off, and the second inlet 18b communicates with the first outlet 18c. Thus, the coolant introduced from the first inlet 18a does not flow out of the first outlet 18c, and the coolant introduced from the second inlet 18b flows out of the first outlet 18c.

The flow rate of coolant flowing from the second inlet 18b to the first outlet 18c may be regulated by adjusting the opening degree of the first outlet 18c in the state in which the valve body 182 closes the first inlet 18a.

Figure 4:
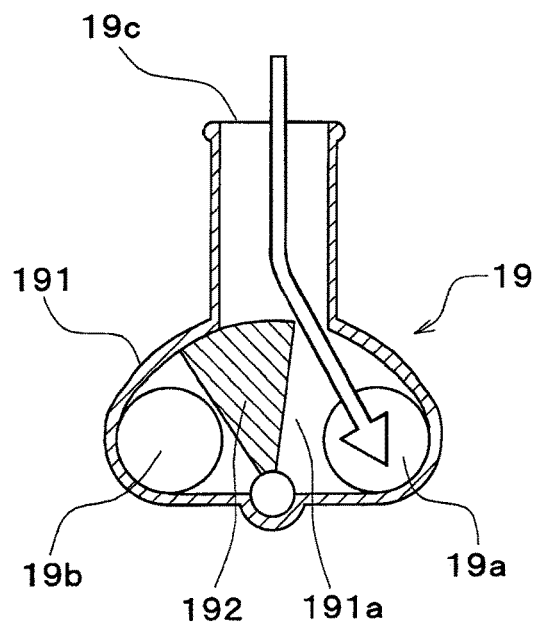
FIG. 4 is a cross-sectional view illustrating a second switching valve according to the first embodiment.

As illustrated in FIG. 4, the second switching valve 19 has a body part 191 which is formed with the first outlet 19a, the second outlet 19b, and the first inlet 19c. The body part 191 has a communication passage 191a formed therein, and the first and second outlets 19a and 19b and the first inlet 19c communicate with each other through the communication passage 191a.

The communication passage 191a is provided with a door type valve body 192 which switches a communication state between the first and second outlets 19a and 19b and the first inlet 19c.

When the valve body 192 rotates at a position illustrated in FIG. 4, the first outlet 19a communicates with the first inlet 19c, and the communication between the second outlet 19b and the first inlet 19c is cut off. Thus, the coolant introduced from the first inlet 19c flows out of the first outlet 19a, and does not flow out of the second outlet 19b.

The flow rate of coolant flowing from the first inlet 19c to the first outlet 19a may be regulated by adjusting the opening degree of the first inlet 19c in the state in which the valve body 192 closes the second outlet 19b.

Figure 5:
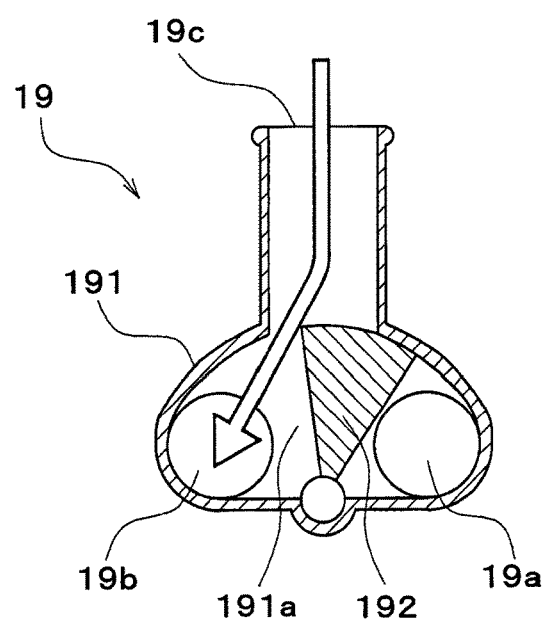
FIG. 5 is a cross-sectional view illustrating the second switching valve according to the first embodiment.

When the valve body 192 rotates at a position illustrated in FIG. 5, the communication between the first outlet 19a and the first inlet 19c is cut off, and the second outlet 19b communicates with the first inlet 19c. Thus, the coolant introduced from the first inlet 19c does not flow out of the first outlet 19a, and flows out of the second outlet 19b.

The flow rate of coolant flowing from the first inlet 19c to the second outlet 19b may be regulated by adjusting the opening degree of the first inlet 19c in the state in which the valve body 192 closes the first outlet 19a.

The valve body 182 of the first switching valve 18 and the valve body 192 of the second switching valve 19 are rotated independently by separate electric actuators. The valve body 182 of the first switching valve 18 and the valve body 192 of the second switching valve 19 may be interlocked and rotated by a common electric actuator.

The cooler core 16 will be described in detail with reference to FIG. 6. The cooler core 16 includes a first heat exchange core part 161a, a second heat exchange core part 162a, a first upper tank part 161b, a first lower tank part 161c, a second upper tank part 162b, and a second lower tank part 162c.

The first heat exchange core part 161a, the first upper tank part 161b, and the first lower tank part 161c define an upstream region of an air flow F1 in the cooler core 16. The second heat exchange core part 162a, the second upper tank part 162b, and the second lower tank part 16c define a downstream region of the air flow F1 in the cooler core 16.

The first upper tank part 161b is located above the first heat exchange core part 161a. The first lower tank part 161c is located beneath the first heat exchange core part 161a. The second upper tank part 162b is located above the second heat exchange core part 162a. The second lower tank part 162c is located beneath the second heat exchange core part 162a.

Each of the first and second heat exchange core parts 161a and 162a has a plurality of tubes 163 extending vertically. Each of the tubes 163 has a coolant passage formed therein, and coolant flows in the coolant passage. Spaces defined between the plurality of tubes 163 form air passages in which air flows. Fins 164 are arranged between the plurality of tubes 163. The fins 164 are bonded to the tubes 163.

Each of the heat exchange core parts 161a and 162a has a laminated structure of the tubes 163 and the fins 164. The tubes 163 and the fins 164 are arranged so as to be laminated in the left and right directions of the heat exchange core part 161a or 162a. The configuration in which the fins 164 are removed may be adopted.

Figure 6:
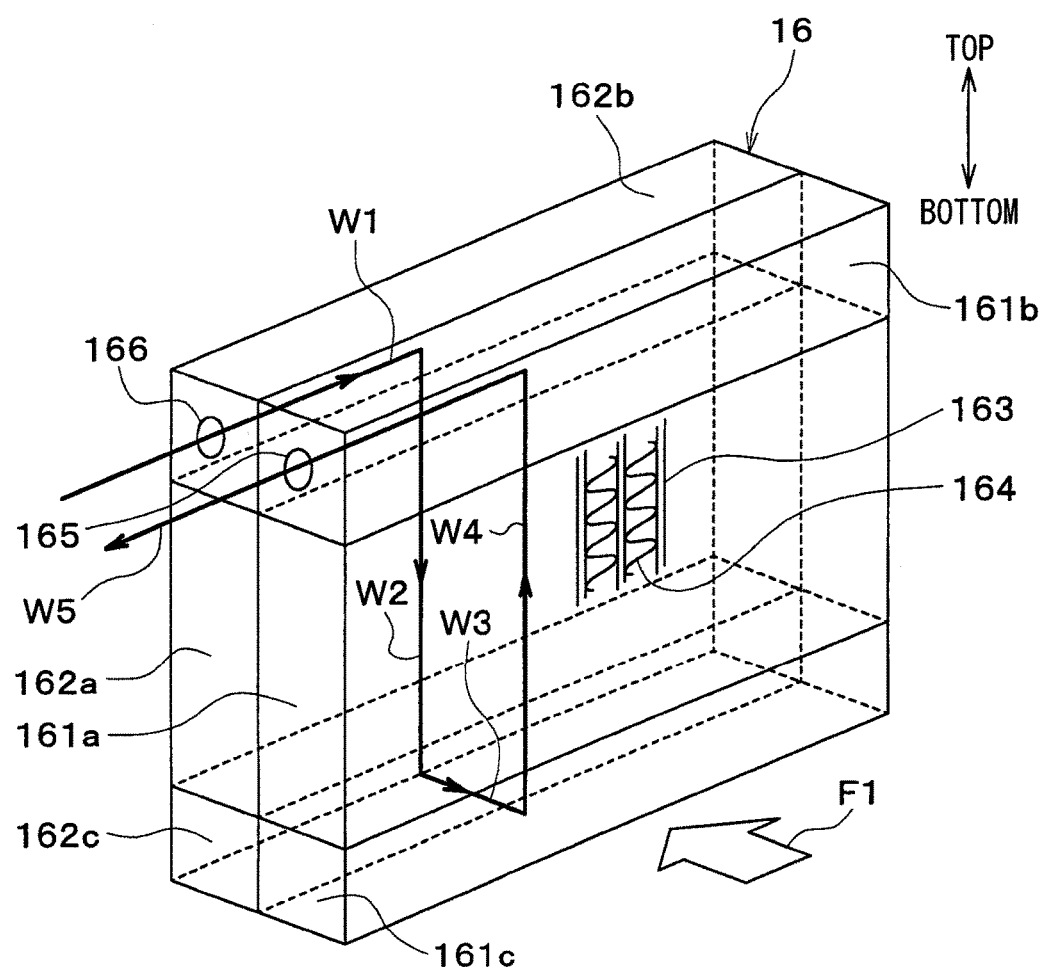
FIG. 6 is a perspective view schematically illustrating a cooler core according to the first embodiment.

Although FIG. 6 illustrates only a portion of the laminated structure of the tubes 163 and the fins 164 for convenience' sake, the laminated structure of the tubes 163 and the fins 164 is configured throughout the first and second heat exchange core parts 161a and 162a. Ventilation air by the interior blower 54 passes through gaps of the laminated structure.

Each of the tubes 163 is a flat tube having a cross-sectional shape that is flat in the air flow direction. Each of the fins 164 is a corrugated fin which is formed by bending a sheet material in a corrugated form, and is bonded to the flat outer surface of the associated tube 163 to enlarge a heat transfer area on the air side.

The tubes 163 of the first heat exchange core part 161a and the tubes 163 of the second heat exchange core part 162a form the coolant passages which are independent of each other. The first and second upper tank parts 161b and 162b define coolant passage spaces which are independent of each other. The first and second lower tank parts 161c and 162c define coolant passage spaces which communicate with each other.

A coolant outlet 165 is formed at the first upper tank part 161b. A coolant inlet 166 is formed at the second upper tank part 162b.

Accordingly, the second upper tank part 162b serves to distribute refrigerant flows to the plurality of tubes 163 of the second heat exchange core part 162a. The second lower tank part 162c serves to collect refrigerant flows from the plurality of tubes 163 of the second heat exchange core part 162a. The first lower tank part 161c serves to distribute refrigerant flows to the plurality of tubes 163 of the first heat exchange core part 161a. The first upper tank part 161b serves to collect refrigerant flows from the plurality of tubes 163 of the first heat exchange core part 161a.

Specifically, the components of the cooler core, such as the tubes 163, the fins 164, the first upper tank part 161b, the first lower tank part 161c, the second upper tank part 162b, and the second lower tank part 162c, are preferably made of aluminum such as metal having high thermal conductivity and solderability. All components of the cooler core 16 may be integrally soldered and assembled by forming each component using aluminum.

The whole coolant passages of the cooler core 16 will be described in detail. The coolant, which flows into the second upper tank part 162b from the coolant inlet 166, as indicated by the arrow W1 in FIG. 6, moves downward along the plurality of tubes 163 of the second heat exchange core part 162a and flows into the second lower tank part 162c, as indicated by the arrow W2.

The coolant in the second lower tank part 162c moves to the first lower tank part 161c, as indicated by the arrow W3. The coolant in the first lower tank part 161c moves upward along the plurality of tubes 163 of the first heat exchange core part 161a to flow into the first upper tank part 161b, and then flows out of the coolant outlet 165.

Figure 7:
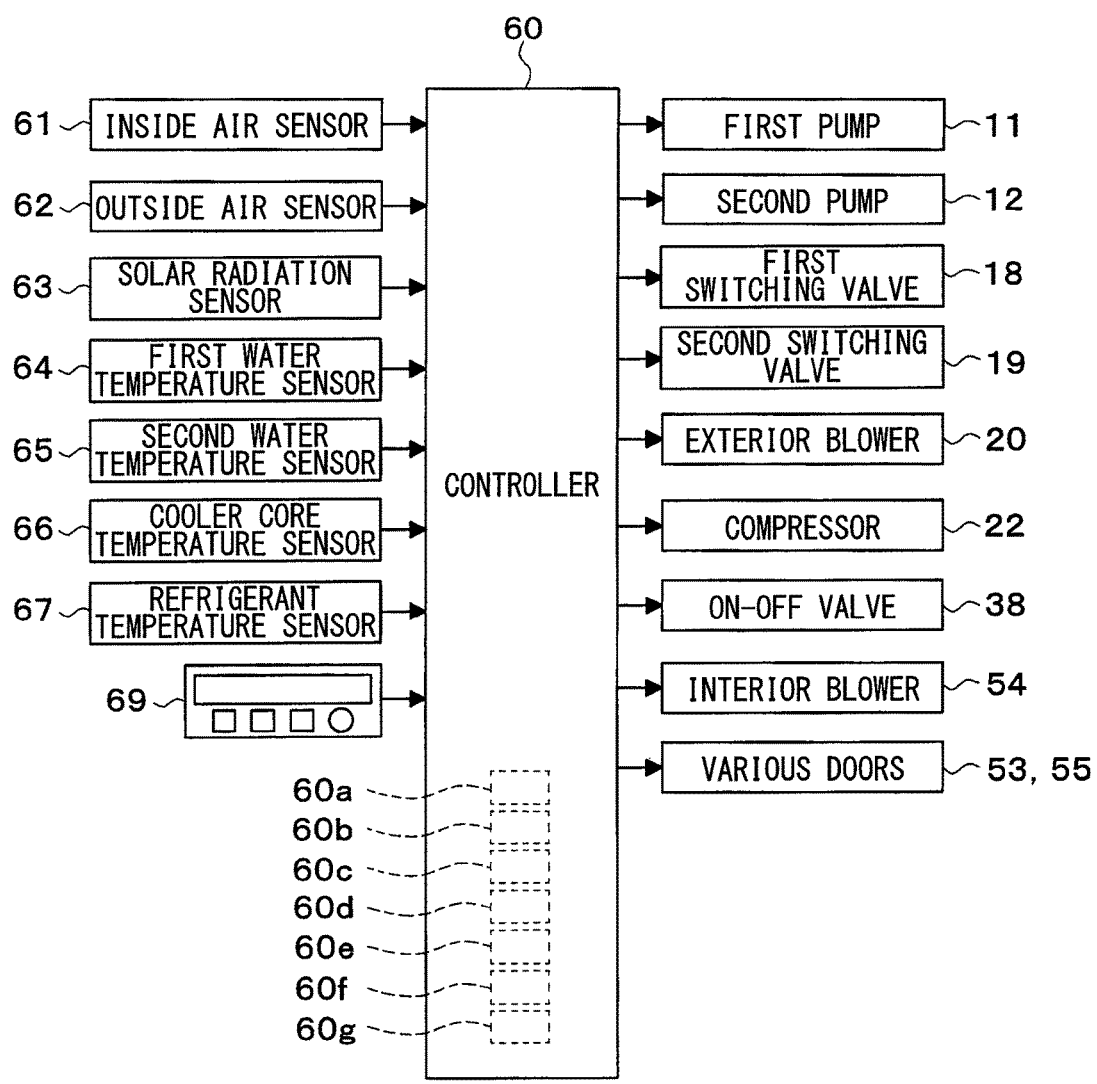
FIG. 7 is a block diagram illustrating an electric control unit in the vehicle thermal management system according to the first embodiment.

Next, an electric control unit of the thermal management system 10 will be described with reference to FIG. 7. A controller 60 is configured of a known microcomputer including a CPU, a ROM, and a RAM, and peripheral circuits thereof. The controller 60 is a control unit which executes various operations and processing based on air-conditioning control programs stored in the ROM, and controls the operations of various control target devices connected to the output side thereof.

The control target devices controlled by the controller 60 are electric actuators which drive the first pump 11, the second pump 12, the first switching valve 18, the second switching valve 19, the exterior blower 20, the compressor 22, the interior blower 54, and various doors (the inside/outside air switching door 53, the air mix door 55, the air outlet mode door, etc.) disposed in the case 51.

The controller 60 is integrally formed with a control unit which controls the various control target devices connected to the output side thereof. Herein, configurations (hardware and software) for controlling the operations of the respective control target devices form respectively control units which control the operations of the respective control target devices.

In the embodiment, the configuration (hardware and software) for controlling the operations of the first and second pumps 11 and 12 is referred to as a pump control unit 60a. The pump control unit 60a is a flow control unit (heat medium flow regulation part) which controls the flow rate of coolant. The pump control unit 60a may be configured independently of the controller 60. The pump control unit 60a is a radiator adjustment part (heat exchanger adjustment part) which regulates the flow rate of coolant flowing in the radiator 13.

In the embodiment, the configuration (hardware and software) for controlling the operations of the first and second switching valves 18 and 19 is referred to as a switching valve control unit 60b. The switching valve control unit 60b may be configured independently of the controller 60. The switching valve control unit 60b is a radiator adjustment part (heat exchanger adjustment part) which regulates the flow rate of coolant flowing in the radiator 13. The switching valve control unit 60b is a flow regulation part (heat medium flow regulation part) which regulates the flow rate of coolant flowing in each coolant circulation device.

In the embodiment, the configuration (hardware and software) for controlling the operation of the exterior blower 20 is referred to as an exterior blower control unit 60c (outside air blower control unit). The exterior blower control unit 60c may be configured independently of the controller 60. The exterior blower control unit 60c is a radiator adjustment part (heat exchanger adjustment part, heat medium/outside air heat exchanger adjustment part) which regulates the flow rate of ventilation air flowing in the radiator 13.

In the embodiment, the configuration (hardware and software) for controlling the operation of the compressor 22 is referred to as a compressor control unit 60d. The compressor control unit 60d may be configured independently of the controller 60. The compressor control unit 60d is a refrigerant flow regulation part which controls the flow rate of refrigerant discharged from the compressor 22.

In the embodiment, the configuration (hardware and software) for controlling the operation of the on-off valve 38 is referred to as an on-off valve control unit 60e. The on-off valve control unit 60e may be configured independently of the controller 60. The on-off valve 38 and the on-off valve control unit 60e are a cooler core adjustment part (heat exchanger adjustment part, air-cooling heat exchanger adjustment part) which regulates the flow rate of coolant flowing in the cooler core 16.

In the embodiment, the configuration (hardware and software) for controlling the operation of the interior blower 54 is referred to as an interior blower control unit 60f (outside air blower control unit). The interior blower control unit 60f may be configured independently of the controller 60. The interior blower control unit 60f is a cooler core adjustment part (heat exchanger adjustment part) which regulates the flow rate of ventilation air flowing in the cooler core 16. The interior blower 54 and the interior blower control unit 60f are a flow control unit which controls the air volume of ventilation air blown into the vehicle interior.

In the embodiment, the configuration (hardware and software) for controlling the operations of various doors (the inside/outside air switching door 53, the air mix door 55, the air outlet mode door, etc.) disposed in the case 51 is referred to as an air-conditioning switching control unit 60g. The air-conditioning switching control unit 60g may be configured independently of the controller 60.

The air mix door 55 and the air-conditioning switching control unit 60g are an air volume ratio adjustment part which adjusts a ratio of air volume between ventilation air flowing in the heater core 17 and ventilation air flowing by bypassing the heater core 17 in the ventilation air cooled by the cooler core 16.

The inside/outside air switching door 53 and the air-conditioning switching control unit 60g are an inside/outside air ratio adjustment part which adjusts a ratio between inside air and outside air in the ventilation air blown into the vehicle interior.

Signals detected by a group of sensors, which consists of an inside air sensor 61, an outside air sensor 62, a solar radiation sensor 63, a first water temperature sensor 64, a second water temperature sensor 65, a cooler core temperature sensor 66, a refrigerant temperature sensor 67, etc., are input to the input side of the controller 60.

The inside air sensor 61 is a detection device (inside air temperature detection device) which detects an inside air temperature (vehicle interior temperature). The outside air sensor 62 is a detection device (outside air temperature detection device) which detects an outside air temperature (vehicle exterior temperature). The solar radiation sensor 63 is a detection device (solar radiation amount detection device) which detects an amount of solar radiation in the vehicle interior. The first water temperature sensor 64 is a detection device (first heat medium temperature detection device) which detects a coolant temperature flowing in the first pump passage 31 (for instance, a coolant temperature introduced into the first pump 11).

The second water temperature sensor 65 is a detection device (Second heat medium temperature detection device) which detects a coolant temperature flowing in the second pump passage 32 (for instance, a coolant temperature introduced into the second pump 12).

The cooler core temperature sensor 66 is a detection device (cooler core temperature detection device) which detects a surface temperature of the cooler core 16. For example, the cooler core temperature sensor 66 includes a fin thermistor 66a (see FIG. 1) which detects the temperature of the heat exchange fin of the cooler core 16, a water temperature sensor 66b (see FIG. 1) which detects the coolant temperature flowing in the cooler core 16, etc.

The refrigerant temperature sensor 67 is a detection device (refrigerant temperature detection device) which detects a refrigerant temperature in the refrigeration cycle 21 (for instance, a temperature of refrigerant discharged from the compressor 22).

Operation signals from various air-conditioning operation switches provided on an operation panel 69 disposed in the vicinity of the dashboard at the front portion of the vehicle interior are input to the input side of the controller 60. The various air-conditioning operation switches provided on the operation panel 69 include an air conditioner switch, an auto switch, an air volume setting switch of the interior blower 54, a vehicle interior temperature setting switch, etc.

The air conditioner switch is a switch for switching the operation/stop (on/off) of air-conditioning (cooling or heating). The auto switch is a switch for setting or canceling automatic control of air-conditioning. The vehicle interior temperature setting switch is a target temperature setting part for setting a vehicle interior target temperature by the operation of an occupant.

Next, the operation of the controller with the above configurations will be described. The controller 60 controls the operations of the first pump 11, the second pump 12, the first switching valve 18, the second switching valve 19, the compressor 22, the inside/outside air switching door 53, the air mix door 55, and the air outlet mode door, thereby switching various operation modes.

Figure 8:
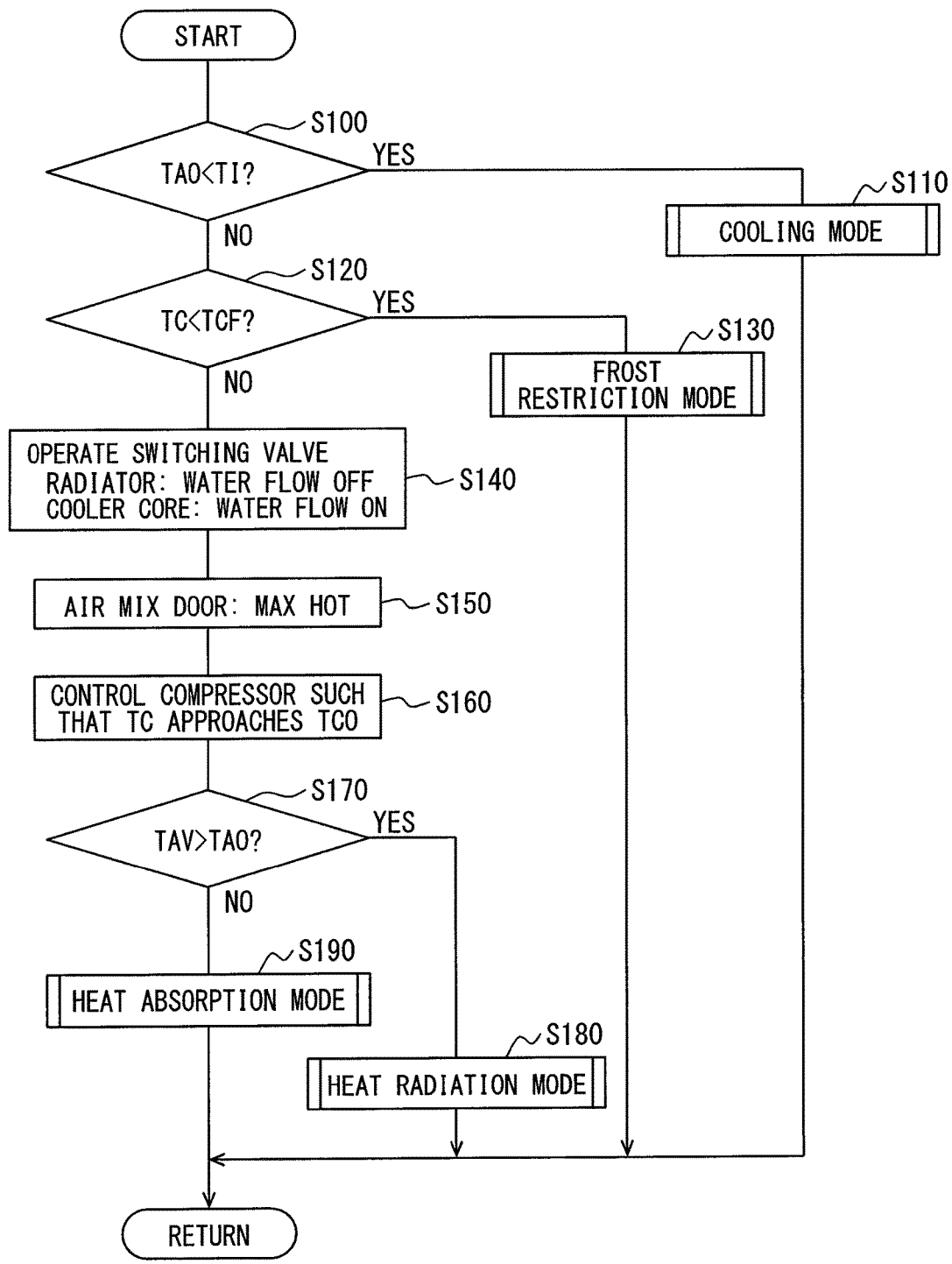
FIG. 8 is a flowchart illustrating a control process executed by a controller in the vehicle thermal management system according to the first embodiment.

The controller 60 executes a control process illustrated in FIG. 8. In step S100, it is determined whether or not a target blowout air temperature TAO is less than a cooler core in-flowing air temperature TI.

The target blowout air temperature TAO is calculated by the following Equation F1.

$$TAO = Kset \times Tset - Kr \times Tr - Kam \times Tam - Ks \times TS + C \quad \text{F1}$$

In Equation F1, the Tset is a vehicle interior setting temperature which is set by the vehicle interior temperature setting switch, and the Tr is a vehicle interior temperature (inside air temperature) which is detected by the inside air sensor 61. The Tam is an outside air temperature which is detected by the outside air sensor 62. The Ts is an amount of solar radiation which is detected by the solar radiation sensor 63. The Kset, Kr, Kam, and Ks are control gains. The C is a correction constant.

Since the target blowout air temperature TAO corresponds to a quantity of heat that is required by the vehicle air conditioner in order to maintain the vehicle interior at a predetermined temperature, it may be understood as an air-conditioning heat load (cooling load or heating load) required in the vehicle air conditioner. That is, when the cooling load required in the vehicle air conditioner is high, the target blowout air temperature TAO is in a low temperature range, and when the heating load required in the vehicle air conditioner is high, the target blowout air temperature TAO is in a high temperature range.

The cooler core in-flowing air temperature TI is a temperature of ventilation air flowing into the cooler core 16, and is calculated by the following Equation F2.

$$TI = Tr \times 0.01A + Tam \times 0.01(1 - 0.01A) \quad \text{F2}$$

In Equation F2, the A is a percentage of the air volume ratio of the inside air (inside air ratio) among inside air and outside air introduced into the case 51 through the inside/outside air switching box 52. The cooler core in-flowing air temperature TI may be directly detected by a dedicated temperature sensor.

Figure 9:
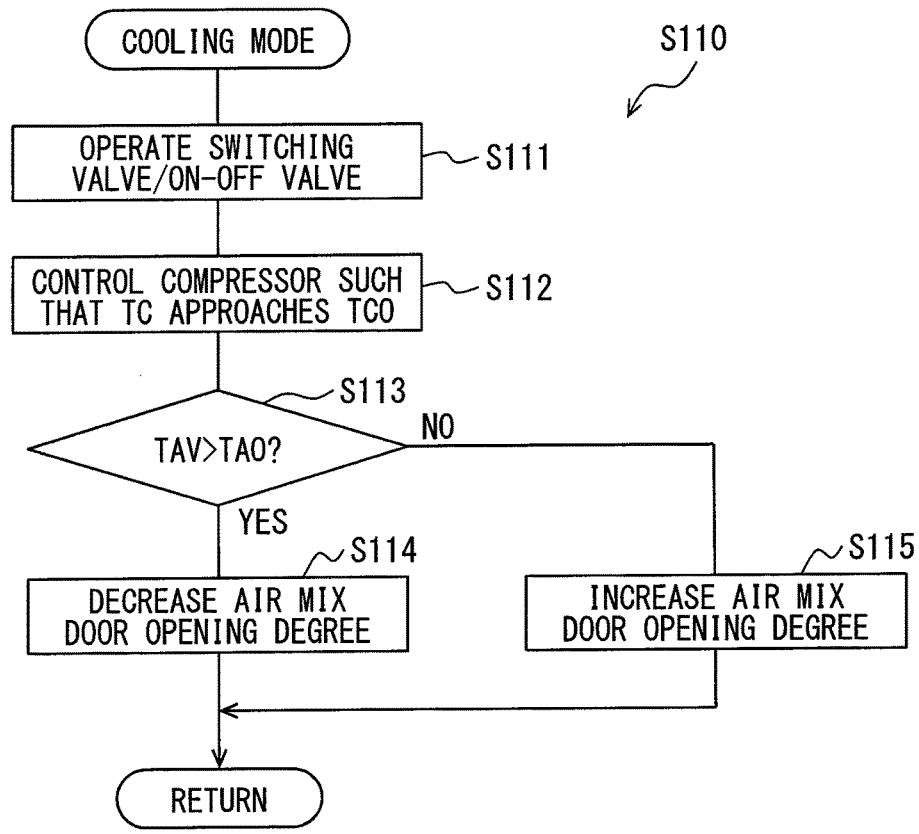
FIG. 9 is a flowchart illustrating a control process of a cooling mode in the vehicle thermal management system according to the first embodiment.

When the target blowout air temperature TAO is determined to be less than the cooler core in-flowing air temperature TI in step S100, the process proceeds to step S110, and moves to a cooling mode. The control process in the cooling mode is illustrated in FIG. 9.

Figure 10:
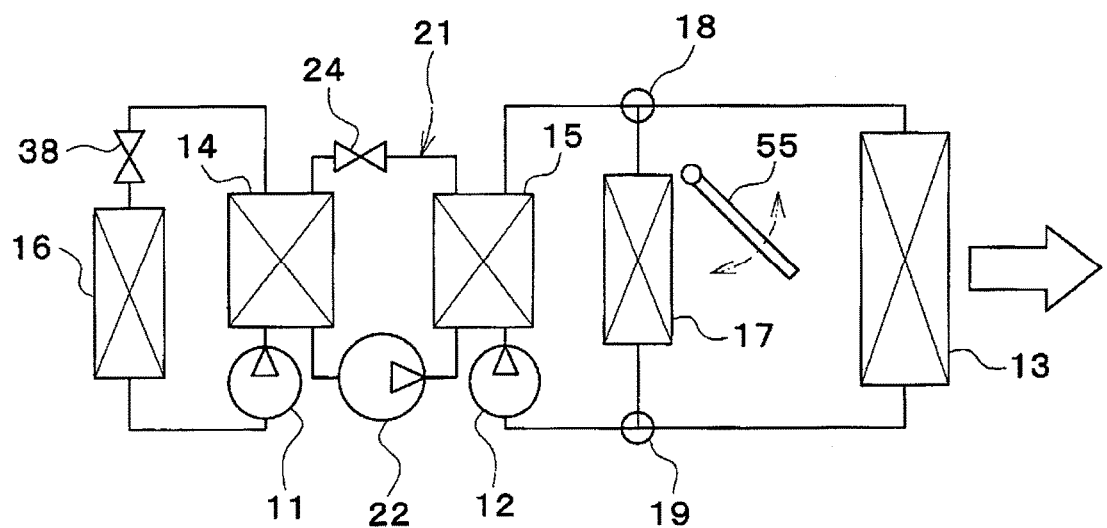
FIG. 10 is a diagram illustrating a coolant flow in the cooling mode in the vehicle thermal management system according to the first embodiment.

In step S111, the flow of coolant is switched to a flow in the cooling mode illustrated in FIG. 10 by operating the first and second switching valves 18 and 19. Specifically, the coolant introduced/discharged by the second pump 12 is switched so as to be circulated in the radiator 13.

In step S111, the coolant introduced/discharged by the first pump 11 is switched so as to be circulated in the cooler core 16 by opening the on-off valve 30.

Accordingly, since the coolant cooled by the coolant/cooler 14 flows in the cooler core 16, the ventilation air into the vehicle interior is cooled by the cooler core 16. Since the coolant heated by the coolant/heater 15 flows in the heater core 17 and the radiator 13, the ventilation air into the vehicle interior is heated by the heater core 17 while heat is radiated from the coolant to outside air by the radiator 13.

In step S112, the refrigerant discharge capability of the compressor 22 (specifically, the speed of rotation of the compressor 22) is controlled such that the surface temperature TC of the cooler core 16 is close to, or approaches, the target surface temperature (first target temperature) TCO.

Specifically, when the surface temperature TC of the cooler core 16 exceeds the target surface temperature TCO, the surface temperature TC of the cooler core 16 is lowered by increasing the speed of rotation of the compressor 22. When the surface temperature TC of the cooler core 16 is less than the target surface temperature TCO, the surface temperature TC of the cooler core 16 is increased by decreasing the speed of rotation of the compressor 22.

In step S112, instead of the surface temperature TC of the cooler core 16, a variety of temperatures associated with the surface temperature TC of the cooler core 16 (e.g. the temperature of ventilation air flowing out of the cooler core 16, and the coolant temperature flowing in the cooler core 16) may be used.

In step S113, it is determined whether or not a blowout air temperature TAV exceeds a target blowout air temperature (Second target temperature) TAO. The blowout air temperature TAV is a temperature of air blown into the vehicle interior from the air-conditioning unit 50, and is calculated by the following Equation F3.

$$TAV = TC \times 0.01(1 - SW) + TH \times 0.01SW \quad \text{F3}$$

In Equation F3, the TC is a surface temperature of the cooler core 16, the TH is a surface temperature of the heater core 17, and the SW is a percentage of the air volume ratio (air mix door opening degree) of the air flowing into the heater core 17 in ventilation air flowing out of the cooler core 16.

The blowout air temperature TAV may be directly detected by a dedicated temperature sensor. In step S113, instead of the blowout air temperature TAV, a variety of temperatures associated with the blowout air temperature TAV (e.g. the coolant temperature flowing into the heater core 17) may be used.

When the blowout air temperature TAV is determined to exceed the target blowout air temperature TAO in step S113, the process proceeds to step S114, and the operation of the air mix door 55 is controlled such that the opening degree of the air mix door is decreased.

When the blowout air temperature TAV is determined to do not exceed the target blowout air temperature TAO in step S113, the process proceeds to step S115, and the operation of the air mix door 55 is controlled such that the opening degree of the air mix door is increased.

Consequently, the cooling mode is controlled such that the blowout air temperature TAV is close to the target blowout air temperature TAO, and the vehicle interior is cooled.

When the target blowout air temperature TAO is determined to be not less than the cooler core in-flowing air temperature TI in step S100 illustrated in FIG. 8, the process proceeds to step S120, and it is determined whether or not the surface temperature TC of the cooler core 16 is less than a frost limit temperature (predetermined temperature) TCF. The frost limit temperature TCF is a limit temperature (e.g. 0° C.) at which frost (frost formation) is generated on the cooler core 16. Instead of the surface temperature TC of the cooler core 16, the temperature of ventilation air flowing out of the cooler core 16 may be used.

Figure 11:
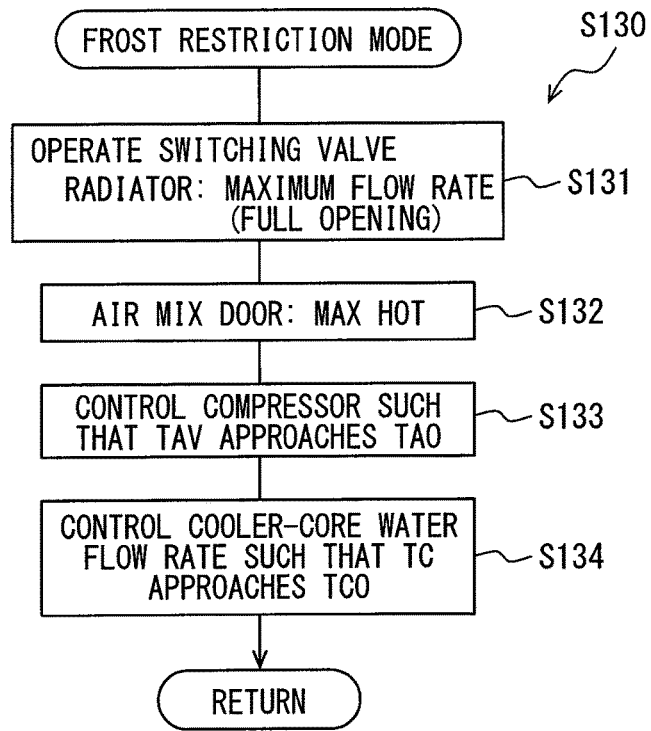
FIG. 11 is a flowchart illustrating a control process of a frost restriction mode in the vehicle thermal management system according to the first embodiment.

When the surface temperature TC of the cooler core 16 is less than the frost limit temperature TCF, the process proceeds to step S130, and moves to a frost restriction mode. The control process in the frost restriction mode is illustrated in FIG. 11.

Figure 12:
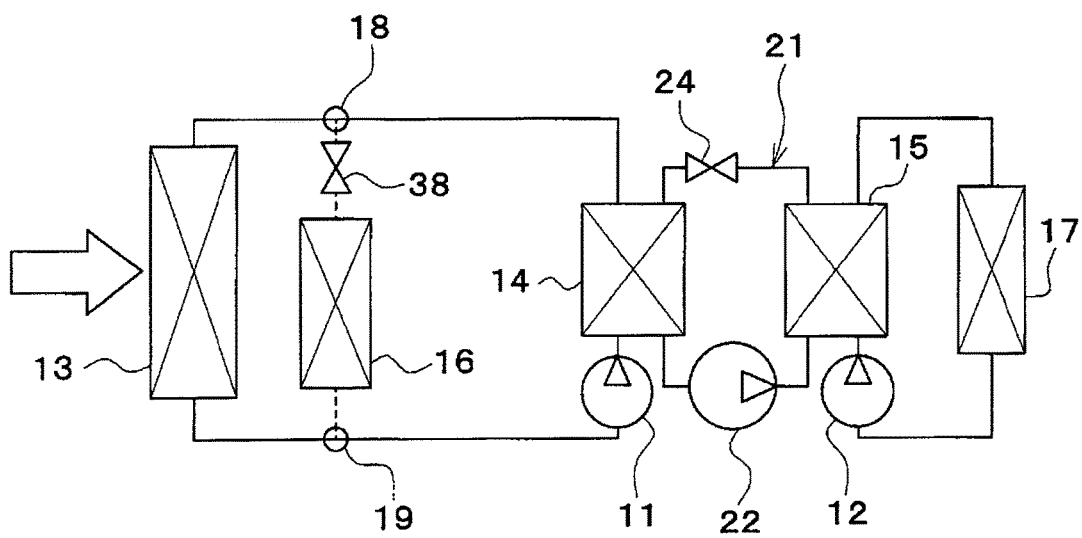
FIG. 12 is a diagram illustrating a coolant flow in the frost restriction mode in the vehicle thermal management system according to the first embodiment.

In step S131, the flow of coolant is switched to a flow in the frost restriction mode illustrated in FIG. 12 by operating the first and second switching valves 18 and 19. Specifically, the radiator 13 is connected to the coolant/cooler 14. In other words, the coolant introduced/discharged by the first pump 11 is switched so as to be circulated in the radiator 13. In this case, the first and second switching valves 18 and 19 fully open the radiator passage 33 (such that the radiator passage 33 has a maximum opening degree), and the flow rate of coolant circulated in the radiator 13 is maximized.

Accordingly, since the coolant cooled by the coolant/cooler 14 flows in the radiator 13, heat is absorbed to the coolant from outside air by the radiator 13. Since the coolant heated by the coolant/heater 15 flows in the heater core 17, the ventilation air into the vehicle interior is heated by the heater core 17.

That is, in the frost restriction mode, the refrigerant in the refrigeration cycle 21 absorbs heat from outside air by the radiator 13, and the heat is radiated to the coolant by the coolant/heater 15. Thus, it is possible to realize a heat pump operation for pumping the heat of outside air.

In step S132, the air mix door 55 is operated at a position for performing maximum heating (MAX HOT). The position of the air mix door 55 for performing maximum heating is a position at which the heater core bypass passage 51*a* is fully closed. When the air mix door 55 is operated at the position for performing maximum heating, the whole amount of ventilation air flowing out of the cooler core 16 is heated while the ventilation air flows in the heater core 17.

When a variation in refrigeration cycle (variation in high-pressure refrigerant temperature or variation in low-pressure refrigerant temperature) according to an environmental variation (rapid variation in outside air temperature, or mainly variation in volume of air flowing in the radiator 13 due to the variation of vehicle speed) during vehicle use is not controlled by the refrigerant flow control of the compressor 22, the blowout air temperature may be temporarily controlled by controlling the opening degree of the air mix door 55. This is because the method of controlling the opening degree of the air mix door 55 has better response compared to the refrigerant flow control of the compressor 22.

In step S133, the refrigerant discharge capability of the compressor 22 (specifically, the speed of rotation of the compressor 22) is controlled such that the blowout air temperature TAV is close to the target blowout air temperature (Second target temperature) TAO. Specifically, when the blowout air temperature TAV exceeds the target blowout air temperature TAO, the blowout air temperature TAV is lowered by decreasing the speed of rotation of the compressor 22. When the blowout air temperature TAV is less than the target blowout air temperature TAO, the blowout air temperature TAV is increased by increasing the speed of rotation of the compressor 22.

In step S133, instead of the blowout air temperature TAV, a variety of temperatures associated with the blowout air temperature TAV (e.g. the coolant temperature flowing into the heater core 17) may be used.

In step S134, the flow rate of coolant flowing in the cooler core 16 (cooler-core water flow rate) is controlled by intermittently opening and closing the on-off valve 38, such that the surface temperature TC of the cooler core 16 is close to the target surface temperature (first target temperature) TCO. The target surface temperature TCO of the cooler core 16 is set to be in the range of 0 to 10° C.

Specifically, when the surface temperature TC of the cooler core 16 exceeds the target surface temperature TCO, the surface temperature TC of the cooler core 16 is lowered in such a manner that the coolant cooled by the coolant/cooler 14 flows into the cooler core 16 by opening the on-off valve 38. When the surface temperature TC of the cooler core 16 is less than the target surface temperature TCO, the surface temperature TC of the cooler core 16 is increased in such a manner that the flow of coolant into the cooler core 16 is blocked by closing the on-off valve 38.

Consequently, the time-average flow rate of coolant flowing in the cooler core 16 is regulated such that the surface temperature TC of the cooler core 16 is close to the target surface temperature TCO. Therefore, it is possible to prevent condensate adhered to the surface of the cooler core 16 from being frozen, or to prevent window fog or odors from occurring due to the evaporation of condensate adhered to the surface of the cooler core 16.

In step S134, instead of the surface temperature TC of the cooler core 16, a variety of temperatures associated with the surface temperature TC of the cooler core 16 (e.g. the temperature of ventilation air flowing out of the cooler core 16) may be used.

In step S134, instead of intermittently opening and closing the on-off valve 38, the flow rate of coolant flowing in the cooler core 16 may be regulated by controlling the on-off valve 38 such that the on-off valve 38 has an intermediate opening degree. The flow rate of coolant flowing in the cooler core 16 may be regulated by controlling the coolant discharge capability of the first pump 11 (specifically, the speed of rotation of the first pump 11).

In the frost restriction mode, since the ventilation air, which is cooled and dehumidified by the cooler core 16, is heated by the heater core 17 to be blown into the vehicle interior, the vehicle interior may be dehumidified and heated.

In step S140 illustrated in FIG. 8, the flow of coolant into the radiator 13 is blocked (water flow OFF) by operating the first and second switching valves 18 and 19, and at the same time the coolant introduced/discharged by the first pump 11 is switched so as to be circulated in the cooler core 16 (water flow ON) by opening the on-off valve 38.

Accordingly, since the coolant cooled by the coolant/cooler 14 flows in the cooler core 16, heat is absorbed to the coolant from the ventilation air into the vehicle interior by the cooler core 16. Since the coolant heated by the coolant/heater 15 flows in the heater core 17, the ventilation air into the vehicle interior is heated by the heater core 17.

That is, the refrigerant in the refrigeration cycle 21 absorbs heat from the ventilation air into the vehicle interior by the cooler core 16, and the heat is radiated to the coolant by the coolant/heater 15. Thus, it is possible to realize a heat pump operation for pumping the heat of ventilation air into the vehicle interior.

In step S140, the flow rate of coolant flowing in the radiator 13 may be less than a predetermined amount by operating the first and second switching valves 18 and 19.

In step S150, the air mix door 55 is operated at a position for performing maximum heating (MAX HOT).

In step S160, the refrigerant discharge capability of the compressor 22 (specifically, the speed of rotation of the compressor 22) is controlled such that the surface temperature TC of the cooler core 16 is close to the target surface temperature TCO. Specifically, when the surface temperature TC of the cooler core 16 exceeds the target surface temperature TCO, the surface temperature TC of the cooler core 16 is lowered by increasing the speed of rotation of the compressor 22. When the surface temperature TC of the cooler core 16 is less than the target surface temperature TCO, the surface temperature TC of the cooler core 16 is increased by decreasing the speed of rotation of the compressor 22.

In step S160, instead of the surface temperature TC of the cooler core 16, a variety of temperatures associated with the surface temperature TC of the cooler core 16 (e.g. the temperature of ventilation air flowing out of the cooler core 16) may be used.

In step S170, it is determined whether or not the blowout air temperature TAV exceeds the target blowout air temperature TAO. In step S170, instead of the blowout air temperature TAV, a variety of temperatures associated with the blowout air temperature TAV (e.g. the coolant temperature flowing into the heater core 17) may be used.

Figure 13:
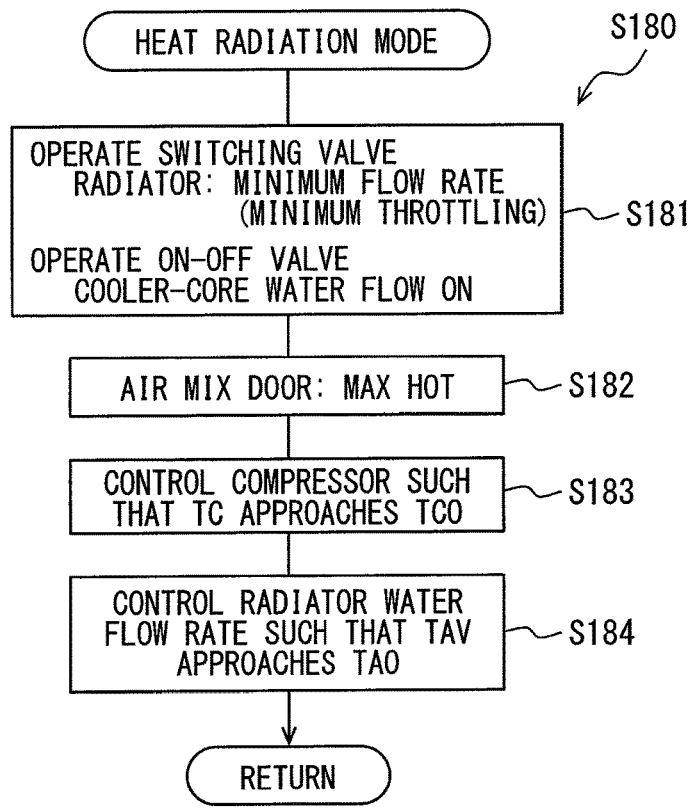
FIG. 13 is a flowchart illustrating a control process of a heat radiation mode in the vehicle thermal management system according to the first embodiment.

When the blowout air temperature TAV is determined to exceed the target blowout air temperature TAO, the process proceeds to step S180, and moves to a heat radiation mode. The control process in the heat radiation mode is illustrated in FIG. 13.

Figure 14:
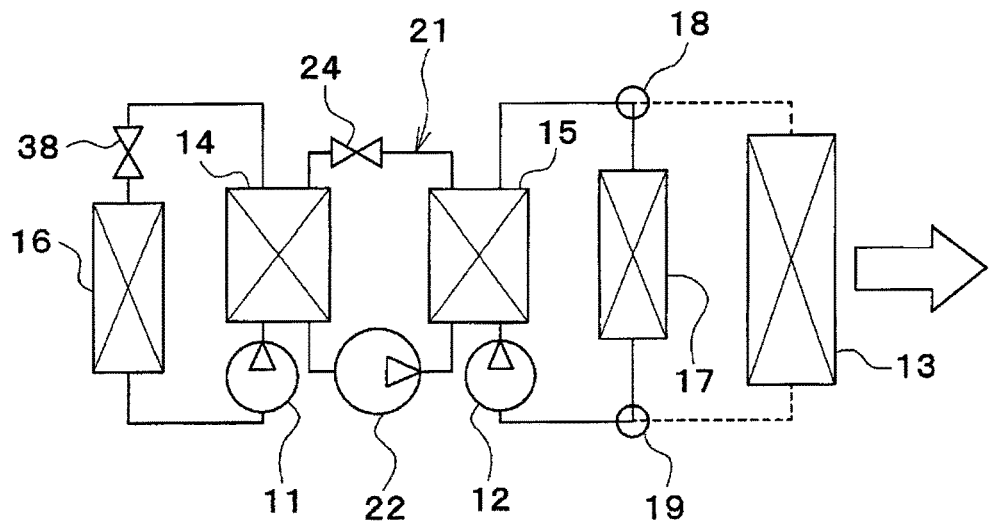
FIG. 14 is a diagram illustrating a coolant flow in the heat radiation mode in the vehicle thermal management system according to the first embodiment.

In step S181, the flow of coolant is switched to a flow in the heat radiation mode illustrated in FIG. 14 by operating the first and second switching valves 18 and 19. Specifically, the radiator 13 is connected to the coolant/heater 15. In other words, the coolant introduced/discharged by the second pump 12 is switched so as to be circulated in the radiator 13. In this case, the first and second switching valves 18 and 19 throttle the radiator passage 33 such that the radiator passage 33 has a minimum opening degree, and the flow rate of coolant circulated in the radiator 13 is minimized.

In step S181, the coolant introduced/discharged by the first pump 11 is switched so as to be circulated in the cooler core 16 (cooler-core water flow ON) by opening the on-off valve 38.

Accordingly, since the coolant cooled by the coolant/cooler 14 flows in the cooler core 16, heat is absorbed to the coolant from the ventilation air into the vehicle interior by the cooler core 16. Since the coolant heated by the coolant/heater 15 flows in the heater core 17, the ventilation air into the vehicle interior is heated by the heater core 17. Since the coolant heated by the coolant/heater 15 flows in the radiator 13 at a minimum flow rate, minimum heat is radiated from the coolant to outside air by the radiator 13.

That is, the refrigerant in the refrigeration cycle 21 absorbs heat from the ventilation air into the vehicle interior by the cooler core 16, and the heat is radiated to the coolant by the coolant/heater 15. Thus, it is possible to realize a heat pump operation for pumping the heat of ventilation air into the vehicle interior.

In step S182, the air mix door 55 is operated at a position for performing maximum heating (MAX HOT). The position of the air mix door 55 for performing maximum heating is a position at which the heater core bypass passage 51a is fully closed. When the air mix door 55 is operated at the position for performing maximum heating, the whole amount of ventilation air flowing out of the cooler core 16 is heated while the ventilation air flows in the heater core 17.

When a variation in refrigeration cycle (variation in high-pressure refrigerant temperature or variation in low-pressure refrigerant temperature) according to an environmental variation (rapid variation in outside air temperature, or mainly variation in volume of air flowing in the radiator 13 due to the variation of vehicle speed) during vehicle use is not controlled by the refrigerant flow control of the compressor 22, the blowout air temperature may be temporarily controlled by controlling the opening degree of the air mix door 55. This is because the method of controlling the opening degree of the air mix door 55 has better response compared to the refrigerant flow control of the compressor 22.

In step S183, the refrigerant discharge capability of the compressor 22 (specifically, the speed of rotation of the compressor 22) is controlled such that the surface temperature TC of the cooler core 16 is close to the target surface temperature TCO. Specifically, when the surface temperature TC of the cooler core 16 exceeds the target surface temperature TCO, the surface temperature TC of the cooler core 16 is lowered by increasing the speed of rotation of the compressor 22. When the surface temperature TC of the cooler core 16 is less than the target surface temperature TCO, the surface temperature TC of the cooler core 16 is increased by decreasing the speed of rotation of the compressor 22.

In step S183, instead of the surface temperature TC of the cooler core 16, a variety of temperatures associated with the surface temperature TC of the cooler core 16 (e.g. the temperature of ventilation air flowing out of the cooler core 16) may be used.

In step S184, the flow rate of coolant circulated in the radiator 13 (radiator water flow rate) is controlled such that the blowout air temperature TAV is close to the target blowout air temperature TAO.

Specifically, when the blowout air temperature TAV exceeds the target blowout air temperature TAO, the blowout air temperature TAV is lowered in such a manner that the flow rate of coolant circulated in the radiator 13 is increased by operating the first and second switching valves 18 and 19 such that the opening degree of the radiator passage 33 is increased by a predetermined level. When the blowout air temperature TAV is less than the target blowout air temperature TAO, the blowout air temperature TAV is increased in such a manner that the flow rate of coolant circulated in the radiator 13 is decreased by operating the first and second switching valves 18 and 19 such that the opening degree of the radiator passage 33 is decreased by a predetermined level.

Consequently, the flow rate of coolant circulated in the radiator 13 is regulated such that the blowout air temperature TAV is close to the target blowout air temperature TAO, and the vehicle interior is thus heated.

In step S184, instead of the blowout air temperature TAV, a variety of temperatures associated with the blowout air temperature TAV (e.g. the coolant temperature flowing into the heater core 17) may be used.

In step S184, instead of increasing or decreasing of the opening degree of the radiator passage 33 by a predetermined level by the first and second switching valves 18 and 19, the time-average flow rate of coolant flowing in the radiator 13 may be regulated by intermittently opening and closing the radiator passage 33 by the first and second switching valves 18 and 19. The flow rate of coolant circulated in the radiator 13 may be regulated by controlling the coolant discharge capability of the second pump 12 (specifically, the speed of rotation of the second pump 12).

In step S184, instead of regulating the flow rate of coolant circulated in the radiator 13, the flow rate of outside air flowing in the radiator 13 may be regulated. Specifically, the flow rate of outside air flowing in the radiator 13 may be regulated by controlling the operation of the exterior blower 20.

In the heat radiation mode, since the ventilation air, which is cooled and dehumidified by the cooler core 16, is heated by the heater core 17 and is blown into the vehicle interior, the vehicle interior may be dehumidified and heated.

In the heat radiation mode, when the vehicle interior is heated using heat absorbed to the coolant from the ventilation air into the vehicle interior by the cooler core 16, surplus heat is radiated to outside air by the radiator. Therefore, it is possible to prevent the vehicle interior from being excessively heated.

Figure 15:
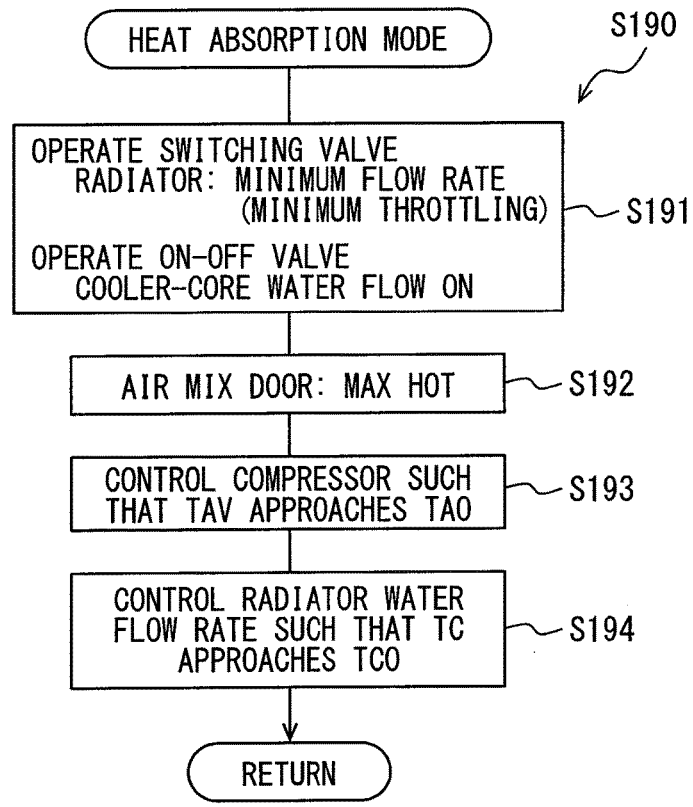
FIG. 15 is a flowchart illustrating a control process of a heat absorption mode in the vehicle thermal management system according to the first embodiment.

In step S170, when the blowout air temperature TAV is determined to exceed the target blowout air temperature TAO, the process proceeds to step S190, and moves to a heat absorption mode. The control process in the heat absorption mode is illustrated in FIG. 15.

Figure 16:
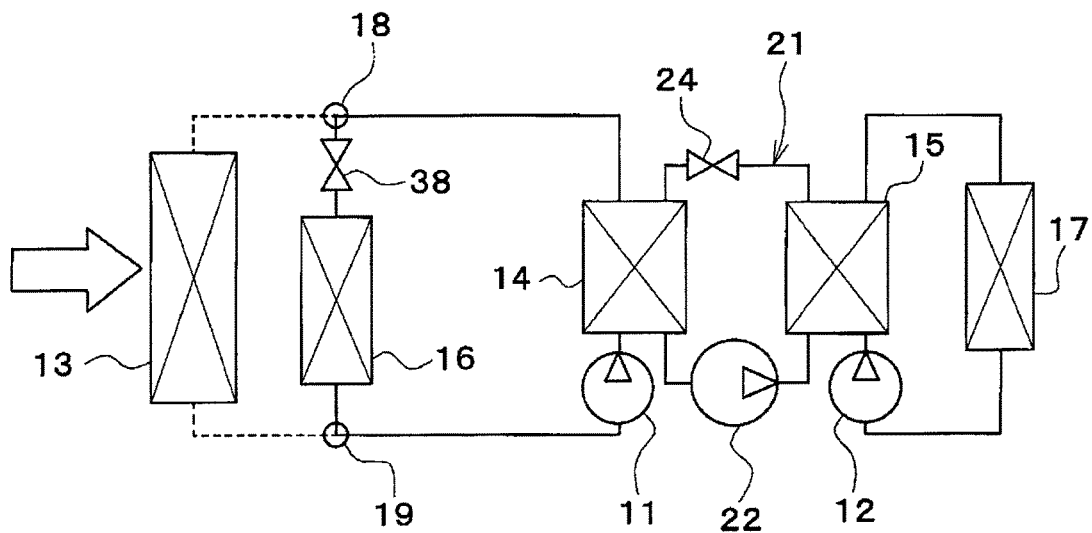
FIG. 16 is a diagram illustrating a coolant flow in the heat absorption mode in the vehicle thermal management system according to the first embodiment.

In step S191, the flow of coolant is switched to a flow in the heat absorption mode illustrated in FIG. 16 by operating the first and second switching valves 18 and 19. Specifically, the radiator 13 is connected to the coolant/cooler 14. In other words, the coolant introduced/discharged by the first pump 11 is switched so as to be circulated in the radiator 13. In this case, the first and second switching valves 18 and 19 throttle the radiator passage 33 such that the radiator passage 33 has a minimum opening degree, and the flow rate of coolant circulated in the radiator 13 is minimized.

In step S191, the coolant introduced/discharged by the first pump 11 is switched so as to be circulated in the cooler core 16 (cooler-core water flow ON) by opening the on-off valve 38.

Accordingly, since the coolant cooled by the coolant/cooler 14 flows in the cooler core 16, heat is absorbed to the coolant from the ventilation air into the vehicle interior by the cooler core 16. Since the coolant cooled by the coolant/cooler 14 flows in the radiator 13 at a minimum flow rate, minimum heat is absorbed to the coolant from outside air by the radiator 13. Since the coolant heated by the coolant/heater 15 flows in the heater core 17, the ventilation air into the vehicle interior is heated by the heater core 17.

That is, the refrigerant in the refrigeration cycle 21 absorbs heat from the ventilation air into the vehicle interior by the cooler core 16 while absorbing heat from outside air by the radiator 13, and then the heat is radiated to the coolant by the coolant/heater 15. Thus, it is possible to realize a heat pump operation for pumping the heat of ventilation air into the vehicle interior and the outside air.

In step S192, the air mix door 55 is operated at a position for performing maximum heating (MAX HOT). The position of the air mix door 55 for performing maximum heating is a position at which the heater core bypass passage 51a is fully closed. When the air mix door 55 is operated at the position for performing maximum heating, the whole amount of ventilation air flowing out of the cooler core 16 is heated while the ventilation air flows in the heater core 17.

When a variation in refrigeration cycle (variation in high-pressure refrigerant temperature or variation in low-pressure refrigerant temperature) according to an environmental variation (rapid variation in outside air temperature, or mainly variation in volume of air flowing in the radiator 13 due to the variation of vehicle speed) during vehicle use is not controlled by the refrigerant flow control of the compressor 22, the blowout air temperature may be temporarily controlled by controlling the opening degree of the air mix door 55. This is because the method of controlling the opening degree of the air mix door 55 has better response compared to the refrigerant flow control of the compressor 22.

In step S193, the refrigerant discharge capability of the compressor 22 (specifically, the speed of rotation of the compressor 22) is controlled such that the blowout air temperature TAV is close to the target blowout air temperature TAO. Specifically, when the blowout air temperature TAV exceeds the target blowout air temperature TAO, the blowout air temperature TAV is lowered by decreasing the speed of rotation of the compressor 22. When the blowout air temperature TAV is less than the target blowout air temperature TAO, the blowout air temperature TAV is increased by increasing the speed of rotation of the compressor 22.

In step S193, instead of the blowout air temperature TAV, a variety of temperatures associated with the blowout air temperature TAV (e.g. the coolant temperature flowing into the heater core 17) may be used.

In step S194, the flow rate of coolant circulated in the radiator 13 (radiator water flow rate) is controlled such that the surface temperature TC of the cooler core 16 is close to the target surface temperature TCO.

Specifically, when the surface temperature TC of the cooler core 16 exceeds the target surface temperature TCO, the surface temperature TC of the cooler core 16 is lowered in such a manner that the flow rate of coolant circulated in the radiator 13 is decreased by operating the first and second switching valves 18 and 19 such that the opening degree of the radiator passage 33 is decreased by a predetermined level. When the surface temperature TC of the cooler core 16 is less than the target surface temperature TCO, the surface temperature TC of the cooler core 16 is increased in such a manner that the flow rate of coolant circulated in the radiator 13 is increased by operating the first and second switching valves 18 and 19 such that the opening degree of the radiator passage 33 is increased by a predetermined level.

Consequently, the flow rate of coolant circulated in the radiator 13 is regulated such that the surface temperature TC of the cooler core 16 is close to the target surface temperature TCO, and it is possible to prevent condensate adhered to the surface of the cooler core 16 from being frozen and evaporated.

In step S194, instead of the surface temperature TC of the cooler core 16, a variety of temperatures associated with the surface temperature TC of the cooler core 16 (e.g. the temperature of ventilation air flowing out of the cooler core 16) may be used In step S194, instead of increasing or decreasing of the opening degree of the radiator passage 33 by a predetermined level by the first and second switching valves 18 and 19, the time-average flow rate of coolant circulated in the radiator 13 may be regulated by intermittently opening and closing the radiator passage 33 by the first and second switching valves 18 and 19. The flow rate of coolant circulated in the radiator 13 may be regulated by controlling the coolant discharge capability of the first pump 11 (specifically, the speed of rotation of the first pump 11).

In step S194, instead of regulating the flow rate of coolant circulated in the radiator 13, the flow rate of outside air flowing in the radiator 13 may be regulated. Specifically, the flow rate of outside air flowing in the radiator 13 may be regulated by controlling the operation of the exterior blower 20.

In the heat absorption mode, since the ventilation air, which is cooled and dehumidified by the cooler core 16, is heated by the heater core 17 and is blown into the vehicle interior, the vehicle interior may be dehumidified and heated.

In the heat absorption mode, a heat source for heating the ventilation air, which is cooled and dehumidified by the cooler core 16, by the heater core 17 may use both heat absorbed to the coolant from the ventilation air into the vehicle interior by the cooler core 16 and heat absorbed to the coolant from outside air by the radiator 13. Therefore, the vehicle interior may be heated with higher heating capability compared to the heat radiation mode.

In the heat absorption mode, since the flow rate of coolant circulated in the radiator 13 is regulated and the flow rate of coolant flowing in the cooler core 16 is not regulated, the flow rate of coolant flowing in the cooler core 16 may be increased, compared to when regulating the flow rate of coolant flowing in the cooler core 16 as in the frost restriction mode. Therefore, the cooling capability (dehumidification capability) of the cooler core 16 may be high compared to the frost restriction mode.

In the embodiment, in the heat absorption mode and the heat radiation mode, the controller 60 regulates the flow rate of at least one of outside air and coolant flowing in the radiator 13 such that the temperature TC associated with the temperature of the ventilation air cooled by the cooler core 16 is close to the first target temperature TCO. Consequently, in the heat absorption mode and the heat radiation mode, the temperature of the cooler core 16 may be properly controlled.

The controller 60 may regulate the flow rate of at least one of outside air and coolant flowing in the radiator 13 such that the temperature TH or TAV associated with the temperature of the ventilation air heated by the heater core 17 is close to the first target temperature THO or TAO.

That is, the controller 60 may regulate the flow rate of heat medium flowing in the heat transfer device 13 such that the temperature TC, TH, or TAV associated with the regulated temperature of the ventilation air by the heat medium/air heat exchanger 16 or 17 is close to the first target temperature TCO, THO, or TAO.

In the embodiment, in the heat absorption mode, the controller 60 regulates the flow rate of at least one of outside air and coolant flowing in the radiator 13 such that the temperature TC associated with the temperature of the ventilation air cooled by the cooler core 16 is close to the first target temperature TCO, and regulates the flow rate of refrigerant discharged from the compressor 22 such that the temperature associated with the blowout air temperature TH or TAV is close to, or approaches, the second target temperature THO or TAO.

Consequently, in the heat absorption mode, the surface temperature of the cooler core 16 and the blowout air temperature in the vehicle interior may be properly controlled.

The temperature associated with the temperature of ventilation air cooled by the cooler core 16 refers to a temperature itself of ventilation air cooled by the cooler core 16, or a temperature associated with the surface temperature TC of the cooler core 16, a temperature associated with the coolant temperature flowing in the cooler core 16, or the like.

The temperature associated with the blowout air temperature TAV is a temperature associated with the temperature of ventilation air which has a temperature regulated by at least one heat exchanger of the cooler core 16 and the heater core 17 and is blown into the vehicle interior. Specifically, the temperature associated with the blowout air temperature TAV refers to a temperature TAV of mixed air of the ventilation air flowing in the heater core 17 and the ventilation air flowing by bypassing the heater core 17, a temperature TH of ventilation air heated by the heater core 17, a temperature of heat medium flowing into the heater core 17, a temperature of ventilation air flowing by bypassing the heater core 17, or the like.

The first target temperature TCO is preferably set as a temperature in the temperature range in which frost does not occur in the cooler core 16 and the condensate adhered to the surface of the cooler core 16 is not evaporated. In the embodiment, the first target temperature TCO uses the target surface temperature TCO of the cooler core 16.

The second target temperature TAO is preferably set as a blowout air temperature that causes the vehicle air conditioner to be required in order to maintain the vehicle interior at a predetermined temperature. In the embodiment, the second target temperature TAO uses the target blowout air temperature TAO.

In the embodiment, in the heat radiation mode, the controller 60 regulates the flow rate of refrigerant discharged from the compressor 22 such that the temperature TC associated with the temperature of the ventilation air cooled by the cooler core 16 is close to the second target temperature TCO, and regulates the flow rate of at least one of outside air and coolant flowing in the radiator 13 such that the temperature associated with the blowout air temperature TAV is close to the first target temperature TAO.

Consequently, in the heat radiation mode, the surface temperature of the cooler core 16 and the blowout air temperature in the vehicle interior may be properly controlled.

In the embodiment, in the frost restriction mode, the controller 60 regulates the flow rate of coolant flowing in the cooler core 16 such that the temperature TC associated with the temperature of the ventilation air cooled by the cooler core 16 is close to the first target temperature TCO. Consequently, in the frost restriction mode, the temperature of the cooler core 16 may be properly controlled.

The controller 60 may regulate the flow rate of coolant flowing in the heater core 17 such that the temperature TH or TAV associated with the temperature of the ventilation air heated by the heater core 17 is close to the first target temperature THO or TAO.

That is, the controller 60 may regulate the flow rate of heat medium flowing in the heat transfer device 13 such that the temperature TC, TH, or TAV associated with the regulated temperature of the ventilation air by the heat medium/air heat exchanger 16 or 17 is close to the first target temperature TCO, THO, or TAO.

In the embodiment, in the frost restriction mode, the controller 60 regulates the flow rate of coolant flowing in the cooler core 16 such that the temperature TC associated with the temperature of the ventilation air cooled by the cooler core 16 is close to the first target temperature TCO, and regulates the flow rate of refrigerant discharged from the compressor 22 such that the temperature associated with the blowout air temperature TH or TAV is close to the second target temperature THO or TAO.

Consequently, in the frost restriction mode, the surface temperature of the cooler core 16 and the blowout air temperature in the vehicle interior may be properly controlled.

In the embodiment, in the cooling mode, the controller 60 regulates the flow rate of refrigerant discharged from the compressor 22 such that the temperature TC associated with the temperature of the ventilation air cooled by the cooler core 16 is close to the first target temperature TCO, and adjusts the ratio of air volume between ventilation air flowing in the heater core 17 and ventilation air flowing by bypassing the heater core 17 in the ventilation air cooled by the cooler core 16.

Consequently, in the cooling mode, the surface temperature of the cooler core 16 and the blowout air temperature in the vehicle interior may be properly controlled.

In addition, in the cooling mode, the controller 60 may regulate the flow rate of at least one of outside air and coolant flowing in the radiator 13.

Thus, since the capability for radiating heat to outside air from the coolant in the radiator 13 may be controlled, the temperature of air blown from the heater core 17 may be stabilized and the blowout air temperature TAV may be efficiently controlled. In addition, the variation in blowout air temperature according to an environmental variation (rapid variation in outside air temperature, or mainly variation in volume of air flowing in the radiator 13 due to the variation of vehicle speed) during vehicle use may be reduced by throttling the flow rate of at least one of outside air and coolant flowing in the radiator 13.

In the embodiment, in the heat radiation mode, when the flow rate of outside air or coolant flowing in the radiator 13 is determined to be less than the predetermined amount, and the blowout air temperature TAV is determined to be less than the second target temperature TAO, the coolant cooled by the coolant/cooler 14 is switched so as to flow in the radiator 13 by the first and second switching valves 18 and 19. Also, the controller 60 regulates the flow rate of at least one of outside air and coolant flowing in the radiator 13 such that the temperature TC associated with the temperature of the ventilation air cooled by the cooler core 16 is close to the first target temperature TCO, and regulates the flow rate of refrigerant discharged from the compressor 22 such that the temperature associated with the blowout air temperature TAV is close to the second target temperature TAO.

Thus, when a quantity of heat for heating is insufficient in the heat radiation mode, the heat radiation mode may be switched to the heat absorption mode in order to secure the quantity of heat for heating.

In the heat radiation mode, when the flow rate of outside air or coolant flowing in the radiator 13 is determined to be less than the predetermined amount, and the temperature associated with the blowout air temperature TAV is determined to be less than the second target temperature TAO, the coolant heated by the condenser 15 is switched so as not to flow in the radiator 13 by the first and second switching valves 18 and 19, and then the heat radiation mode may be switched to the heat absorption mode.

In the embodiment, in the heat absorption mode, when the flow rate of outside air or coolant flowing in the radiator 13 is determined to be less than the predetermined amount, and the blowout air temperature TAV is determined to exceed the second target temperature TAO, the coolant heated by the condenser 15 is switched so as to flow in the radiator 13 by the first and second switching valves 18 and 19. Also, the controller 60 regulates the flow rate of refrigerant discharged from the compressor 22 such that the temperature TC associated with the temperature of the ventilation air cooled by the cooler core 16 is close to the first target temperature TCO, and regulates the flow rate of at least one of outside air and coolant flowing in the radiator 13 such that the temperature associated with the blowout air temperature TAV is close to the second target temperature TAO.

Thus, when a quantity of heat for heating is excessive in the heat absorption mode, the heat absorption mode may be switched to the heat radiation mode in order to radiate heat to outside air by the radiator 13.

In the heat absorption mode, when the flow rate of outside air or coolant flowing in the radiator 13 is determined to be less than the predetermined amount, and the temperature associated with the blowout air temperature TAV is determined to exceed the second target temperature TAO, the coolant cooled by the coolant/cooler 14 is switched so as not to flow in the radiator 13 by the first and second switching valves 18 and 19, and then the heat absorption mode may be switched to the heat radiation mode.

In the embodiment, in the heat radiation mode, when the target blowout air temperature TAO is determined to be less than the temperature TI of ventilation air flowing into the cooler core 16, the controller 60 adjusts the ratio of air volume between ventilation air flowing in the heater core 17 and ventilation air flowing by bypassing the heater core 17 in the ventilation air cooled by the cooler core 16 such that the temperature associated with the blowout air temperature TAV is close to the second target temperature TAO.

Thus, when cooling is required in the heat radiation mode, the heat radiation mode may be switched to the cooling mode in order to properly perform cooling.

In the heat radiation mode, when the target blowout air temperature TAO is determined to be less than the temperature TI of ventilation air flowing into the cooler core 16, the first and second pumps 11 and 12 and the first and second switching valves 18 and 19 may be operated such that the time flow rate of coolant, which is heated by the coolant/heater 15 and flows in the radiator 13, is increased.

In the embodiment, in the heat absorption mode, when the temperature TC associated with the temperature of ventilation air cooled by the cooler core 16 is determined to be less than the predetermined temperature TCF, the controller 60 regulates at least one of the flow rate and coolant temperature flowing in the cooler core 16 such that the temperature associated with the surface temperature TC of the cooler core 16 is close to the first target temperature TCO.

Thus, when there is a high possibility that frost (frost formation) occurs in the cooler core 16 in the heat absorption mode, the heat absorption mode may be switched to the frost restriction mode in order to prevent frost from occurring in the cooler core 16.

In the embodiment, in the frost restriction mode, when the temperature TC associated with the temperature of ventilation air cooled by the cooler core 16 is determined to exceed the predetermined temperature TCF, the controller 60 regulates the flow rate of at least one of outside air and coolant flowing in the radiator 13 such that the temperature associated with the surface temperature TC of the cooler core 16 is close to the first target temperature TCO.

Thus, when there is a low possibility that frost (frost formation) occurs in the cooler core 16 in the frost restriction mode, the frost restriction mode may be switched to the heat radiation mode in order to properly perform heating.

In the embodiment, in the cooling mode, when the target blowout air temperature TAO is determined to exceed the temperature TI of ventilation air flowing into the cooler core 16, the controller 60 regulates the flow rate of at least one of outside air and coolant flowing in the radiator 13 such that the temperature associated with the blowout air temperature TAV is close to the second target temperature TAO.

Thus, when heating is required in the cooling mode, the cooling mode may be switched to the heat radiation mode in order to properly perform heating.

In the cooling mode, when the target blowout air temperature TAO is determined to be less than the temperature TI of ventilation air flowing into the cooler core 16, the coolant heated by the condenser 15 is switched so as not to flow in the radiator 13 by the first and second switching valves 18 and 19, and then the cooling mode may be switched to the heat radiation mode.

In the embodiment, in the heat absorption mode and the heat radiation mode, the controller 60 is operated such that coolant intermittently flows in the radiator 13. Consequently, it is possible to regulate the time-average flow rate of coolant flowing in the radiator 13.

In the embodiment, in the frost restriction mode, the controller 60 is operated such that coolant intermittently flows in the cooler core 16. Consequently, it is possible to regulate the time-average flow rate of coolant flowing in the cooler core 16.

In the heat absorption mode and the heat radiation mode, the first and second switching valves 18 and 19 and the switching valve control unit 60b may be operated so as to adjust the opening degree of the radiator passage 33. Consequently, it is possible to regulate the flow rate of coolant flowing in the radiator 13.

In the frost restriction mode, the controller 60 may be operated so as to adjust the opening degree of the cooler core passage 36. Consequently, it is possible to regulate the flow rate of coolant flowing in the cooler core 16.

In the heat absorption mode and the heat radiation mode, the controller 60 may regulate the flow rate of coolant discharged from the first or second pump 11 or 12. Consequently, it is possible to regulate the flow rate of coolant flowing in the radiator 13.

In the frost restriction mode, the pump control unit 60a may regulate the flow rate of coolant discharged from the first or second pump 11 or 12. Consequently, it is possible to regulate the flow rate of coolant flowing in the cooler core 16.

In the heat absorption mode and the heat radiation mode, the controller 60 may regulate the flow rate of outside air blown by the outside air blower 20. Consequently, it is possible to regulate the flow rate of outside air flowing in the radiator 13.

In the embodiment, the cooler core 16 has at least one passage 163 in which coolant flows upward from below in the gravity direction. Consequently, it is possible to prevent frost (frost formation) from occurring in the cooler core 16.

In the embodiment, the cooler core 16 has a coolant passage 163 in which coolant flows to upstream from downstream in the air flow direction. Consequently, it is possible to prevent frost (frost formation) from occurring in the cooler core 16.

[Second Embodiment]

In the above first embodiment, the flow rate of coolant flowing in the cooler core 16 is controlled in the frost restriction mode. However, in the present embodiment, the coolant temperature flowing in the cooler core 16 is controlled in the frost restriction mode.

Figure 17:
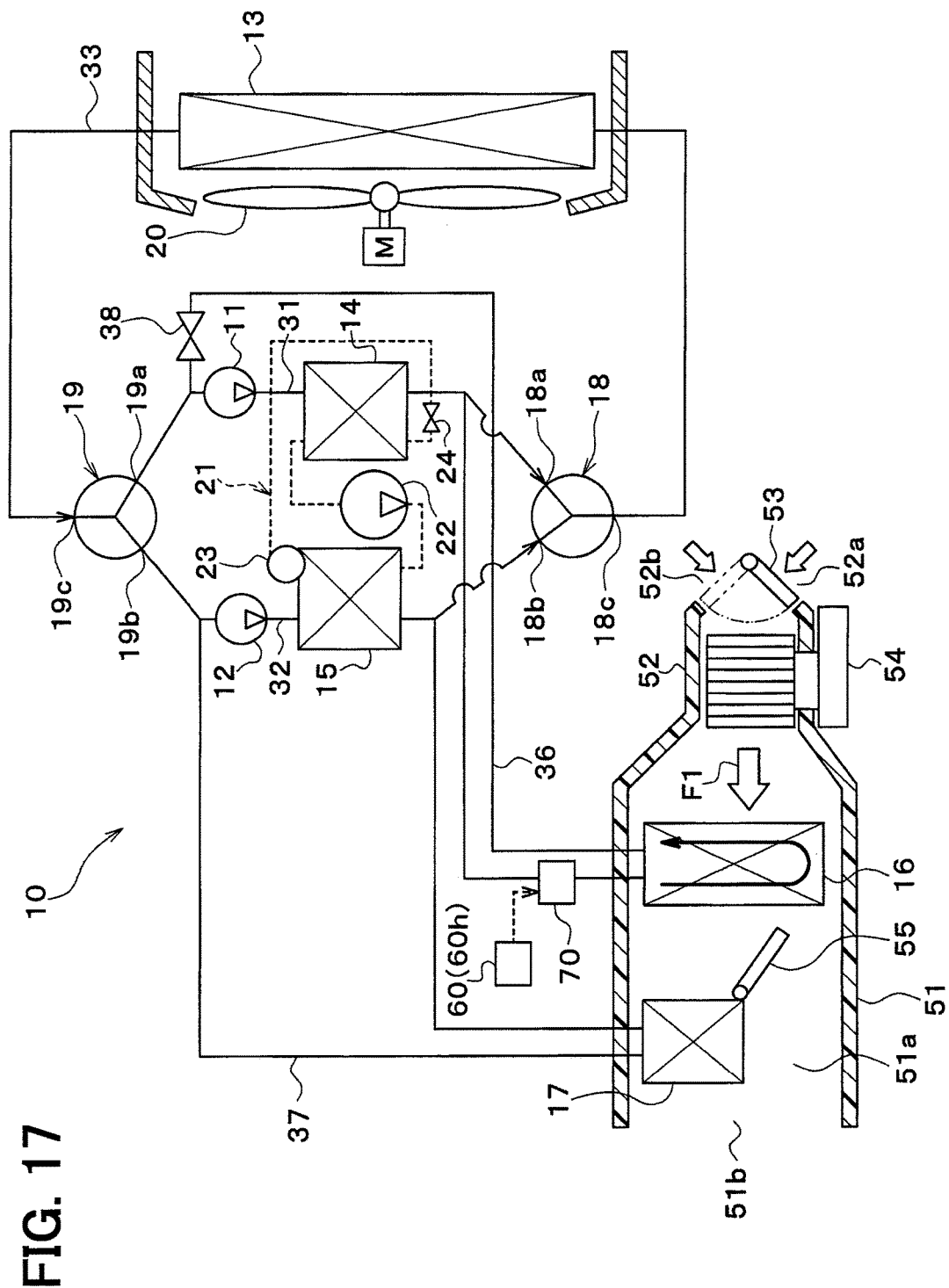
FIG. 17 is a diagram illustrating an overall configuration of a vehicle thermal management system according to a second embodiment.

As illustrated in FIG. 17, an electric heater 70 is disposed in the cooler core passage 36. The electric heater 70 is a heating element which generates heat by electric power supplied. The coolant flowing in the cooler core passage 36 is heated by heat generated by the electric heater 70. The operation of the electric heater 70 is controlled by the controller 60.

In the embodiment, the configuration (hardware and software) for controlling the operation of the electric heater 70 in the controller 60 is referred to as an electric heater control unit 60h. The electric heater control unit 60h may be configured independently of the controller 60. The electric heater 70 and the electric heater control unit 60h are cooler core adjustment parts (heat exchanger adjustment parts, air-cooling heat exchanger adjustment parts) which regulate the coolant temperature flowing in the cooler core 16.

In the frost restriction mode, the coolant temperature flowing in the cooler core 16 may be increased by heating the coolant using the electric heater 70.

In the embodiment, in the frost restriction mode, the controller 60 regulates the coolant temperature flowing in the cooler core 16 such that the temperature associated with the surface temperature TC of the cooler core 16 is close to, or approaches, the first target temperature TCO, and regulates the flow rate of refrigerant discharged from the compressor 22 such that the temperature associated with the blowout air temperature TAV is close to the second target temperature TAO.

Consequently, in the frost restriction mode, the surface temperature of the cooler core 16 and the blowout air temperature in the vehicle interior may be properly controlled.

[Third Embodiment]

Figure 18:
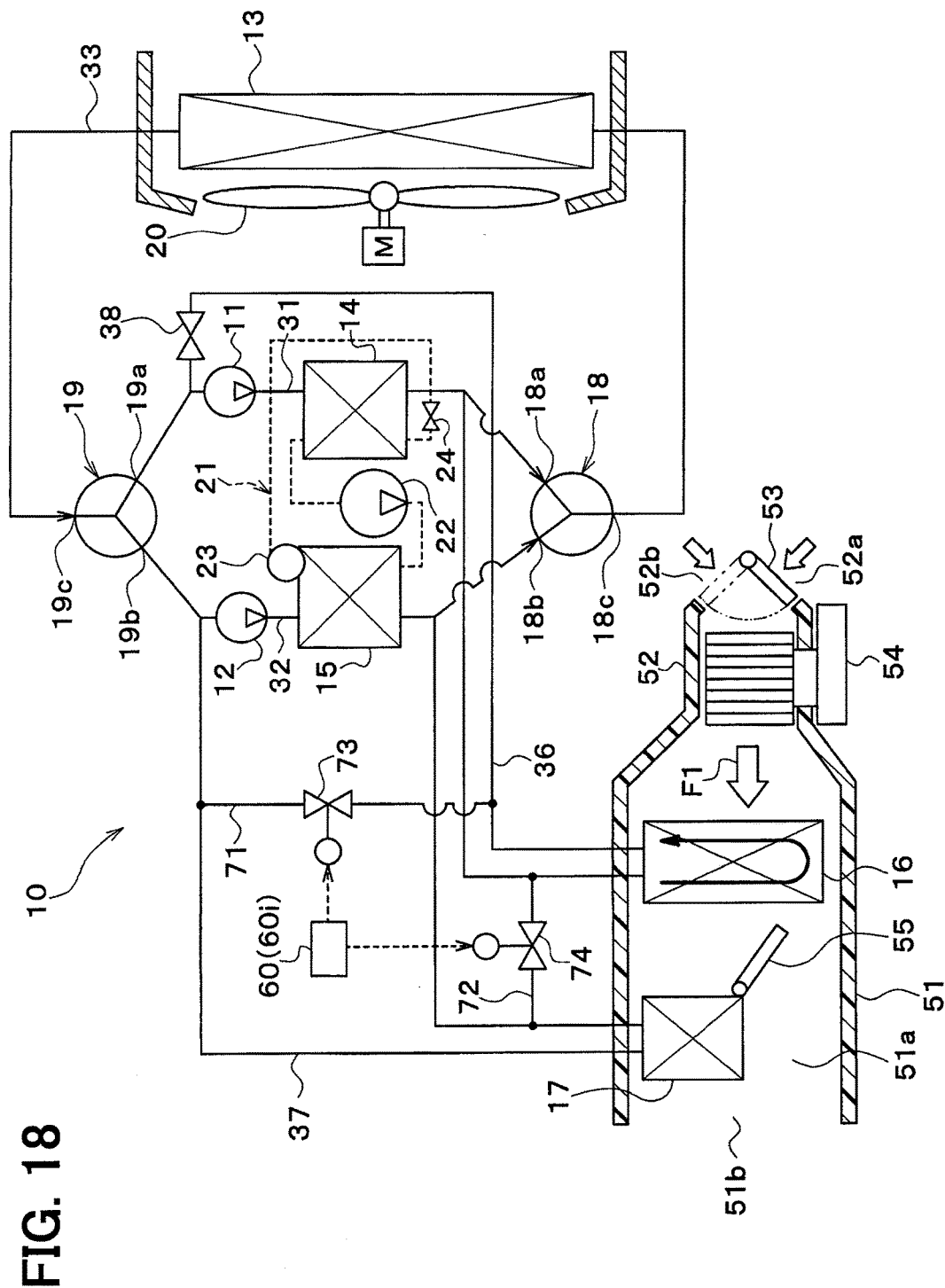
FIG. 18 is a diagram illustrating an overall configuration of a vehicle thermal management system according to a third embodiment.

In the above second embodiment, the coolant temperature flowing in the cooler core 16 is increased by heating the coolant by the electric heater 70. However, in the present embodiment, the coolant temperature flowing in the cooler core 16 is increased by mixing coolant heated by the coolant/heater 15 with coolant cooled by the coolant/cooler 14, as illustrated in FIG. 18.

A first communication passage 71, a second communication passage 72, a first communication on-off valve 73, and a second communication on-off valve 74 are added to the embodiment.

The first communication passage 71 is a passage through which the coolant inlet-side portion of the cooler core 16 in the cooler core passage 36 communicates with the coolant inlet-side portion of the cooler core 16 in the heater core passage 37.

The second communication passage 72 is a passage through which the coolant outlet-side portion of the cooler core 16 in the cooler core passage 36 communicates with the coolant outlet-side portion of the cooler core 16 in the heater core passage 37.

The first communication on-off valve 73 is an electromagnetic valve which opens and closes the first communication passage 71. The operation of the first communication on-off valve 73 is controlled by the controller 60. The second communication on-off valve 74 is an electromagnetic valve which opens and closes the second communication passage 72. The operation of the second communication on-off valve 74 is controlled by the controller 60.

In the embodiment, the configuration (hardware and software) for controlling the operations of the first and second communication on-off valves 73 and 74 in the controller 60 is referred to as a communication control unit 60i. The communication control unit 60i may be configured independently of the controller 60. The first and second communication on-off valves 73 and 74 and the communication control unit 60i are cooler core adjustment parts (heat exchanger adjustment parts, air-cooling heat exchanger adjustment parts) which regulate the coolant temperature flowing in the cooler core 16.

When the first communication on-off valve 73 opens the first communication passage 71, and the second communication on-off valve 74 opens the second communication passage 72, the coolant heated by the coolant/heater 15 is mixed with the coolant cooled by the coolant/cooler 14, and the coolant temperature flowing in the cooler core 16 is also increased.

By adjusting the opening degree of at least one of the first and second communication on-off valves 73 and 74, the mixing ratio of the coolant cooled by the coolant/cooler 14 and the coolant heated by the coolant/heater 15 is adjusted, and the coolant temperature flowing in the cooler core 16 is also regulated.

The coolant temperature flowing in the cooler core 16 may be increased by mixing the coolant heated by the coolant/heater 15 by the operations of the first and second switching valves 18 and 19.

In the embodiment, in the frost restriction mode, the controller 60 regulates the coolant temperature flowing in the cooler core 16 such that the temperature associated with the surface temperature TC of the cooler core 16 is close to the first target temperature TCO, and regulates the flow rate of refrigerant discharged from the compressor 22 such that the temperature associated with the blowout air temperature TAV is close to the second target temperature TAO.

Accordingly, the same operation and effect as the above second embodiment can be obtained.

[Fourth Embodiment]

Figure 19:
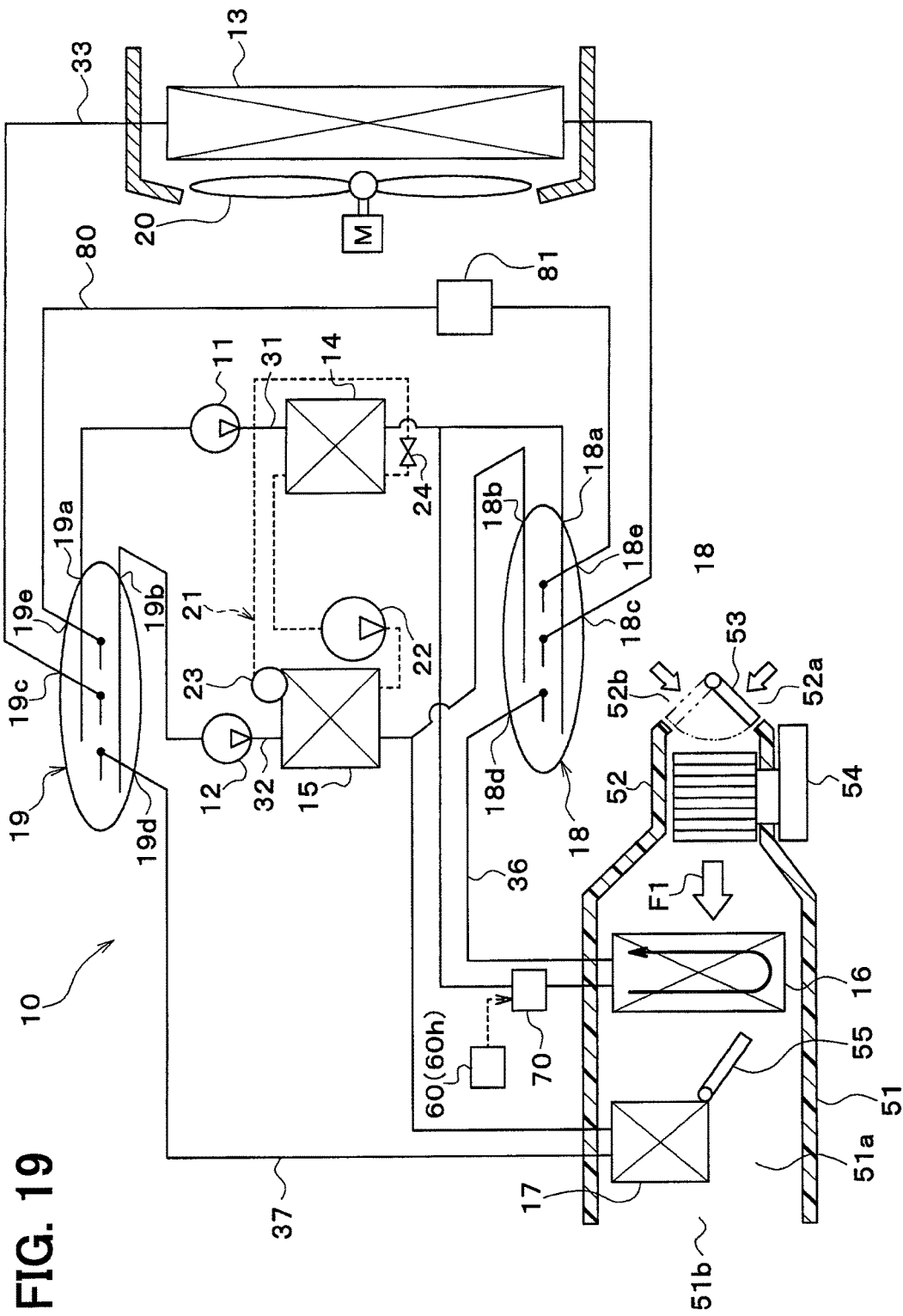
FIG. 19 is a diagram illustrating an overall configuration of a vehicle thermal management system according to a fourth embodiment.

In the above second embodiment, one end of the cooler core passage 36 is connected to the coolant suction-side portion of the first pump 11 in the first pump passage 31, and one end of the heater core passage 37 is connected to the coolant suction-side portion of the second pump 12 in the second pump passage 32. However, in the present embodiment, one end of the cooler core passage 36 is connected to a third inlet 18d of a first switching valve 18, and one end of the heater core passage 37 is connected to a third outlet 19d of a second switching valve 19, as illustrated in FIG. 19.

The first switching valve 18 may regulate the flow rate of coolant flowing in the cooler core passage 36. The second switching valve 19 may regulate the flow rate of coolant flowing in the heater core passage 37.

One end of a device passage 80 is connected to a second outlet 18e of the first switching valve 18. The other end of the device passage 80 is connected to a second inlet 19e of the second switching valve 19.

A device 81 is disposed in the device passage 80. The device 81 has a passage in which coolant is circulated, and is a heat transfer device (device to be temperature regulated) which transfers heat between the same and coolant. For example, the device 81 may include an inverter, a battery, a battery temperature-regulation heat exchanger, a traveling electric motor, an engine device, a cold thermal storage, a waste heat recovery heat exchanger, a coolant/coolant heat exchanger, etc.

The inverter is a power conversion device which converts DC power supplied from a battery into AC power to output the converted power to a traveling electric motor.

The battery temperature-regulation heat exchanger is a heat exchanger (air/heat medium heat exchanger) which is disposed on a ventilation path into a battery to exchange heat between ventilation air and coolant.

The engine device may include a turbocharger, an intercooler, an EGR cooler, a CVT warmer, a CVT cooler, an exhaust heat recovery device, etc.

The turbocharger is a supercharger which supercharges air introduced into an engine (intake air). The intercooler is an intake air cooler (intake air/heat medium heat exchanger) which exchanges heat between coolant and high-temperature supercharged intake air compressed by a turbocharger so as to cool the supercharged intake air.

The EGR cooler is an exhaust gas/coolant heat exchanger (exhaust gas/heat medium heat exchanger) which exchanges heat between coolant and engine exhaust gas (exhaust gas) returned to the intake side of an engine so as to cool the exhaust gas.

The CVT warmer is a lubricant/coolant heat exchanger (lubricant/heat medium heat exchanger) which exchanges heat between coolant and lubricant (CVT oil) lubricating a CVT (Continuously Variable Transmission) to heat the CVT oil.

The CVT cooler is a lubricant/coolant heat exchanger (lubricant/heat medium heat exchanger) which exchanges heat between CVT oil and coolant to cool the CVT oil.

The exhaust heat recovery device is an exhaust gas/coolant heat exchanger (exhaust gas/heat medium heat exchanger) which exchanges heat between exhaust gas and coolant so as to absorb exhaust heat to the coolant.

The cold thermal storage stores hot heat or cold heat of coolant. For example, the cold thermal storage may include a chemical thermal storage medium, a heat insulation tank, a latent heat storage (paraffin or hydrate material), etc.

The waste heat recovery heat exchanger is a heat exchanger which recovers heat (cold heat or hot heat) discarded to the outside through ventilation. For example, the heat recovery heat exchanger recovers heat (cold heat or hot heat) discarded to the outside through ventilation, and thus power required for cooling/heating may be reduced.

The coolant/coolant heat exchanger is a heat exchanger which exchanges heat between coolant and coolant. For example, the coolant/coolant heat exchanger exchanges heat between coolant in the vehicle thermal management system 10 (coolant circulated by the first or second pump 11 or 12) and coolant in the engine cooling circuit (circuit in which coolant for engine cooling is circulated), and thus heat may be exchanged between the vehicle thermal management system 10 and the engine cooling circuit.

According to the embodiment, the flow rate of coolant flowing in the cooler core 16 and the flow rate of coolant flowing in the heater core 17 may be regulated by the first and second switching valves 18 and 19.

It is possible to switch the state in which the coolant cooled by the coolant/cooler 14 flows in the device 81, and the state in which the coolant heated by the coolant/heater 15 flows in the device 81, by the first and second switching valves 18 and 19. Accordingly, the device 81 may be adjusted to have a predetermined temperature.

Similarly to the above second embodiment, since an electric heater 70 is disposed in the cooler core passage 36 in the present embodiment, the coolant temperature flowing in the cooler core 16 may be increased by heating the coolant using the electric heater 70.

[Fifth Embodiment]

Figure 20:
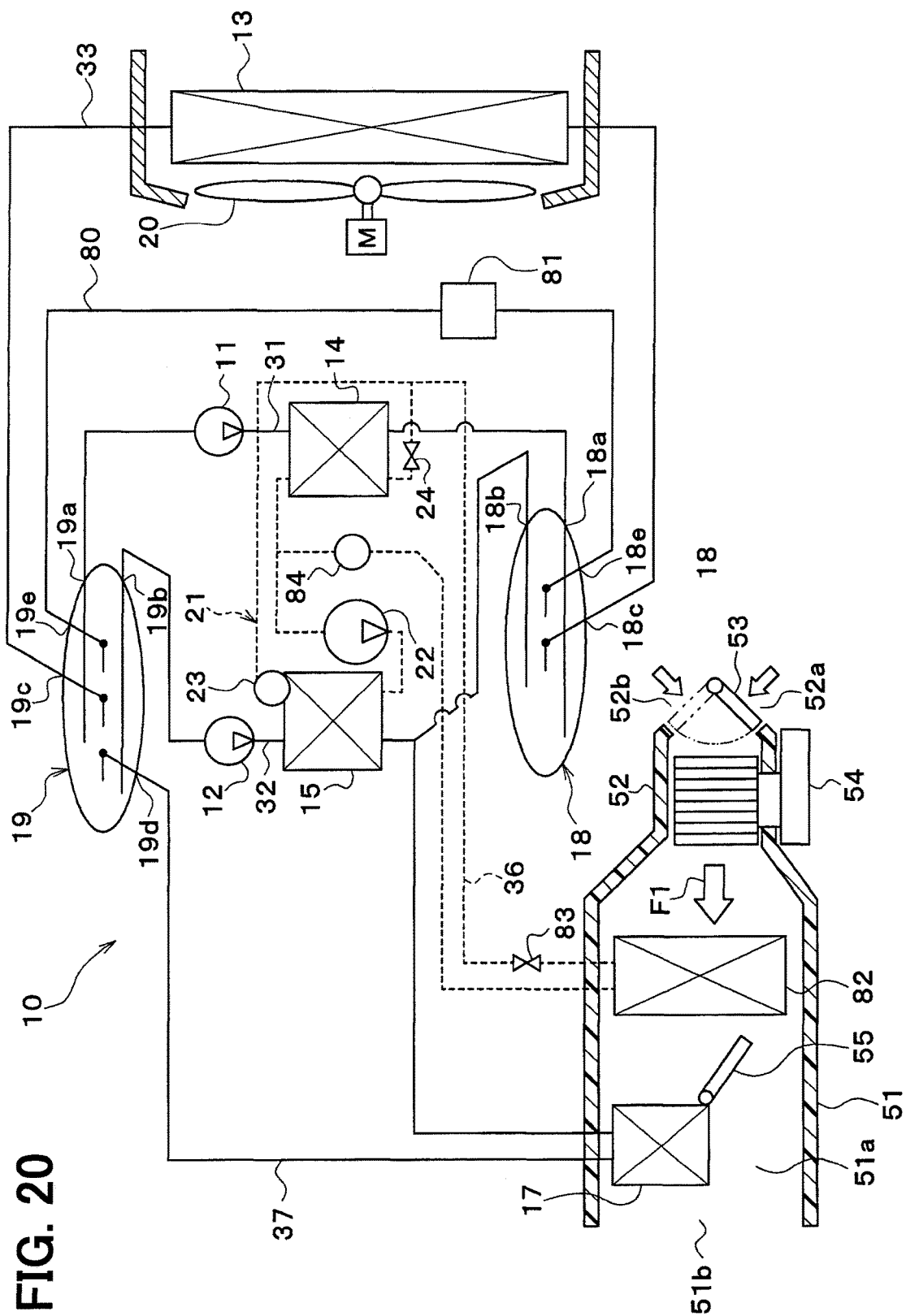
FIG. 20 is a diagram illustrating an overall configuration of a vehicle thermal management system according to a fifth embodiment.

As illustrated in FIG. 20, instead of the cooler core 16, a second evaporator 82 may be disposed in the case 51 of the interior air-conditioning unit 50. The second evaporator 82 is an air-cooling heat exchanger which exchanges heat between low-pressure side refrigerant in the refrigeration cycle 21 and ventilation air into the vehicle interior so as to cool the ventilation air into the vehicle interior.

The refrigeration cycle 21 has a second expansion valve 83 and a pressure regulation valve 84. The second expansion valve 83 is a decompression device which decompresses and expands liquid-phase refrigerant flowing out of the receiver 23. The pressure regulation valve 84 is a pressure regulation part which regulates the refrigerant evaporation pressure in the second evaporator 82.

The second evaporator 82, the second expansion valve 83, and the pressure regulation valve 84 are arranged in parallel with the expansion valve 24 and the coolant/cooler 14 in the refrigerant flow direction of the refrigeration cycle 21. The second evaporator 82, the second expansion valve 83, and the pressure regulation valve 84 are arranged in order of the second expansion valve 83, the second evaporator 82, and the second expansion valve 83.

[Sixth Embodiment]

Figure 21:
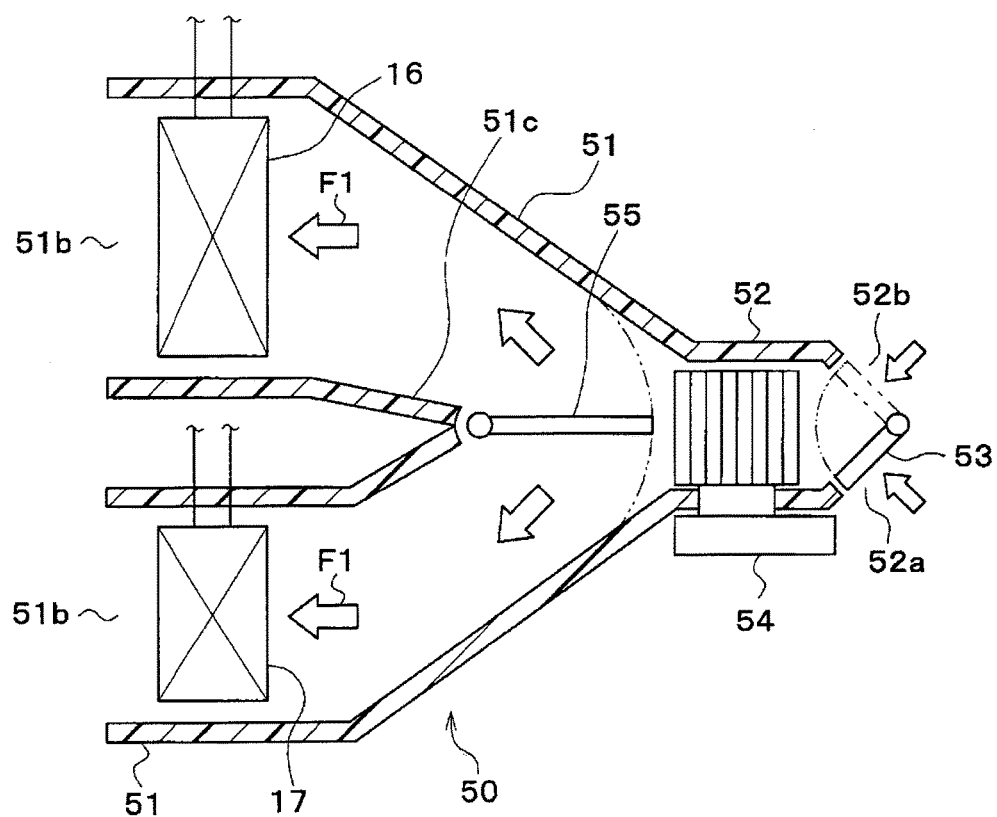
FIG. 21 is a cross-sectional view illustrating main parts of an interior air-conditioning unit according to a sixth embodiment.

In the above embodiments, the cooler core 16 and the heater core 17 are arranged in series in the air flow direction in the case 51 of the interior air-conditioning unit 50. However, in the present embodiment, a cooler core 16 and a heater core 17 are arranged in parallel in the air flow direction, as illustrated in FIG. 21.

The case 51 has a partition wall 51c which partitions an air passage at the cooler core 16 and an air passage at the heater core 17. An air mix door 55 is arranged downstream of the interior blower 54 in the air flow direction and is arranged upstream of the cooler core 16 and the heater core 17 in the air flow direction.

In the embodiment, the same operation and effect as the above embodiments can be obtained.

[Seventh Embodiment]

Figure 22:
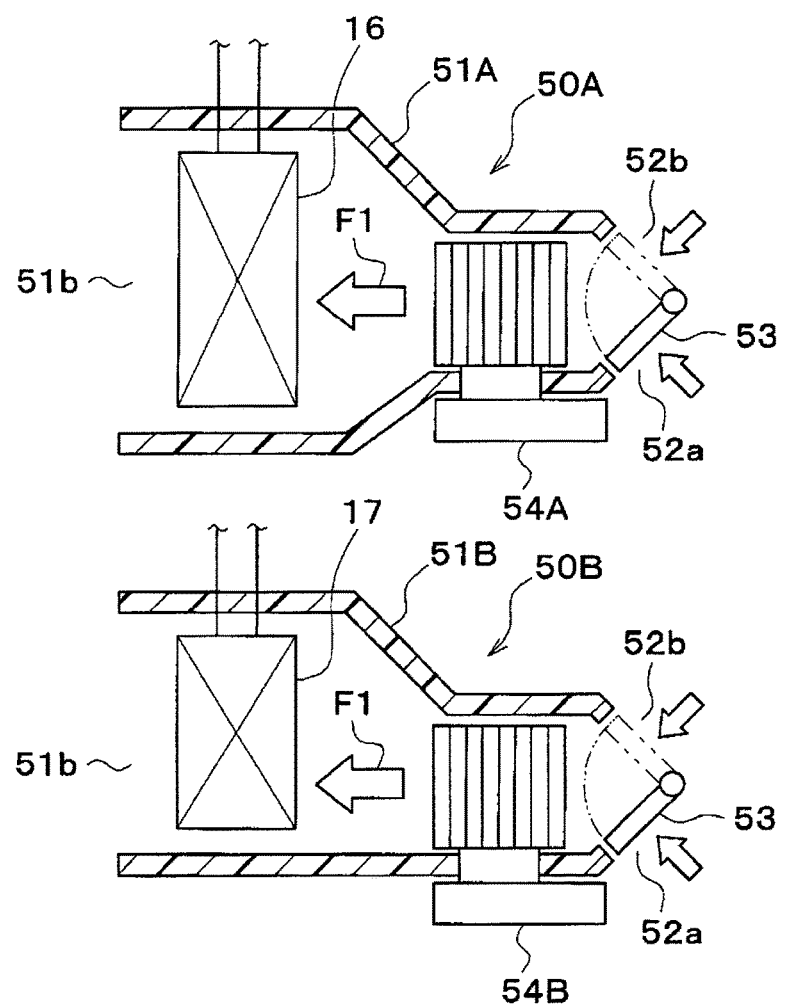
FIG. 22 is a cross-sectional view illustrating main parts of an interior air-conditioning unit according to a seventh embodiment.

In the above embodiments, the cooler core 16 and the heater core 17 are accommodated in the common interior air-conditioning unit 50. However, in the present embodiment, a cooler core 16 is accommodated in a cooler unit 50A, and a heater core 17 is accommodated in a heater unit 50B, as illustrated in FIG. 22.

An interior blower 54A and the cooler core 16 are disposed in a case 51A of the cooler unit 50A. An interior blower 54B and the heater core 17 are disposed in a case 51B of the heater unit 50B.

In the embodiment, the same operation and effect as the above embodiments can be obtained.

[Eighth Embodiment]

Figure 23:
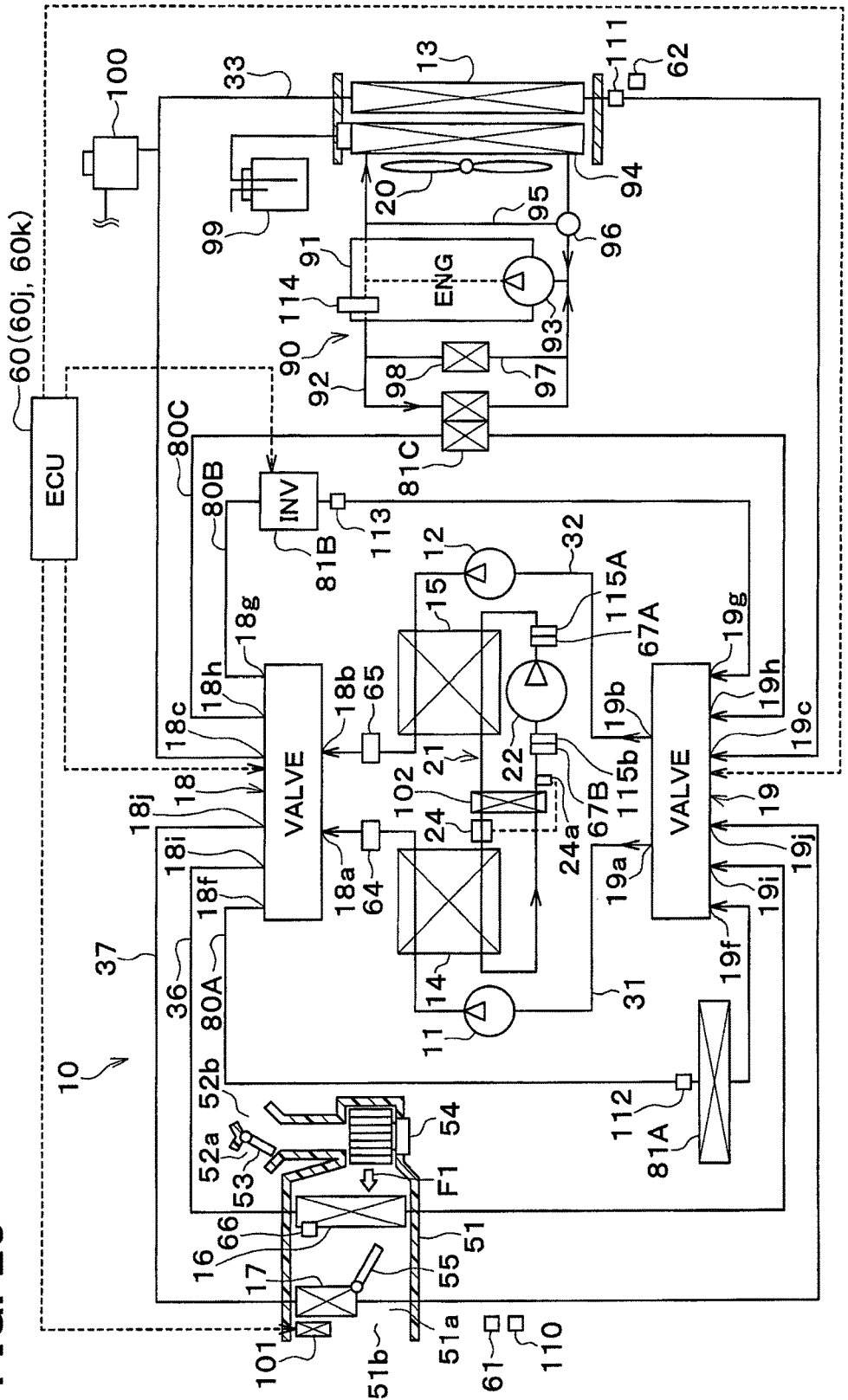
FIG. 23 is a diagram illustrating an overall configuration of a vehicle thermal management system according to an eighth embodiment.

In the embodiment, a battery temperature-regulation heat exchanger 81A, an inverter 81B, and a coolant/coolant heat exchanger 81C are provided as the above-mentioned heat transfer device 81, as illustrated in FIG. 23. Each of the battery temperature-regulation heat exchanger 81A, the inverter 81B, and the coolant/coolant heat exchanger 81C has a passage in which coolant is circulated, and is a heat transfer device (device to be temperature regulated) which transfers heat between the same and coolant.

The battery temperature-regulation heat exchanger 81A is disposed on a ventilation path into a battery, and is a heat exchanger (air/heat medium heat exchanger) which exchanges heat between ventilation air and coolant. The battery temperature-regulation heat exchanger 81A is disposed in a battery heat exchange passage 80A.

One end of the battery heat exchange passage 80A is connected to a battery heat exchange outlet 18f of a first switching valve 18. The other end of the battery heat exchange passage 80A is connected to a battery heat exchange inlet 19f of a second switching valve 19.

The inverter 81B is a power conversion device which converts DC power supplied from a battery into AC voltage to output the AC voltage to a traveling electric motor. The inverter 81B is disposed in an inverter passage 80B.

One end of the inverter passage 80B is connected to an inverter outlet 18g of the first switching valve 18. The other end of the inverter passage 80B is connected to an inverter inlet 19g of the second switching valve 19.

The coolant/coolant heat exchanger 81C is a heat exchanger (heat medium/heat medium heat exchanger) which exchanges heat between coolant in a vehicle thermal management system 10 (coolant circulated by a first or second pump 11 or 12) and coolant in an engine cooling circuit 90 (engine heat medium). The coolant/coolant heat exchanger 81C is disposed in a coolant/coolant heat exchanger passage 80C.

One end of the coolant/coolant heat exchanger passage 80C is connected to a coolant/coolant heat exchanger outlet 18h of the first switching valve 18. The other end of the coolant/coolant heat exchanger passage 80C is connected to a coolant/coolant heat exchanger inlet 19h of the second switching valve 19.

In the embodiment, one end of a cooler core passage 36 is connected to a cooler core outlet 18i of the first switching valve 18. The other end of the cooler core passage 36 is connected to a cooler core inlet 19i of the second switching valve 19.

One end of a heater core passage 37 is connected to a heater core outlet 18j of the first switching valve 18. The other end of the heater core passage 37 is connected to a heater core inlet 19j of the second switching valve 19.

The first switching valve 18 switches a state in which coolant discharged from the first pump 11 flows into each of the devices 13, 16, 17, 81A, 81B, and 81C connected to the outlets thereof, a state in which coolant discharged from the second pump 12 flows into each of them, and a state in which the coolant discharged from the first pump 11 and the coolant discharged from the second pump 12 do not flow into each of them.

The second switching valve 19 switches a state in which coolant flows to the first pump 11 from each of the devices 13, 16, 17, 81A, 81B, and 81C connected to the inlets thereof, a state in which coolant flows to the second pump 12 from each of them, and a state in which the coolant does not to the first and second pumps 11 and 12 from each of them.

Each opening degree of the first and second switching valves 18 and 19 is adjustable. Thus, it is possible to adjust the amount of coolant flowing in each of the devices 13, 16, 17, 81A, 81B, and 81C.

The first and second switching valves 18 and 19 mix the coolant discharged from the first pump 11 and the coolant discharged from the second pump 12 at any flow rate so that the mixed coolant may flow into each of the devices 13, 16, 17, 81A, 81B, and 81C.

The engine cooling circuit 90 is a coolant circulation circuit for cooling an engine 91. The engine cooling circuit 90 has a circulation flow passage 92 in which coolant is circulated. The engine 91, a third pump 93, an engine radiator 94, and the coolant/coolant heat exchanger 81C are disposed in the circulation flow passage 92.

The third pump 93 is an electric pump which introduces and discharges coolant. The third pump 93 may be a mechanical pump which is driven by power output from the engine 91.

The engine radiator 94 is a radiation heat exchanger (air/heat medium heat exchanger) which exchanges heat between coolant and outside air so as to radiate the heat of coolant to outside air.

The circulation flow passage 92 is connected to a radiator bypass passage 95. The radiator bypass passage 95 is a passage in which coolant flows by bypassing the engine radiator 94.

A thermostat 96 is disposed in the connection portion between the radiator bypass passage 95 and the circulation flow passage 92. The thermostat 96 is a coolant temperature responsive valve configured by a mechanical mechanism which displaces a valve body by a thermo-wax (thermosensitive member), the volume of which is changed depending on temperature, so as to open and close a coolant passage. Specifically, when the coolant temperature exceeds a predetermined temperature (e.g. is equal to or higher than 80° C.), the thermostat 96 closes the radiator bypass passage 95. When the coolant temperature is below a predetermined temperature (e.g. is lower than 80° C.), the thermostat 96 opens the radiator bypass passage 95.

The circulation flow passage 92 is connected to an engine auxiliary flow passage 97. The engine auxiliary flow passage 97 is a passage in which coolant flows parallel with the coolant/coolant heat exchanger 81C. An engine accessory 98 is disposed in the engine auxiliary flow passage 97. The engine accessory 98 includes an oil heat exchanger, an EGR cooler, a throttle cooler, a turbo cooler, an engine auxiliary motor, etc. The oil heat exchanger is a heat exchanger which regulates the temperature of oil by exchanging heat between engine oil or transmission oil and coolant.

The EGR cooler is a heat exchanger constituting an EGR (Exhaust Gas Recirculation) device which returns a portion of exhaust gas in an engine to the intake side thereof so as to reduce a pumping loss generated in a throttle valve, and is a heat exchanger which exchanges heat between recirculation gas and coolant to regulate the temperature of recirculation gas.

The throttle cooler is a water jacket which is arranged in a throttle for cooling a throttle valve.

The turbo cooler is a cooler which exchanges heat between heat generated by a turbocharger and coolant to cool the turbocharger.

The engine auxiliary motor is a large motor disposed to rotate an engine belt even when an engine is stopped. The engine auxiliary motor is used to operate a compressor or a water pump driven by the engine belt even when the driving force of the engine is not present, or to start the engine.

The engine radiator 94 is connected with a first reservoir tank 99. The first reservoir tank 99 is an atmosphere open type container (heat medium storage means) which stores coolant. Accordingly, the pressure on the liquid surface of coolant stored in the first reservoir tank 99 becomes atmospheric pressure. The first reservoir tank 99 may be disposed such that the pressure on the liquid surface of coolant stored in the first reservoir tank 99 is a predetermined pressure (a pressure different from the atmospheric pressure).

It is possible to restrict reduction in the amount of coolant circulated in each passage because of surplus coolant in the first reservoir tank 99. The first reservoir tank 99 has a function that separates bubbles mixed in coolant into gas and liquid.

The radiator passage 33 is connected with a second reservoir tank 100. The structure and function of the second reservoir tank 100 are similar to those of the first reservoir tank 99.

In the case 51 of the interior air-conditioning unit 50 of the vehicle air conditioner, an auxiliary heater 101 is disposed downstream of the heater core 17 in the air flow direction. The auxiliary heater 101 has a PTC element (positive thermistor), and is a PTC heater (electric heater) which generates heat by electric power supplied to the PTC element so as to heat air.

The operation (heating value) of the auxiliary heater 101 is controlled by the controller 60. In the embodiment, the configuration (hardware and software) for controlling the operation of the auxiliary heater 101 in the controller 60 is referred to as an auxiliary heater control unit 60j (electric heater control unit).

The refrigeration cycle 21 includes an interior heat exchanger 102. The interior heat exchanger 102 is a heat exchanger which exchanges heat between the refrigerant flowing out of a coolant/heater 15 and the refrigerant out of a coolant/cooler 14.

The expansion valve 24 of the refrigeration cycle 21 has a thermosensitive part 24a which detects a degree of superheat of refrigerant at the outlet of the coolant/cooler 14, based on the temperature and pressure of refrigerant at the outlet of the coolant/cooler 14. The expansion valve 24 is a thermostatic expansion valve which adjusts a throttle passage area by a mechanical mechanism such that the degree of superheat of refrigerant at the outlet of the coolant/cooler 14 is in a predetermined range.

The thermosensitive part 24a is disposed of a thermistor, and the expansion valve 24 may be an electric expansion valve which adjusts a throttle passage area by an electrical mechanism such that the degree of superheat of refrigerant at the outlet of the coolant/cooler 14 is in a predetermined range.

Signals detected by a group of sensors, which consists of an inside air sensor 61, an inside air humidity sensor 110, an outside air sensor 62, a first water temperature sensor 64, a second water temperature sensor 65, a radiator water temperature sensor 111, a battery temperature sensor 112, an inverter temperature sensor 113, an engine water temperature sensor 114, cooler core temperature sensor 66, refrigerant temperature sensors 67A and 67B, refrigerant pressure sensors 115A and 115B, etc., are input to the input side of the controller 60.

The inside air humidity sensor 110 is a detection device (inside air humidity detection device) which detects the humidity of inside air. The radiator water temperature sensor 111 is a detection device (device-side heat medium temperature detection device) which detects the coolant temperature flowing in the radiator passage 33 (e.g. the coolant temperature flowing out of the radiator 13).

The battery temperature sensor 112 is a detection device (device-side heat medium temperature detection device) which detects the coolant temperature flowing in the battery heat exchange passage 80A (e.g. the coolant temperature flowing into the battery temperature-regulation heat exchanger 81A).

The inverter temperature sensor 113 is a detection device (device-side heat medium temperature detection device) which detects the coolant temperature flowing in the inverter passage 80B (e.g. the coolant temperature flowing out of the inverter 81B).

The engine water temperature sensor 114 is a detection device (device-side heat medium temperature detection device) which detects the coolant temperature circulated in the engine cooling circuit 90 (e.g. the coolant temperature flowing in the engine 91).

The refrigerant temperature sensors 67A and 67B are a discharge-side refrigerant temperature sensor 67A which detects the temperature of refrigerant discharged from the compressor 22, and a suction-side refrigerant temperature sensor 67B which detects the temperature of refrigerant introduced into the compressor 22.

The refrigerant pressure sensors 115A and 115B are a discharge-side refrigerant pressure sensor 115A which detects the pressure of refrigerant discharged from the compressor 22, and a suction-side refrigerant pressure sensor 115B which detects the pressure of refrigerant introduced into the compressor 22.

Next, the operations of the components will be described. The controller 60 switches the coolant flow mode to various modes illustrated in FIGS. 24 to 28 by operating the first and second switching valves 18 and 19. FIGS. 24 to 28 briefly illustrate a vehicle thermal management system 10 in order to facilitate the understanding thereof.

Figure 24:
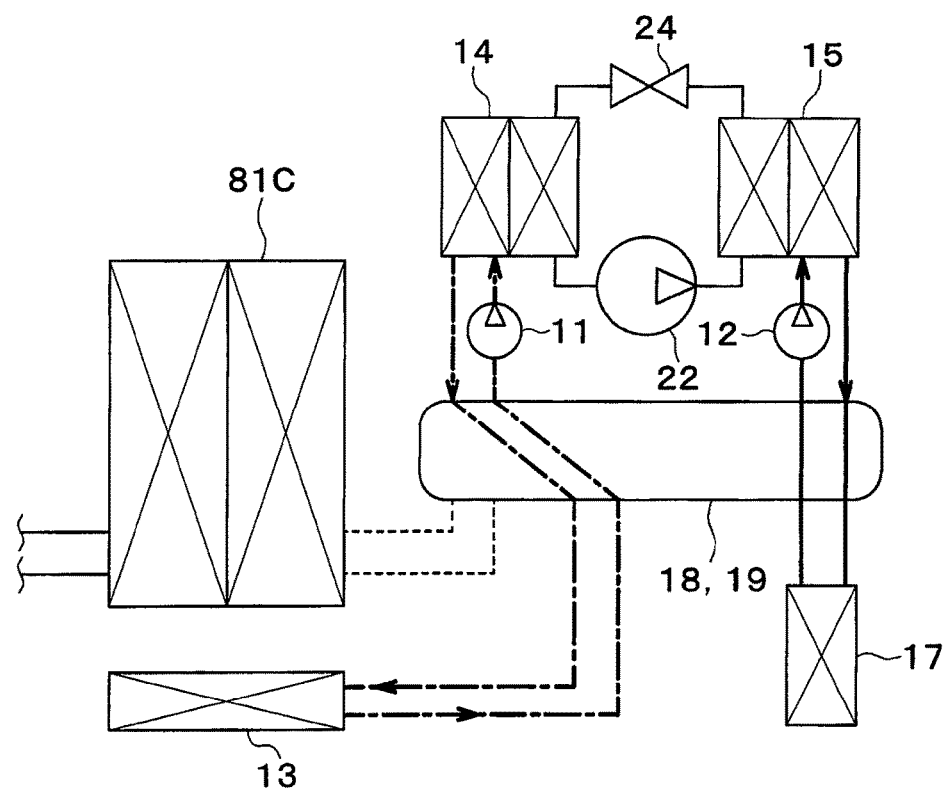
FIG. 24 is a diagram schematically illustrating a configuration of an outside air heat-absorption heat pump mode in the vehicle thermal management system according to the eighth embodiment.

In an outside air heat-absorption heat pump mode illustrated in FIG. 24, the radiator 13 is connected to the coolant/cooler 14, the heater core 17 is connected to the coolant/heater 15, and the coolant/coolant heat exchanger 81C is not connected to both the coolant/cooler 14 and the coolant/heater 15.

Accordingly, since the coolant, which is cooled by the coolant/cooler 14 to have a lower temperature than the temperature of outside air, flows in the radiator 13, heat is absorbed to the coolant from the outside air by the radiator 13. Since the coolant heated by the coolant/heater 15 flows in the heater core 17, the ventilation air into the vehicle interior is heated by the heater core 17.

That is, in the outside air heat-absorption heat pump mode, the refrigerant in the refrigeration cycle 21 absorbs heat from the outside air by the radiator 13, and the heat is radiated to the coolant by the coolant/heater 15. Thus, it is possible to realize a heat pump operation for pumping the heat of outside air.

Figure 25:
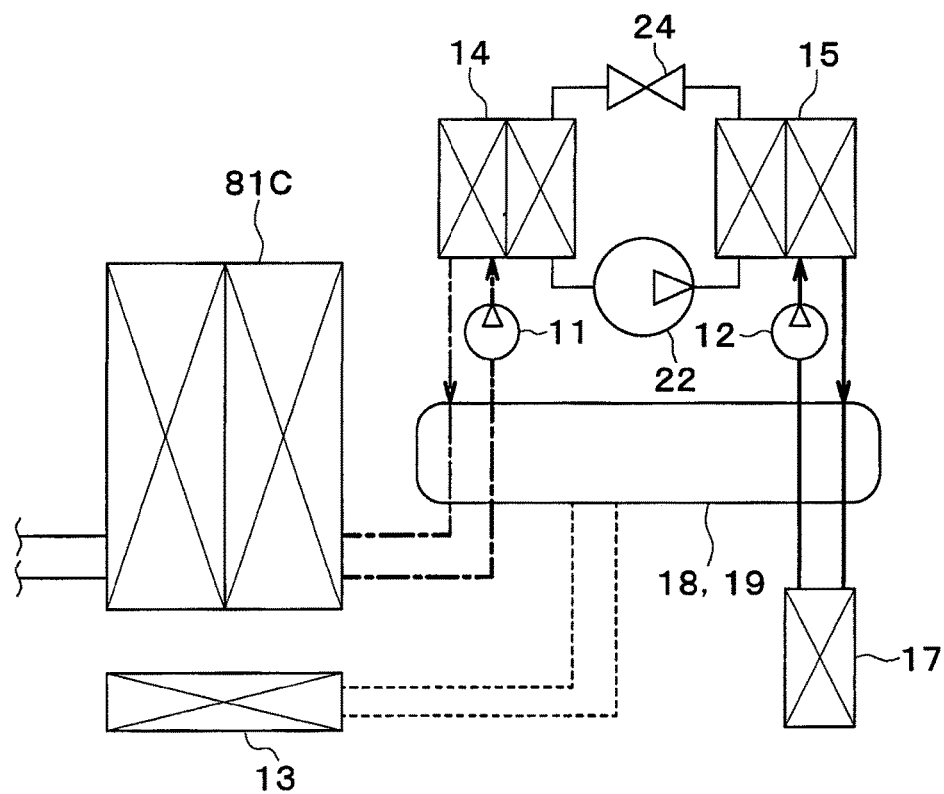
FIG. 25 is a diagram schematically illustrating a configuration of an engine heat-absorption heat pump mode in the vehicle thermal management system according to the eighth embodiment.

In an engine heat-absorption heat pump mode illustrated in FIG. 25, the coolant/coolant heat exchanger 81C is connected to the coolant/cooler 14, the heater core 17 is connected to the coolant/heater 15, and the radiator 13 is not connected to both the coolant/cooler 14 and the coolant/heater 15.

Accordingly, since the coolant heated by the coolant/coolant heat exchanger 81C flows in the coolant/cooler 14, heat is absorbed to the refrigerant from the coolant by the coolant/cooler 14. Since the coolant heated by the coolant/heater 15 flows in the heater core 17, the ventilation air into the vehicle interior is heated by the heater core 17.

That is, in the engine heat-absorption heat pump mode, the refrigerant in the refrigeration cycle 21 absorbs heat from the coolant by the coolant/coolant heat exchanger 81C, and the heat is radiated to the coolant by the coolant/heater 15. Thus, it is possible to realize a heat pump operation for pumping the heat of the engine 91.

In the engine heat-absorption heat pump mode, when other heat generation devices (the battery temperature-regulation heat exchanger 81A and the inverter 81B) are connected to the coolant/cooler 14, the heat of the other heat generation devices 81A and 81B may be pumped. Thus, the engine heat-absorption heat pump mode may be expressed as a device heat-absorption heat pump.

Figure 26:
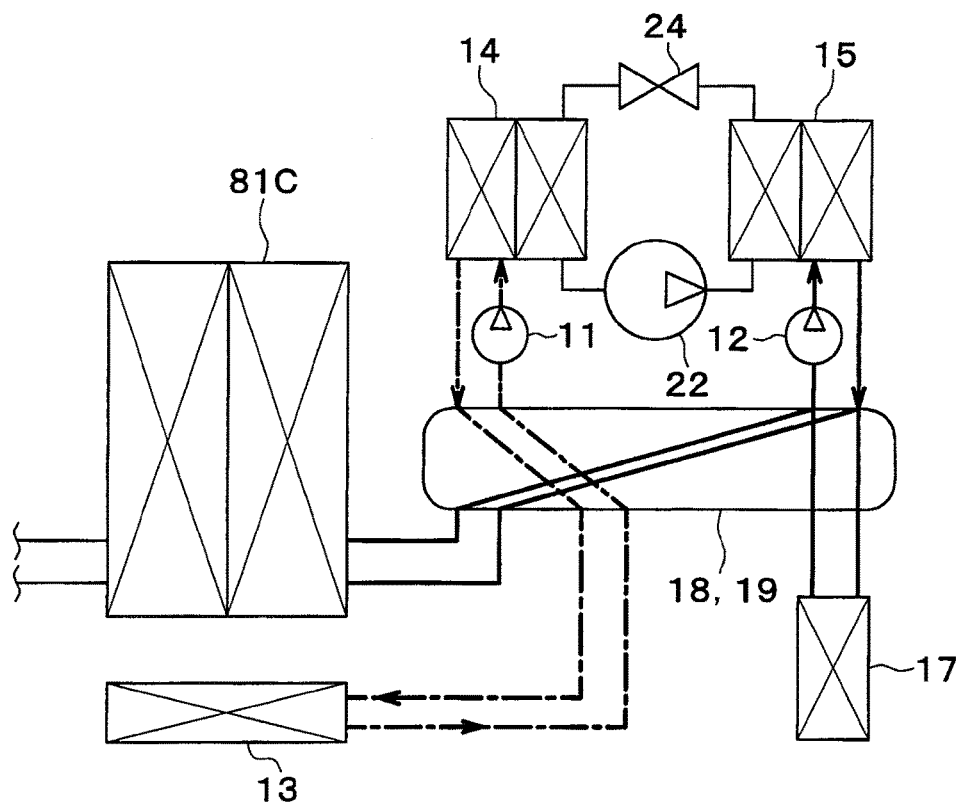
FIG. 26 is a diagram schematically illustrating a configuration of an assistant heat pump mode, etc. in the vehicle thermal management system according to the eighth embodiment.

In an assistant heat pump mode, an engine heating heat pump mode, a device heating mode, and a thermal mass utilization heating mode illustrated in FIG. 26, the coolant/coolant heat exchanger 81C and the heater core 17 are connected to the coolant/heater 15, and the radiator 13 is connected to the coolant/cooler 14.

Accordingly, since the coolant heated by the coolant/coolant heat exchanger 81C flows in the heater core 17, the ventilation air into the vehicle interior is heated by the heater core 17.

Moreover, since the coolant cooled by the coolant/cooler 14 flows in the radiator 13, heat is absorbed to the coolant from the outside air by the radiator 13. Since the coolant heated by the coolant/heater 15 flows in the heater core 17, the ventilation air into the vehicle interior is heated by the heater core 17.

That is, in the outside air heat-absorption heat pump mode, the refrigerant in the refrigeration cycle 21 absorbs heat from the outside air by the radiator 13, and the heat is radiated to the coolant by the coolant/heater 15. Thus, it is possible to realize a heat pump operation for pumping the heat of outside air.

Accordingly, when the waste heat of the engine 91 is insufficient as a heating heat source, the heating heat source may be replenished by performing the heat pump operation (the assistant heat pump mode).

In addition, since the coolant heated by the coolant/heater 15 flows in the coolant/coolant heat exchanger 81C during the warm up of the engine 91, the engine 91 may be heated using the coolant heated by the coolant/heater 15 when the engine 91 is warmed up (the engine heating heat pump mode).

In the engine heating heat pump mode, when other heating target devices (the battery temperature-regulation heat exchanger 81A and the inverter 81B) are connected to the coolant/heater 15, the other heating target devices may be heated using the coolant heated by the coolant/heater 15. Thus, the engine heating heat pump mode may be expressed as a device heating heat pump mode.

In addition, the other heating target devices connected to the coolant/heater 15 may be heated by the heat of the engine 91 (the device heating mode).

In addition, since the coolant heated by the coolant/heater 15 flows in the coolant/coolant heat exchanger 81C, it is possible to restrict and reduce a change in coolant temperature using the thermal mass (thermal capacity) of the engine 91 (the thermal mass utilization heating mode).

Figure 27:
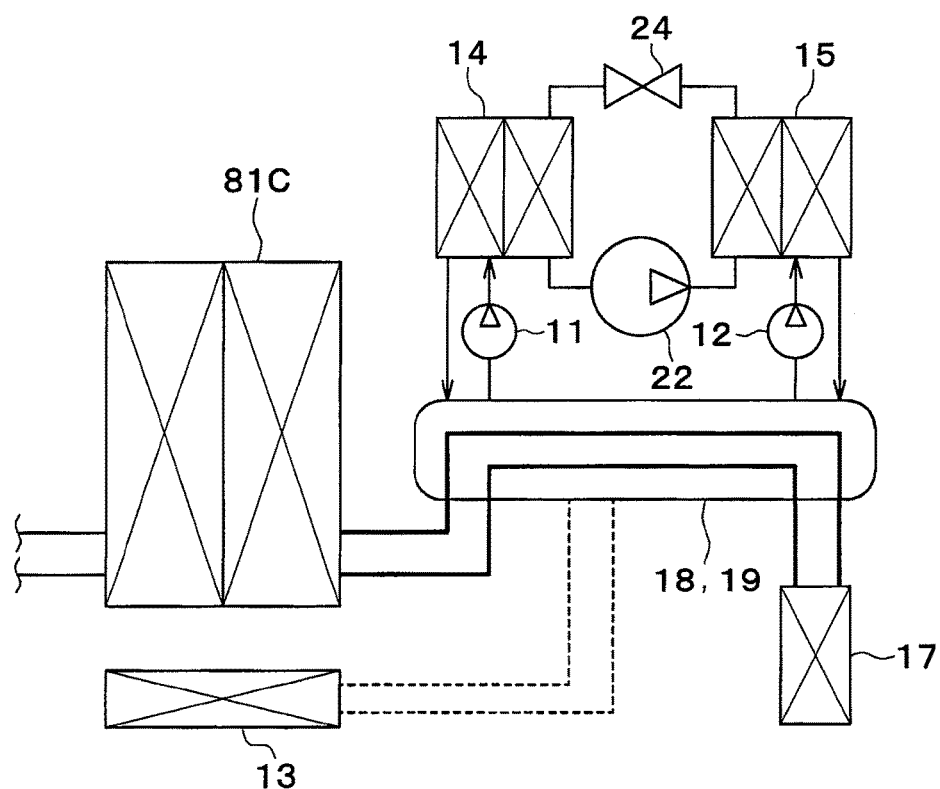
FIG. 27 is a diagram schematically illustrating a configuration of a direct engine waste heat utilization mode in the vehicle thermal management system according to the eighth embodiment.

In an engine waste heat direct-utilization mode illustrated in FIG. 27, the coolant/coolant heat exchanger 81C and the heater core 17 are connected to each other, and the coolant/cooler 14 and the coolant/heater 15 are not connected to each other.

Although not illustrated, a coolant pump to introduce and discharge coolant is disposed in the coolant passage between the coolant/coolant heat exchanger 81C and the heater core 17. Accordingly, since the coolant heated by the coolant/coolant heat exchanger 81C flows in the heater core 17, the ventilation air into the vehicle interior is heated by the heater core 17.

In the case where the coolant temperature flowing in the heater core 17 exceeds a temperature required to heat the vehicle interior, when the coolant/coolant heat exchanger 81C is connected to the heater core 17 and the radiator 13, the surplus heat of the engine 91 may be radiated to outside air.

In the engine waste heat direct-utilization mode, when other heat generation devices (the battery temperature-regulation heat exchanger 81A and the inverter 81B) are connected to the heater core 17, the coolant heated by the other heat generation devices 81A and 81B flows in the heater core 17. Therefore, the ventilation air into the vehicle interior may be heated by the heater core 17. Thus, the engine waste heat direct-utilization mode may be expressed as a device waste heat direct-utilization mode.

Figure 28:
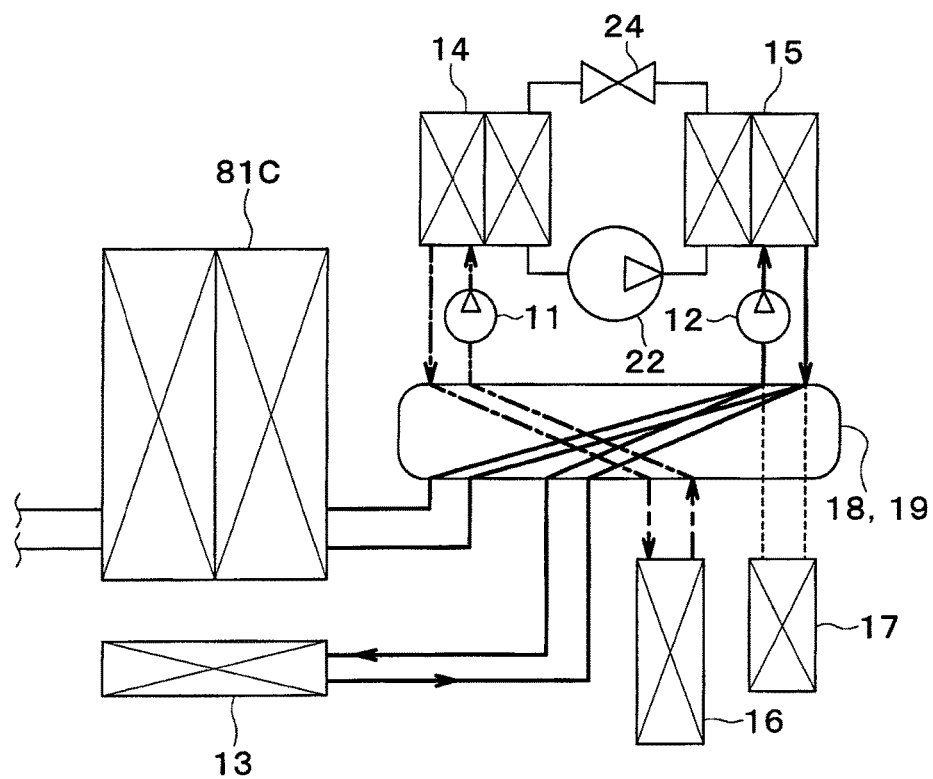
FIG. 28 is a diagram schematically illustrating a configuration of a thermal mass utilization cooling mode in the vehicle thermal management system according to the eighth embodiment.

In a thermal mass utilization cooling mode illustrated in FIG. 28, the coolant/coolant heat exchanger 81C is connected to the coolant/heater 15, and the cooler core 16 is connected to the coolant/cooler 14.

Accordingly, since the coolant cooled by the coolant/cooler 14 flows in the cooler core 16, the ventilation air into the vehicle interior is cooled by the cooler core 16. Since the coolant heated by the coolant/heater 15 flows in the radiator 13, heat is radiated from the coolant to the outside air by the radiator 13.

In addition, since the coolant heated by the coolant/heater 15 flows in the engine 91, it is possible to restrict a change in coolant temperature using the thermal mass (thermal capacity) of the engine 91, or to restrict an increase in water temperature so as to restrict an increase in high pressure of refrigerant. Therefore, high efficiency cooling can be performed.

Although not illustrated, the controller 60 switches the coolant flow mode to a defrost mode and an engine-independent mode by operating the first and second switching valves 18 and 19.

In the defrost mode, the coolant/coolant heat exchanger 81C and the radiator 13 are connected to each other. Accordingly, since the coolant heated by the coolant/coolant heat exchanger 81C flows in the radiator 13, the radiator may be defrosted using the waste heat of the engine 91.

In the engine-independent mode, the coolant/coolant heat exchanger 81C is not connected to both the coolant/cooler 14 and the coolant/heater 15. Accordingly, the waste heat of the engine 91 is not transferred to the coolant/cooler 14 and the coolant/heater 15.

For example, the engine-independent mode is performed when the temperature detected by the engine water temperature sensor 114, i.e. the coolant temperature circulated in the engine cooling circuit 90 exceeds a predetermined reference temperature during the cooling operation. Accordingly, it is possible to prevent cooling performance from being lowered owing to the effect of waste heat of the engine 91.

Figure 29:
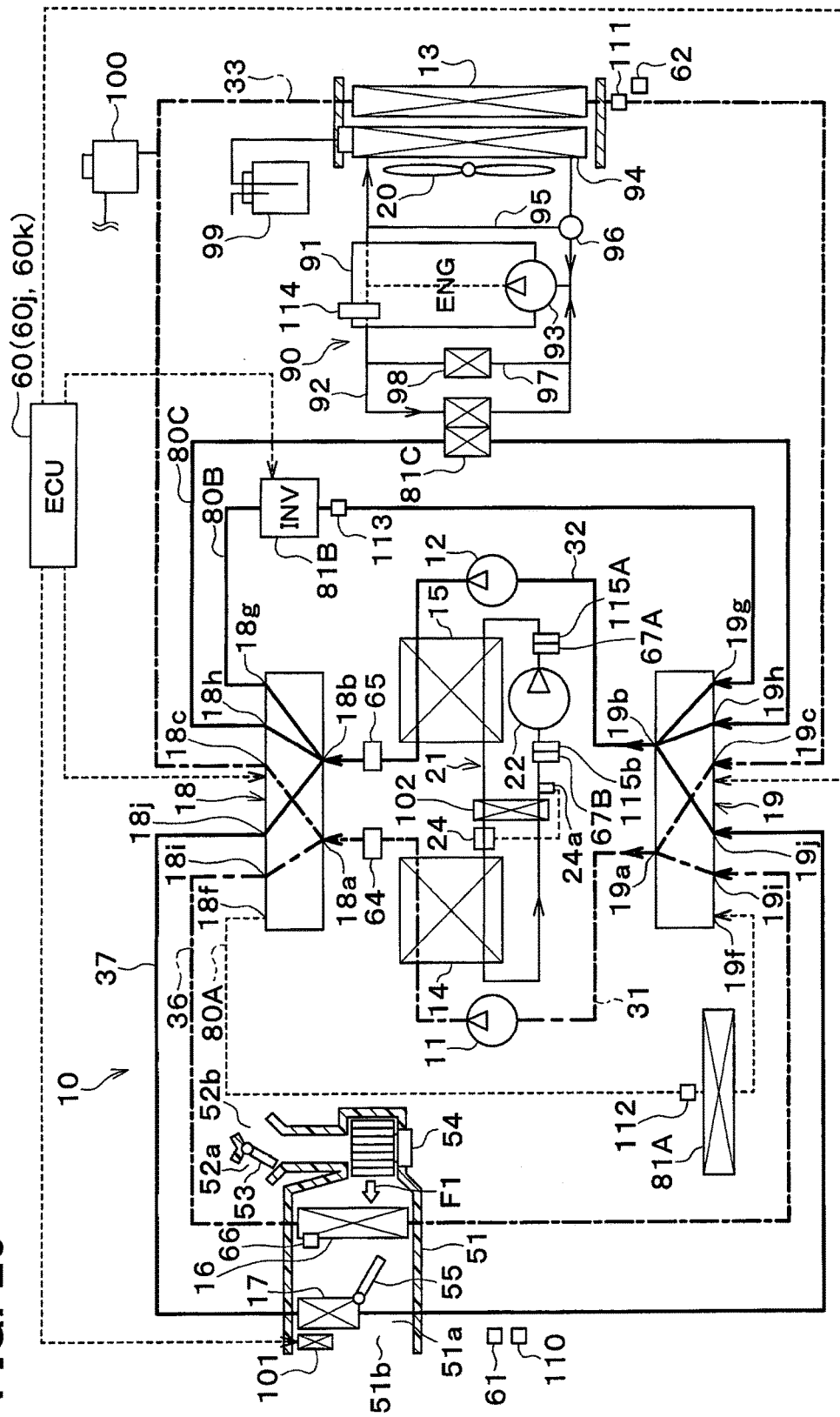
FIG. 29 is a diagram exemplarily illustrating an overall configuration of the outside air heat-absorption heat pump mode in the vehicle thermal management system according to the eighth embodiment.

The specific example of the outside air heat-absorption heat pump mode is illustrated in FIG. 29. The flow of coolant in the outside air heat-absorption heat pump mode is indicated by the thick solid line and thick alternate long and short dash line arrows in FIG. 29.

For example, the outside air heat-absorption heat pump mode illustrated in FIG. 29 is performed when the temperature detected by the engine water temperature sensor 114, i.e. the coolant temperature circulated in the engine cooling circuit 90 is lower than a predetermined first reference temperature (e.g. 40° C.) during the heating operation.

Accordingly, when the engine 91 is operated, the warm up of the engine 91 may be facilitated. Meanwhile, when the engine 91 is stopped, a heating heat source may be obtained without operating the engine 91. Therefore, fuel efficiency can be improved.

Figure 30:
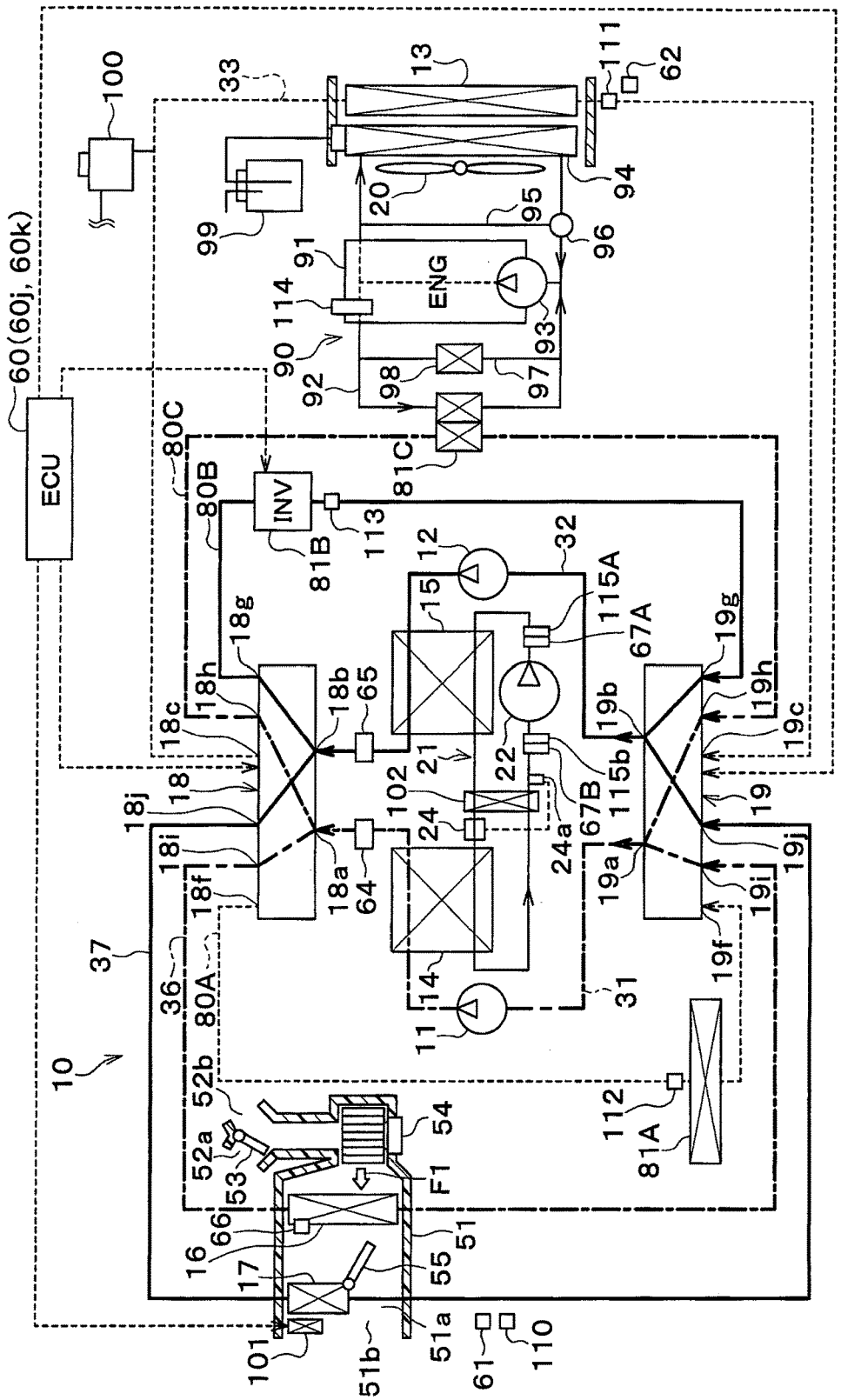
FIG. 30 is a diagram exemplarily illustrating an overall configuration of the engine heat-absorption heat pump mode in the vehicle thermal management system according to the eighth embodiment.

The specific example of the engine heat-absorption heat pump mode is illustrated in FIG. 30. The flow of coolant in the engine heat-absorption heat pump mode is indicated by the thick solid line and thick alternate long and short dash line arrows in FIG. 30.

For example, the engine heat-absorption heat pump mode illustrated in FIG. 30 is performed when the temperature detected by the engine water temperature sensor 114, i.e. the coolant temperature circulated in the engine cooling circuit 90 is equal to or higher than the predetermined first reference temperature (e.g. 40° C.) during the heating operation.

Accordingly, it is possible to increase the coolant temperature circulated in the coolant/cooler 14 and to thereby increase the pressure of low pressure-side refrigerant in the refrigeration cycle 21. Furthermore, high heating cab be realized by the efficiency (COP) of the refrigeration cycle 21 (hereinafter, referred to as "high COP").

When dehumidification heating is performed in the engine heat-absorption heat pump mode illustrated in FIG. 30, the coolant circulated in the coolant/cooler 14 is preferably maintained at a temperature of about 0° C. by controlling a quantity of heat received from the engine 91.

In the engine heat-absorption heat pump mode illustrated in FIG. 30, when the temperature detected by the first water temperature sensor 64, i.e. the coolant temperature circulated in the coolant/cooler 14 is higher than the temperature of outside air, the circulation of coolant to the radiator 13 is blocked. Consequently, it is possible to prevent heat from being radiated from the coolant to the outside air by the radiator 13.

In the engine heat-absorption heat pump mode illustrated in FIG. 30, the cooler core 16 is connected to the coolant/cooler 14, and the inverter 81B is connected to the coolant/heater 15. In addition, although the battery temperature-regulation heat exchanger 81A is not connected to both the coolant/cooler 14 and the coolant/heater 15, the battery temperature-regulation heat exchanger 81A may be connected to at least one of the coolant/cooler 14 and the coolant/heater 15, according to the required temperature of the battery temperature-regulation heat exchanger 81A and the coolant temperature.

In the engine heat-absorption heat pump mode illustrated in FIG. 30, the first and second switching valves 18 and 19 control the flow rate of coolant circulated in the coolant/coolant heat exchanger 81C such that the coolant temperature flowing out of the coolant/coolant heat exchanger 81C is about 10° C.

Figure 31:
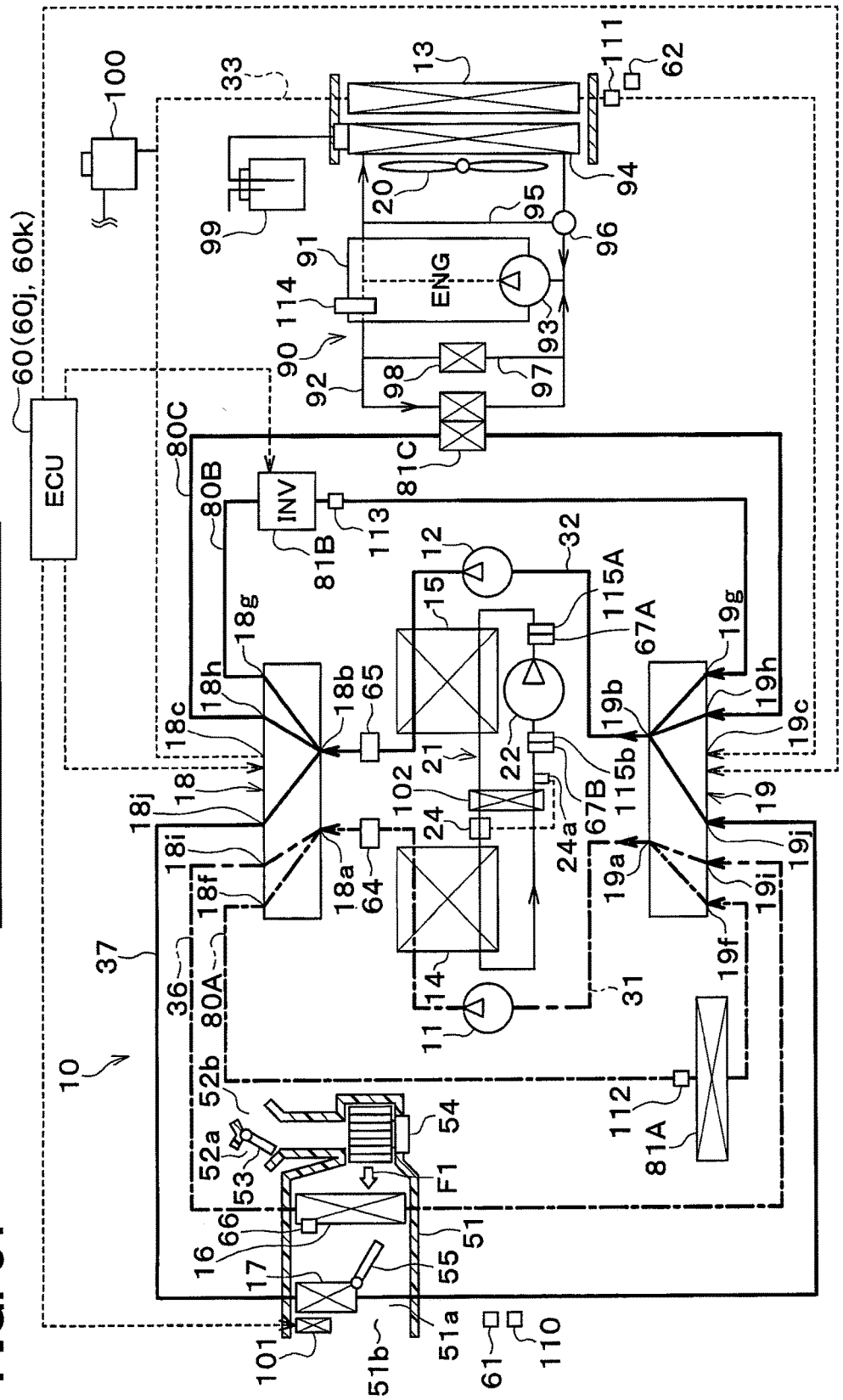
FIG. 31 is a diagram exemplarily illustrating an overall configuration of an engine-heating heat pump mode in the vehicle thermal management system according to the eighth embodiment.

The specific example of the engine-heating heat pump mode is illustrated in FIG. 31. The flow of coolant in the engine-heating heat pump mode is indicated by the thick solid line and thick alternate long and short dash line arrows in FIG. 31.

For example, the engine-heating heat pump mode illustrated in FIG. 31 is performed when the temperature detected by the engine water temperature sensor 114, i.e. the coolant temperature circulated in the engine cooling circuit 90 is lower than a predetermined reference temperature (e.g. 40° C.) during the cooling operation.

Accordingly, since the engine 91 may be warmed up using cooling waste heat, fuel efficiency may be improved. Since the coolant heated by the coolant/heater 15 flows in the engine 91, it is possible to restrict a variation in coolant temperature using the thermal mass (thermal capacity) of the engine 91.

For example, the engine waste heat direct-utilization mode illustrated in FIG. 27 is performed when the temperature detected by the engine water temperature sensor 114, i.e. the coolant temperature circulated in the engine cooling circuit 90 exceeds a predetermined second reference temperature (a temperature for satisfying heating requirement, e.g. 55° C.) during the heating operation.

Accordingly, since the coolant heated by the coolant/coolant heat exchanger 81C flows in the heater core 17, the ventilation air into the vehicle interior is heated by the heater core 17.

In each coolant flow mode described above, when coolant begins to be circulated through the radiator 13 by connecting the radiator 13 to either the coolant/cooler 14 or the coolant/heater 15, in the state in which the circulation of coolant through the radiator 13 is blocked, a variation in blowout air temperature in the vehicle interior is preferably restricted by performing at least one of the following control (1) and (2).

(1) Coolant begins to be slowly circulated by slowly opening the valve for controlling the circulation of the coolant through the radiator 13. Thereby, it is possible to restrict a rapid variation in blowout air temperature in the vehicle interior.

(2) Coolant is circulated in the radiator 13 by predicting the variation in blowout air temperature in the vehicle interior and adjusting the opening degree of the air mix door 55 and the air volume of the interior blower 54. Thereby, it is possible to restrict the variation in blowout air temperature in the vehicle interior. The variation of coolant after the coolant is circulated in the radiator 13 is restricted by controlling the opening degree of the air mix door 55 and the air volume of the interior blower 54.

Next, a method of controlling a cooler core blowout temperature TC and a heater core blowout temperature TH will be described. The cooler core blowout temperature TC is a temperature of ventilation air cooled by the cooler core 16. The heater core blowout temperature TH is a temperature of ventilation air heated by the heater core 17.

In order to control the cooler core blowout temperature TC such that the cooler core blowout temperature TC is close to a cooler core blowout target temperature TCO, any one of first TC control, second TC control, third TC control, and fourth TC control is used. In order to control the heater core blowout temperature TH such that the heater core blowout temperature TH is close to a heater core blowout target temperature THO, one of first TH control, second TH control, third TH control, and fourth TH control is used.

[First TC Control]

In the first TC control, any one of the radiator 13 and the devices 81A to 81C is connected to the cooler core 16, and the cooler core blowout temperature TC is close to the cooler core blowout target temperature TCO by controlling a heat transfer amount between the connected device and the cooler core 16.

For example, the amount of heat transfer between the connected device and the cooler core 16 is controlled by adjusting the flow rate or volume of coolant to the connected device or controlling the heating value of the connected device. For example, when the connected device is the inverter 81B, the heating value of the inverter 81B is controlled by inefficiently operating the inverter 81B.

The device connected to the cooler core 16 may be a device such as a water-heating PTC heater or a traveling motor generator, as well as the radiator 13 and the devices 81A to 81C. The heating value of the water-heating PTC heater may be controlled by controlling the application of current thereto. The heating value of the traveling motor generator may be controlled by inefficiently driving the same.

In the embodiment, the configuration (hardware and software) for controlling the heating value of the device (the inverter 81B, the water-heating PTC heater, the traveling motor generator, or the like) connected to the cooler core 16 in the controller 60 is referred to as a heating value control unit 60k.

For example, the first TC control is executed when the temperature of water is equal to or lower than 0° C. in the operating state in which the dehumidification air-conditioning in the vehicle interior is performed using cold outside air through communication between the cooler core 16 and the radiator 13.

The frost (frost formation) of the cooler core 16 may be restricted by controlling the amount of heat transfer between the connected device and the cooler core 16 such that the coolant temperature circulated in the cooler core 16 is a target value which is equal to or higher than 0° C.

[Second TC Control]

In the second TC control, the cooler core blowout temperature TC is close to the cooler core blowout target temperature TCO by controlling the heat exchange capability of the cooler core 16. For example, the heat exchange capability of the cooler core 16 is controlled by adjusting the flow rate or volume of coolant to the cooler core 16, or adjusting the ratio between inside air and outside air in the air blown into the cooler core 16.

For example, the second TC control is executed when temperature of water is equal to or lower than 0° C. in the operating state in which the dehumidification air-conditioning in the vehicle interior is performed using cold outside air through communication between the cooler core 16 and the radiator 13.

The frost (frost formation) of the cooler core 16 may be restricted by controlling (turning on/off) the circulation of coolant in the cooler core 16.

[Third TC Control]

The third TC control is a control method on the premise that the compressor 22 is operated. In the third TC control, any one of the radiator 13 and the devices 81A to 81C is connected to the heater core 17, and the cooler core blowout temperature TC is close to the cooler core blowout target temperature TCO by controlling a heat transfer amount between the connected device and the heater core 17.

For example, the amount of heat transfer between the connected device and the heater core 17 is controlled by adjusting the flow rate or volume of coolant to the connected device or controlling the heating value of the connected device.

The device connected to the heater core 17 may be a device such as a water-heating PTC heater or a traveling motor generator, as well as the radiator 13 and the devices 81A to 81C. The heating value of the water-heating PTC heater may be controlled by controlling the application of current thereto. The heating value of the traveling motor generator may be controlled by inefficiently driving the same.

For example, the third TC control is executed when cooling is performed in the case where the speed of rotation of the compressor 22 is controlled so as to be limited at a certain speed. For example, the case where the speed of rotation of the compressor 22 is controlled so as to be limited at a certain speed includes a case where the speed of rotation of the compressor 22 is set to be an allowable speed, a case where the compressor 22 is a belt-driven type compressor, or the like.

According to the third TC control, the cooler core blowout temperature TC may be controlled without depending on the speed of rotation of the compressor 22.

[Fourth TC Control]

In the fourth TC control, the cooler core blowout temperature TC is close to the cooler core blowout target temperature TCO by controlling the flow rate of refrigerant. For example, the flow rate of refrigerant is controlled by controlling the refrigerant discharge capability of the compressor 22 (specifically, the speed of rotation of the compressor 22), or adjusting the throttle passage area of the expansion valve 24.

[First TH Control]

In the first TH control, any one of the radiator 13 and the devices 81A to 81C is connected to the heater core 17, and the heater core blowout temperature TH is close to the heater core blowout target temperature THO by controlling a heat transfer amount between the connected device and the heater core 17.

For example, the amount of heat transfer between the connected device and the heater core 17 is controlled by adjusting the flow rate or volume of coolant to the connected device or controlling the heating value of the connected device.

For example, the first TH control is executed in the state in which the heater core 17 is connected to the coolant/heater 15. It is possible to prevent a safety relief valve from being opened due to an excessive increase of the refrigerant pressure in the refrigeration cycle 21 by controlling the amount of heat transfer of the connected device such that the coolant temperature circulated in the coolant/heater 15 does not exceed a predetermined value.

[Second TH Control]

In the second TH control, the heater core blowout temperature TH is close to the heater core blowout target temperature THO by controlling the heat exchange capability of the heater core 17. For example, the heat exchange capability of the heater core 17 is controlled by adjusting the flow rate or volume of coolant to the heater core 17, or adjusting the ratio between inside air and outside air in the air blown into the heater core 17.

For example, the second TH control is performed during vehicle interior heating air conditioning that utilizes the waste heat of the engine 91. The flow rate of coolant flowing through the heater core 17 is controlled so that the average of the coolant temperature in the heater core 17 approaches the target temperature.

Accordingly, it is possible to control the blowout air temperature TAV blown into the vehicle without the use of the air mix door 55. Therefore, it becomes possible to eliminate the air mix door 55, thus it is possible to downsize the indoor air-conditioning unit 50.

For example, the second TH control is carried out in the engine heat-absorption heat pump mode. In the engine heat-absorption heat pump mode, the heat radiation amount of the coolant/heater 15 is controlled with the rotation speed control of the compressor 22, so that the coolant temperature in the heater core 17 approaches the target temperature.

In this case, since the temperature of the low-pressure refrigerant of the refrigeration cycle 21 becomes high (e.g. 40° C.), coolant temperature in the heater core 17 may exceed the target temperature even when the compressor 22 is operated at the minimum operating rotational speed (e.g. 1500 rpm approximately).

Therefore, by controlling the coolant flow rate in the heater core 17, the coolant temperature in the heater core 17 approaches the target temperature. Efficiency drops as the coolant temperature increases, thereby balancing the ability at the lowest rotational speed.

This allows implementing a high COP heating in the engine heat-absorption heat pump mode. Further, it is possible to operate the compressor 22 even if the overcapacity in the minimum operating rotational speed of the compressor 22.

(The third TH control)

The third TH control is a control method in a condition that the compressor 22 is operating. In the third TH control, any equipment of the radiator 13 and the device 81A-81C is connected with cooler core 16, and the heater core blowout temperature TH is close to the heater core target temperature THO by controlling the heat transfer amount between the connected equipment and the cooler core 16.

For example, by adjusting the coolant flow rate and air flow with respect to the connected equipment, or/and by controlling the heating value of the connected equipment, the heat transfer amount with the cooler core 16 is controlled.

For example, in a case where there is a certain limit to the rotational speed control of the compressor 22, the third TH control is carried out if the cooling is requested.

According to the third TH control, it is possible to control the heater core blowout temperature TH without depending on the rotational speed of the compressor 22.

[Fourth TH Control]

In the fourth TH control, the heater core blowout temperature TH is close to the heater core blowout target temperature THO by controlling the flow rate of refrigerant.

For example, the flow rate of refrigerant is controlled by controlling the refrigerant discharge capability of the compressor 22 (specifically, the speed of rotation of the compressor 22), or adjusting the throttle passage area of the expansion valve 24.

The first to fourth TC controls and the first to fourth TH controls may be combined with each other. Specifically, one of the first to fourth TC controls and one of the first to fourth TH controls may be combined with each other.

[Combination Between First TC Control and First TH Control]

For example, the combination between the first TC control and the first TH control is executed when the cooler core blowout target temperature TCO is estimated or determined to exceed the temperature of the device connected to the cooler core 16.

For example, the combination between the first TC control and the first TH control is executed when the temperature of coolant in the device connected to the heater core 17 exceeds a predetermined temperature (e.g. 55° C.). When the temperature of coolant in the device connected to the heater core 17 exceeds the predetermined temperature (e.g. 55° C.), the heater core blowout temperature TH is excessive. Therefore, by controlling a quantity of heat received from the device connected to the heater core 17, the temperature of coolant in the device connected to the heater core 17 is prevented from exceeding the predetermined temperature (e.g. 55° C.), and further the heater core blowout temperature TH is prevented from being excessive.

For example, the combination between the first TC control and the first TH control is executed during a power saving dehumidification-heating mode. The power saving dehumidification-heating mode is an operation mode in which dehumidification air is reheated using the waste heat of the engine 91 or the waste heat of various devices while dehumidification is performed using outside air cold heat.

For example, the combination between the first TC control and the first TH control is executed during the engine heat-absorption heat pump mode. The heating source in the engine heat-absorption heat pump mode is the coolant/heater 15. As the heating source in the engine heat-absorption heat pump mode, the electric heat and the inverter 81B may be used together.

The device connected to the heater core 17 may be the engine 91. Specifically, the engine 91 may be provided with a second coolant outlet communicating with the heater core 17. When the temperature of engine water is equal to or higher than a predetermined temperature (e.g. 55° C.), the waste heat of the engine 91 may be directly used in the heater core 17 while being used to absorb heat in the refrigeration cycle 21.

[Combination Between First TC Control and Second TH Control]

For example, the combination between the first TC control and the second TH control is executed when the cooler core blowout target temperature TCO is estimated or determined to exceed the temperature of the device connected to the cooler core 16.

For example, the combination between the first TC control and the second TH control is executed when the temperature of coolant in the device connected to the heater core 17 exceeds a predetermined temperature (e.g. 55° C.). It is possible to prevent the heater core blowout temperature TH from being excessive by controlling (turning on/off) the circulation of coolant in the heater core 17.

For example, the combination between the first TC control and the second TH control is executed during the power saving dehumidification-heating mode or a power saving dehumidification-heating/cooling mode. The power saving dehumidification-heating/cooling mode is an operation mode in which cooling air/dehumidification air is reheated using the waste heat of the engine 91 or the waste heat of various devices while cooling/dehumidification is performed using the cold heat in the cold thermal storage.

[Combination Between Second TC Control and First TH Control]

For example, the combination between the second TC control and the first TH control is executed when the temperature of coolant in the device connected to the cooler core 16 is below a temperature of 0° C. The frost (frost formation) of the cooler core 16 may be restricted by controlling (turning on/off) the circulation of coolant in the cooler core 16.

For example, the combination between the second TC control and the first TH control is executed when the temperature of coolant in the device connected to the heater core 17 exceeds a predetermined temperature (e.g. 55° C.). It is possible to prevent the heater core blowout temperature TH from being excessive by controlling a quantity of heat received from the device connected to the heater core 17.

For example, the combination between the second TC control and the first TH control is executed during the power saving dehumidification-heating mode or the power saving dehumidification-heating/cooling mode.

For example, the combination between the second TC control and the first TH control is executed during the engine heat-absorption heat pump mode, and when the temperature of coolant in the engine 91 is lower than the cooler core blowout target temperature TCO.

The device connected to the heater core 17 may be the engine 91. Specifically, the engine 91 may be provided with the second coolant outlet communicating with the heater core 17. When the temperature of engine water is equal to or higher than a predetermined temperature (e.g. 55° C.), the waste heat of the engine 91 may be directly used in the heater core 17 while being used to absorb heat in the refrigeration cycle 21.

[Combination Between Second TC Control and Second TH Control]

For example, the combination between the second TC control and the second TH control is executed when the temperature of coolant in the device connected to the cooler core 16 is below a temperature of 0° C. The frost (frost formation) of the cooler core 16 may be restricted by controlling (turning on/off) the circulation of coolant in the cooler core 16.

For example, the combination between the second TC control and the second TH control is executed when the temperature of coolant in the device connected to the heater core 17 exceeds a predetermined temperature (e.g. 55° C.). It is possible to prevent the heater core blowout temperature TH from being excessive by controlling a quantity of heat received from the device connected to the heater core 17.

For example, the combination between the second TC control and the second TH control is executed during the power saving dehumidification-heating mode or the power saving dehumidification-heating/cooling mode.

[Combination Between First TC Control and Fourth TH Control]

For example, in the combination between the first TC control and the fourth TH control, the heater core blowout temperature TH is close to the heater core blowout target temperature THO. Therefore, the combination is executed when it is necessary to pump the waste heat of the device connected to the cooler core 16 in the refrigeration cycle 21.

For example, the combination between the first TC control and the fourth TH control is executed when the difference between the temperature related to the temperature TC of ventilation air cooled by the cooler core 16 and the first target temperature TCO does not exceed a predetermined temperature.

For example, the combination between the first TC control and the fourth TH control is executed when the difference between the heater core blowout temperature TH and the heater core blowout target temperature THO exceeds a predetermined temperature. Since the speed of rotation of the compressor 22 is controlled such that the heater core blowout temperature TH is close to the heater core blowout target temperature THO, it is possible to increase followability of the heater core blowout temperature TH according to a variation in temperature.

[Combination Between Second TC Control and Fourth TH Control]

For example, the combination between the second TC control and the fourth TH control is executed when the temperature of coolant in the device connected to the cooler core 16 is below a temperature of 0° C. The frost (frost formation) of the cooler core 16 may be restricted by controlling (turning on/off) the circulation of coolant in the cooler core 16.

[Combination Between Third TC Control and Fourth TH Control]

For example, the combination between the third TC control and the fourth TH control is executed when the difference between the heater core blowout temperature TH and the heater core blowout target temperature THO exceeds a predetermined temperature. Since the speed of rotation of the compressor 22 is controlled such that the heater core blowout temperature TH is close to the heater core blowout target temperature THO, it is possible to increase followability of the heater core blowout temperature TH according to a variation in temperature.

For example, the combination between the third TC control and the fourth TH control is executed when it is switched to the heat radiation mode in step S180 of the above first embodiment. Accordingly, when a quantity of heating heat is excessive, heat may be radiated to outside air in the radiator 13 and at the same time the temperatures of the cooler core 16 and the heater core 17 may be properly controlled.

For example, the combination between the third TC control and the fourth TH control is executed when the difference between the cooler core blowout temperature TC and the cooler core blowout target temperature TCO does not exceed a predetermined temperature.

[Combination Between Fourth TC Control and First TH Control]

For example, the combination between the fourth TC control and the first TH control is executed when the difference between the cooler core blowout temperature TC and the cooler core blowout target temperature TCO exceeds a predetermined temperature. Since the speed of rotation of the compressor 22 is controlled such that the cooler core blowout temperature TC is close to the cooler core blowout target temperature TCO, it is possible to increase followability of the cooler core blowout temperature TC according to a variation in temperature.

Accordingly, since the temperature of the cooler core 16 may be restricted from varying at a low temperature, it is possible to prevent air volume from being lowered due to the generation of frost in the cooler core 16 or prevent odors due to freezing from occurring. In addition, since the temperature of the cooler core 16 may be restricted from varying at a high temperature, it is possible to prevent fog from suddenly occurring due to the evaporation of condensate in the cooler core 16 or prevent odors from occurring.

For example, the combination between the fourth TC control and the first TH control is executed when the difference between the heater core blowout temperature TH and the heater core blowout target temperature THO does not exceed a predetermined temperature.

[Combination Between Fourth TC Control and Second TH Control]

For example, the combination between the fourth TC control and the second TH control is executed when the temperature of coolant in the device connected to the heater core 17 exceeds a predetermined temperature (e.g. 55° C.). It is possible to prevent the heater core blowout temperature TH from being excessive by controlling (turning on/off) the circulation of coolant in the heater core 17.

[Combination Between Fourth TC Control and Third TH Control]

For example, the combination between the fourth TC control and the third TH control is executed when the difference between the cooler core blowout temperature TC and the cooler core blowout target temperature TCO exceeds a predetermined temperature. Since the speed of rotation of the compressor 22 is controlled such that the cooler core blowout temperature TC is close to the cooler core blowout target temperature TCO, it is possible to increase followability of the cooler core blowout temperature TC according to a variation in temperature.

For example, the combination between the fourth TC control and the third TH control is executed when it is switched to the heat absorption mode in step S190 of the above first embodiment. Accordingly, when a quantity of heating heat is insufficient, heat may be absorbed from outside air in the radiator 13 so as to secure the quantity of heating heat and at the same time the temperatures of the cooler core 16 and the heater core 17 may be properly controlled.

For example, the combination between the fourth TC control and the third TH control is executed when the difference between the heater core blowout temperature TH and the heater core blowout target temperature THO does not exceed a predetermined temperature.

[Combination Between Second TC Control and Third TH Control, Combination Between Third TC Control and Second TH Control, and Combination Between Third TC Control and Third TH Control]

The combination between the second TC control and the third TH control, the combination between the third TC control and the second TH control, and the combination between the third TC control and the third TH control are executed when the speed of rotation of the compressor 22 is controlled regardless of both the cooler core blowout temperature TC and the heater core blowout temperature TH.

The examples when the speed of rotation of the compressor 22 is controlled regardless of both the cooler core blowout temperature TC and the heater core blowout temperature TH are as follows.

When the compressor 22 is an electric compressor, the above examples are the following (1) to (11), for example.

(1) The case where an upper limit is set on the maximum speed of rotation of the compressor 22 in order to satisfy the requirement of vibration/noise. During cooling/heating when idle stop is mainly performed.

(2) The case where the speed of rotation of the compressor 22 is limited such that the discharge pressure of the compressor 22 does not exceed a predetermined value (e.g. 2.6 to 3 MPa).

(3) The case where the speed of rotation of the compressor 22 is limited such that the discharge temperature of the compressor 22 does not exceed a predetermined value (e.g. 120° C.) in order to protect the O-ring of the compressor 22.

(4) The case where the speed of rotation of the compressor 22 is limited such that the suction temperature of the compressor 22 is not below a predetermined value (e.g. −30° C.) in order to prevent the O-ring of the compressor 22 from being broken or prevent the sealing of the O-ring from being deteriorated by increasing the hardness of the O-ring.

(5) The case where the speed of rotation of the compressor reaches a maximum allowable rotational speed provided for the specification of a motor driver or in order to protect the shaft and bearing of the compressor 22.

(6) The case where the compressor is controlled at a constant rotational speed in order to maintain a high-efficient rotational speed.

(7) The case where the speed of rotation of the compressor is gradually increased so as to reach a maximum rotational speed at the set time during warm-up or cool-down.

(8) The case where the speed of rotation of the compressor 22 is reduced during acceleration or when electric power is concentrated to other electric devices. The case where electric power is concentrated to other electric devices is a case where the engine 91 is started using the traveling motor, or a case where traveling is prioritized when an output limitation is applied to the traveling battery at low temperature.

(9) The case where a constant rotational speed is maintained for a predetermined time in order to restrict control hunting.

(10) The case where the compressor 22 which is operated only at a constant rotational speed is used in order to simplify the motor driver.

(11) The case where the compressor is operated so as to increase a predetermined capability by adding the request of the device intended for other heating or cooling in order to add an air conditioning request capability.

When the compressor 22 is a belt-driven type compressor and a fixed displacement type compressor, the speed of rotation of the compressor 22 depends on the speed of rotation of the engine 91, and the compressor 22 may be controlled to be merely turned on/off. Therefore, the speed of rotation of the compressor 22 is controlled regardless of both the cooler core blowout temperature TC and the heater core blowout temperature TH.

The controller 60 switches the above-mentioned first to fourth TC controls and first to fourth TH controls according to various conditions.

Furthermore, the controller 60 performs control such that the blowout air temperature TAV is close to the target blowout air temperature TAO, in addition to the first to fourth TC controls and the first to fourth TH controls. For example, the blowout air temperature TAV is close to the target blowout air temperature TAO by controlling the volume of air in the interior blower 54 or the operation of the air mix door 55.

For example, when a rapid variation in temperature occurs due to the variation in temperature of the connected device and environmental temperature, the air mix door 55 is rapidly operated so as to restrict a variation in blowout temperature. That is, the air mix door covers a delay of control due to the thermal mass (thermal capability) of coolant and refrigerant.

When the heater core bypass passage 51*a* is slightly opened rather than being fully closed by the air mix door 55 even during dehumidification and heating, it is possible to prepare for a variation in which the blowout air temperature TAV is below the target blowout air temperature TAO.

When the variation in which the blowout air temperature TAV is below the target blowout air temperature TAO occurs, the blowout air temperature TAV may be increased by the auxiliary heater 101.

When the blowout air temperature TAV exceeds the target blowout air temperature TAO, the air mix door 55 is operated such that the volume of air in the heater core bypass passage 51*a*.

Next, the specific example of operation when the first to fourth TC controls and the first to fourth TH controls are applied to the above-mentioned engine heat-absorption heat pump mode will be described.

(Combination of the First TC Control and the First TH Control)

When the dehumidification is carried out in the engine heat-absorption heat pump mode by connecting the cooler core 16, the coolant/coolant heat exchanger 81C and the coolant/cooler 14 in order to connect the heater core 17, the coolant/heater 15 and the inverter 81B, or the like, the first TC control is carried out such that the cooler core blowout temperature TC becomes 0° C., and the first TH control is carried out such that the heater core blowout temperature TH becomes a predetermined temperature (for example 55° C.). In the first TH control, it may control the rotation speed of the compressor 22.

(Combination of the First TC Control and the Second TH Control)

When the temperature of the coolant heated in the coolant/heater 15 is excessively increased, by connecting the cooler core 16, the coolant/coolant heat exchanger 81C and the coolant/cooler 14 in order to connect the heater core 17 and the coolant/heater 15, it can be restricted that the heater core blowout temperature TH exceeds the heater core blowout target temperature THO by performing a second TH control so as to throttle the coolant flow rate in the heater core 17.

(Combination of the First 1TC Control and the Fourth TH Control)

When the dehumidification is carried out in the engine heat-absorption heat pump mode by connecting the cooler core 16, the coolant/coolant heat exchanger 81C and the coolant/cooler 14 in order to connect the heater core 17 and the coolant/heater 15, the first TC control is carried out such that the cooler core blowout temperature TC becomes 0° C., and the fourth TH control (for example, rotation speed control of the compressor 22) is carried out such that the heater core blowout temperature TH becomes a predetermined temperature (for example 55° C.).

(Combination of the Second TC Control and the First TH Control)

When the dehumidification is carried out in the engine heat-absorption heat pump mode by connecting the cooler core 16, the coolant/coolant heat exchanger 81C and the coolant/cooler 14 in order to connect the heater core 17, the coolant/heater 15 and the inverter 81B, or the like, if the temperature of the coolant in the engine 91 is lower than the cooler core blowout target temperature TCO (e.g. 10° C.), the cooler core blowout temperature TC can be close to the cooler core blowout target temperature TCO by conducting the second TC control in order to throttle the coolant flow rate in cooler core 16.

In addition, the first TH control is conducted such that the heater core blowout temperature TH becomes a predetermined temperature (for example 55° C.). In the first TH control, it may control the rotation speed of the compressor 22.

(Combination of the Second TC Control and the Second TH Control)

When the coolant temperature in the heater core 17 is equal to or greater than a predetermined temperature (for example, above 55° C.), and the coolant temperature in the engine 91 is lower than the cooler core blowout target temperature TCO (for example, 10° C.), the cooler core blowout temperature TC can approach the cooler core blowout target temperature TCO, and the heater core blowout temperature TH can be close to the heater core blowout target temperature THO by carrying out the second TC control. In other words, it is not necessary to rotate the compressor 22 for dehumidification and cooling in cooler core 16.

(Combination of the Second TC Control and the Fourth TH Control)

When the dehumidification is carried out in the engine absorption heat pump mode by connecting the cooler core 16, the coolant/coolant heat exchanger 81C and the coolant/cooler 14 such that the heater core 17, the coolant/heater 15 and the inverter 81B, or the like, are connected, the second TC control is carried out to squeeze the flow rate of coolant in the cooler core 16 such that the cooler core blowout temperature TC approaches the cooler core blowout target temperature TCO, the first TH control is carried out such that the heater core blowout temperature TH becomes a predetermined temperature (e.g. 55° C.).

(Combination of the Third TC Control and the Third TH Control)

When the dehumidification is carried out in the engine absorption heat pump mode by connecting the cooler core 16, the coolant/coolant heat exchanger 81C and the coolant/cooler 14 such that the heater core 17, the coolant/heater 15 and the inverter 81B, or the like, are connected, and when the rotation speed of the compressor 22 is controlled regardless of any one of the cooler core air temperature TC and the heater core blowout temperature TH, the third TC control is carried out such that the coolant temperature in the cooler core 16 becomes 0° C., and the third TH control is carried out such that the heater core blowout temperature TH becomes a predetermined temperature (e.g. 55° C.).

(Second TH Control Only)

When the dehumidification is carried out in the engine absorption heat pump mode by connecting the cooler core 16, the coolant/coolant heat exchanger 81C and the coolant/cooler 14 such that the heater core 17, the coolant/heater 15 and the inverter 81B, or the like, are connected, the second TH control is carried out such that the heater core blowout temperature TH becomes a predetermined temperature (e.g. 55° C.), but the first to forth TC control is not carried out.

Furthermore, in the embodiment, while in the first to the fourth TH control, the heater core blowout temperature TH is close to the heater core blowout target temperature THO, the outlet air temperature TAV may be close to the target outlet air temperature TAO.

In the present embodiment, the heat transfer device 13, 81 is disposed to conduct a heat transfer between the coolants heated by the coolant/heater 15, the controller 60 regulates the flow rate of the coolant flowing through the heat transfer device 13, 81 (the first TH control) such that the temperature associated with the temperature TH of the ventilation air heated by the heater core 17 approaches the second target temperature THO, and the flow rate of the refrigerant discharged from the compressor 22 is adjusted such that the temperature related to the temperature TC of the blown air, or ventilation air, cooled by the cooler core 16 approaches the first target temperature TCO (the fourth TC control).

Accordingly, it is possible to heat the heat transfer device 13, 81 by the amount of heat, or heat amount recovered from the blown air in the cooler core 16 and the temperature of the cooler core 16 and the temperature of the heater core 17 can be appropriately controlled.

In the present embodiment, when the heat of coolant heated by the coolant/heater 15 in the radiator 13, is radiated to the outside air, the controller 60 regulates at least one of the flow rate of the coolant and outside air, or ambient air, flowing through the radiator 13 (the third TC control) such that the temperature associated with the temperature TC of the blown air cooled by the cooler core 16 approaches the first target temperature TCO, and regulates the flow rate of the refrigerant discharged from the compressor 22 (the fourth TH control) such that the temperature associated with the temperature TH,TAV of the blown air heated in the heater core 17 approaches the second target temperature THO,TAO.

Accordingly, it is possible to properly control both the temperature of the heater core 16 and the temperature of the cooler core 17. In particular, since temperature of the cooler core 17 can be controlled by the refrigerant flow rate, thus it is possible to improve the temperature followability of the heater core 17.

In the present embodiment, when the heat of coolant cooled by the coolant/cooler 14 in the radiator 13, is absorbed from heat of the outside air, the controller 60 regulates at least one of the flow rate of the coolant and outside air flowing through the radiator 13 (the third TH control) such that the temperature TH, TAV associated with the temperature of the blown air heated by the cooler core 17 approaches the second target temperature THO, TAO, and regulates the flow rate of the refrigerant discharged from the compressor 22 (the fourth TC control) such that the temperature associated with the temperature TC of the blown air cooled in the cooler core 16 approaches the first target temperature TCO.

Accordingly, it is possible to properly control both the temperature of the heater core 16 and the temperature of the cooler core 17. In particular, since temperature of the cooler core 16 can be controlled by the refrigerant flow rate, thus it is possible to improve the temperature followability of the heater core 16.

In the present embodiment, when the flow rate of outside air or coolant flowing in the radiator 13 is determined to be less than the predetermined amount, and the blowout air temperature TAV is determined to be less than the second target temperature TAO, the coolant cooled by the coolant/cooler 14 is switched so as to flow in the radiator 13 by the first and second switching valves 18 and 19. Also, the controller 60 regulates the flow rate of at least one of outside air and coolant flowing in the radiator 13 such that the temperature TH, TAV related to the temperature of the ventilation air cooled by the cooler core 16 is closer to the second target temperature THO, TAO, and regulates the flow rate of the refrigerant discharged from the compressor 22 (the third TC control) such that the temperature associated with the temperature TC of the blown air cooled in the cooler core 16 approaches the first target temperature TCO.

Thus, when the heating heat amount is insufficient, it is possible to ensure the heating heat amount by absorbing heat from outside air in the radiator, the temperature of the cooler core 16 and the temperature of the heater core 17 can be appropriately controlled.

In the present embodiment, when the flow rate of outside air or coolant flowing in the radiator 13 is determined to be less than the predetermined amount, and the blowout air temperature TAV is determined to exceed the second target temperature TAO, the coolant heated by the condenser 15 is switched so as to flow in the radiator 13 by the first and second switching valves 18 and 19 (heat radiating mode), the controller 60 regulates the flow rate of refrigerant discharged from the compressor 22 such that the temperature TC related to the temperature of the ventilation air cooled by the cooler core 16 is close to the first target temperature TCO (the third TC control), and regulates the flow rate of at least one of outside air and coolant flowing in the radiator 13 such that the temperature related to the blowout air temperature TH, TAV is close to the second target temperature THO, TAO (the fourth TH control).

Thus, when a quantity of heat for heating is excessive, it is possible to radiate heat to outside air by the radiator 13, the temperature of the cooler core 16 and the temperature of the heater core 17 can be appropriately controlled.

In the present embodiment, when the coolant heated in the coolant/heater 15 is adapted to flow in the radiator 13, and when a deviation between the temperature associated with the temperature TC of the ventilation air cooled in the cooler core 16 and the first target temperature TCO does not exceeds a predetermined amount, or when the deviation is estimated or determined not to exceed, the controller 60 regulates at least one of the flow rate of the coolant and outside air flowing through the radiator 13 (the third TC control) such that the temperature associated with the temperature TC of the blown air cooled by the cooler core 16 approaches the first target temperature TCO, and regulates the flow rate of the refrigerant discharged from the compressor 22 (the fourth TH control) such that the temperature associated with the temperature TH, TAV of the blown air heated in the heater core 17 approaches the second target temperature THO,TAO.

On the other hand, when the deviation between a temperature associated with the temperature TC of the blown air cooled by the cooler core 16 and the first target temperature TCO has exceeded a predetermined amount, the controller 60 regulates at least one of the flow rate of the coolant and outside air flowing through the radiator 13 (the first TH control) such that the temperature associated with the temperature TH, TAV of the blown air heated by the heater core 17 approaches the second target temperature THO, TAO, and regulates the flow rate of the refrigerant discharged from the compressor 22 (the fourth TC control) such that a temperature associated with the temperature TC of the blown air cooled in the cooler core 16 approaches the first target temperature TCO.

Accordingly, when the deviation between a temperature associated with the temperature TC of the blown air cooled by the cooler core 16 and the first target temperature TCO has exceeded a predetermined amount, or is estimated or determined to exceed, since the temperature of cooler core 16 is controlled by the refrigerant flow rate, it is possible to improve the temperature followability of the cooler core 16.

Therefore, it is possible to prevent the temperature of the cooler core 16 from variation to a lower side, it is possible to prevent condensate adhered to the cooler core 16 from being frozen, which caused reduction of the air volume or freezing odor. Furthermore it is possible to prevent the temperature of the cooler core 16 from variation to a higher side, thus, it is possible to restrict that the condensed water of the cooler core 16 is vaporized to be cloudy or off-flavor occurs sudden window evaporated.

In the present embodiment, when the coolant heated in the coolant/heater 15 is adapted to flow in the radiator 13, and when a deviation between a temperature associated with the temperature TH, TAV of the blown air heated in the heater core 17 and the second target temperature THO, TAO does not exceeds a predetermined amount, or when the deviation is estimated or determined not to exceed, the controller 60 regulates at least one of the flow rate of the coolant and outside air flowing through the radiator 13 (the first TH control) such that the temperature associated with the temperature TH, TAV of the blown air heated by the heater core 17 approaches the second target temperature THO, TAO, and regulates the flow rate of the refrigerant discharged from the compressor 22 (the fourth TC control) such that the temperature associated with the temperature TC of the blown air cooled in the cooler core 16 approaches the first target temperature TCO.

On the other hand, when the deviation between a temperature associated with the temperature TH, TAV of the blown air heated by the heater core 17 and the second target temperature THO, TAO has exceeded a predetermined amount, the controller 60 regulates at least one of the flow rate of the coolant and outside air flowing through the radiator 13 (the third TC control) such that the temperature associated with the temperature TC of the blown air cooled by the cooler core 16 approaches the first target temperature TCO and regulates the flow rate of the refrigerant discharged from the compressor 22 (the fourth TH control) such that a temperature associated with the temperature TH, TAV of the blown air heated in the heater core 17 approaches the second temperature THO, TAO.

Accordingly, when the deviation between a temperature associated with the temperature TH, TAV of the blown air heated by the heater core 17 and the second target temperature THO, TAO has exceeded a predetermined amount, since the temperature of the heater core 17 is controlled by the refrigerant flow rate, it is possible to improve the temperature followability of the heater core 17.

Therefore, it is possible to restrict variations in the temperature of the ventilation air blown into the vehicle interior at an early stage, thereby improving the air-conditioning comfort.

In the present embodiment, when the coolant cooled by the coolant/cooler 14 is adapted to flow in the radiator 13, and when a deviation between a temperature associated with the temperature TC of the blown air cooled by the cooler core 16 and the first target temperature TCO does not exceeds a predetermined amount, or when the deviation is estimated or determined not to exceed, the controller 60 regulates at least one of the flow rate of the coolant and outside air flowing through the radiator 13 (the first TC control) such that the temperature associated with the temperature TC of the blown air cooled by the cooler core 16 approaches the first target temperature TCO, and regulates the flow rate of the refrigerant discharged from the compressor 22 (the fourth TH control) such that the temperature associated with the temperature TH, TAV of the blown air heated by the heater core 17 approaches the first target temperature THO, TAO.

On the other hand, when the deviation between a temperature associated with the temperature TC of the blown air cooled by the cooler core 16 and the first target temperature TCO has exceeded a predetermined amount or when the deviation is estimated or determined to have exceed, the controller 60 regulates at least one of the flow rate of the coolant and outside air flowing through the radiator 13 (the third TC control) such that the temperature associated with the temperature TH, TAV of the blown air heated by the heater core 17 approaches the second target temperature THO, TAO and regulates the flow rate of the refrigerant discharged from the compressor 22 (the fourth TC control) such that a temperature associated with the temperature TC of the blown air cooled by the cooler core 16 approaches the first target temperature TCO.

Accordingly, when the deviation between a temperature associated with the temperature TC of the blown air cooled by the cooler core 16 and the first target temperature TCO has exceeded a predetermined amount, since the temperature of the cooler core 16 is controlled by the refrigerant flow rate, it is possible to improve the temperature followability of the cooler core 16.

Therefore, it is possible to prevent the temperature of the cooler core 16 from variation to a lower side, it is possible to prevent condensate adhered to the cooler core 16 from being frozen, which caused reduction of the air volume or freezing odor. Furthermore it is possible to prevent the temperature of the cooler core 16 from variation to a higher side, thus, it is possible to restrict that the condensed water of the cooler core 16 is vaporized to be cloudy or off-flavor occurs sudden window evaporated.

In the present embodiment, when the coolant cooled by the coolant/cooler 14 is adapted to flow in the radiator 13, and when a deviation between a temperature associated with the temperature TH, TAV of the blown air heated by the heater core 17 and the second target temperature THO, TAO does not exceeds a predetermined amount, the controller 60 regulates at least one of the flow rate of the coolant and outside air flowing through the radiator 13 (the third TH control) such that the temperature associated with the temperature TH, TAV of the blown air heated by the heater core 17 approaches the second target temperature THO, TAO and regulates the flow rate of the refrigerant discharged from the compressor 22 (the fourth TC control) such that the temperature associated with the temperature TC of the blown air cooled by the cooler core 16 approaches the first target temperature TCO.

On the other hand, when the deviation between a temperature associated with the temperature TH, TAV of the blown air heated by the heater core 17 and the second target temperature THO, TAO has exceeded a predetermined amount, the controller 60 regulates at least one of the flow rate of the coolant and outside air flowing through the radiator 13 (the first TC control) such that the temperature associated with the temperature TC of the blown air cooled by the cooler core 16 approaches the second target temperature TCO and regulates the flow rate of the refrigerant discharged from the compressor 22 (the fourth TC control) such that a temperature associated with the temperature TH, TAV of the blown air heated by the heater core 17 approaches the second target temperature THO, TAO.

Accordingly, when the deviation between a temperature associated with the temperature TH, TAV of the blown air cooled by the heater core 17 and the first target temperature THO, TAO has exceeded a predetermined amount, since the temperature of the heater core 17 is controlled by the refrigerant flow rate, it is possible to improve the temperature followability of the heater core 17.

Therefore, it is possible to restrict variations in the temperature of blowing air blown into the vehicle interior at an early stage, thereby improving the air-conditioning comfort.

In the present embodiment, the controller 60 is disposed to adjust a volume ratio of the ventilation air flowing through the air-heating heat exchanger 17 to the ventilation air bypassing the air-heating heat exchanger 17 among the ventilation air cooled in the cooler core 16 such that a temperature associated with a temperature TAV associated with the ventilation air temperature approaches the third target temperature TAO. Thus, the blowout air temperature TAV can be properly controlled.

In the present embodiment, the controller 60 is disposed to adjust volume of the ventilation air such that a temperature TAV associated with the ventilation air temperature approaches the third target temperature TAO. Accordingly, the blowout air temperature TAV can be properly controlled.

In the present embodiment, the controller 60 is configured to adjust volume ratio of inside air to outside air of the blowout air such that a temperature TAV associated with the ventilation air temperature approaches the third target temperature TAO. Accordingly, the blowout air temperature TAV can be appropriately controlled.

In the present embodiment, the controller 60 is configured to adjust heat generating amount of the electric heater such that a temperature TAV associated with the ventilation air temperature approaches the third target temperature TAO. Accordingly, the blowout air temperature TAV can be appropriately controlled.

In the present embodiment, the coolant/coolant heat exchanger 81C exchanges heat with the coolant cooled in coolant-cooling heat exchanger 14 and engine coolant passing through the engine. Therefore, it is possible to realize a heat pump operation to pump up heat from the engine 91 (the engine-absorption heat pump mode).

In the present embodiment, while the coolant/coolant heat exchanger 81C is disposed in the coolant/coolant heat exchanger flow passage 80C, instead of the coolant/coolant heat exchanger 81C, the engine 91 itself is disposed in the coolant/coolant heat exchanger 81C such that the coolant of which temperature is regulated by the coolant/cooler 14 and the coolant/heater 15 may be adapted to flow in the coolant passage of the engine 91.

In the present embodiment, the first switching valve 18 and the second switching valve 19 is adapted to switch between a state in which the coolant cooled by the coolant/cooler 14 flows in the radiator 13, and a state in which the coolant cooled by the coolant/cooler 14 flows in the heat transfer device 13, 81.

Thus, it is possible to switch between the outside air heat-absorption heat pump mode and the engine heat-absorption heat pump mode (device absorption heat pump mode). Depending on the engine operating state, when a high COP heating can be performed, it is possible to reduce heating fuel consumption by switching the engine heat-absorption heat pump mode.

In the present embodiment, the first switching valve 18 and the second switching valve 19 switches between a state in which the coolant heated in the heat transfer device 13, 81 flows in the coolant/cooler 14 and a state in which the coolant heated in the heat transfer device 13, 81 flows in the heater core 17.

Thus, it is possible to switch the engine waste heat direct-utilization mode (device waste heat direct-utilization mode) and an engine heat-absorption heat pump mode (device absorption heat pump mode).

Depending on the engine operating state, when the compressor 22 may not be actuated, the heating fuel consumption can be reduced by switching to the engine waste heat direct-utilization mode to cause the coolant heated by waste heat of the engine 91 to directly flow to the heater core 17.

In the present embodiment, the first switching valve 18 and the second switching valve 19 switches between a state in which coolant heated by the coolant/heater 15 flows in the heater core 17 and a state in which the coolant heated in the heat transfer device 13, 81 flows in the heater core 17.

As a result, it is possible to switch the engine waste heat direct-utilization mode (device waste heat direct-utilization mode) and the outside air heat-absorption heat pump mode.

Hereinafter, a heat transfer device in which heat transfer is conducted between the radiator 13 and the coolant circulated by the first pump 11 among the device 81 (81A, 81B, 81C) is referred to as first heat transfer device a heat exchange device, and a heat transfer device in which heat transfer is performed with the coolant circulated by the pump 12 is referred to as second heat transfer device.

In the present embodiment, the controller 60 is configured to regulate a heat transfer amount with the coolant in the first heat transfer device 13, 81 or heat exchange capability of the cooler core 16 such that a temperature associated with a temperature TC of the ventilation air cooled in the cooler core 16 approaches the first target temperature TCO (the first TC control, the second TC control), and configured to regulate a heat transfer amount with the coolant in the second heat transfer device 13, 81 or heat exchange capability of the heater core 17 such that a temperature associated with a temperature TH, TAV of the ventilation air heated in the heater core 16 approaches a second target temperature THO, TAO (the first TH control, the second TH control).

Thus, it is possible to properly control both the temperature of the heater core 16 and the temperature of the cooler core 17.

In the present embodiment, the cooler core 16 cools the ventilation air by the coolant cooled in the coolant/cooler 14 of the refrigeration cycle 21, the heater core 17 has a coolant flow mode in which the ventilation air is heated by the coolant heated in the coolant/heater 15 of the refrigeration cycle 21.

In the coolant flow mode, the controller 60 is configured to regulate heat exchange capability of the cooler core 16 or a heat transfer amount with the coolant in the second heat transfer device 13, 81 such that a temperature associated with a temperature TC of the ventilation air cooled in the cooler core 16 approaches the first target temperature TCO (the second TC control, the third TC control), and configured to regulate heat exchange capability of the heater core 17 or a heat transfer amount with the coolant in the second heat transfer device 13, 81 such that a temperature associated with a temperature TH, TAV of the ventilation air heated in the heater core 16 approaches a second target temperature THO, TAO (the second TH control, the third TA control).

Thus, it is possible to properly control both the temperature of the cooler core 16 and the temperature of the heater core 17.

For example, the controller 60 regulates a heat transfer amount with the coolant in the first heat transfer device 13, 81, by regulating a flow rate of the coolant in the first heat transfer device 13, 81 (the first TC control, the third TH control).

For example, the controller 60 regulates a heat transfer amount with the coolant in the first heat transfer device 13,

81, by regulating a heating value (heating amount) of the first heat transfer device 13, 81 (the first TC control, the third TH control).

For example, the controller 60 regulates a heat exchange capability of cooler core 16, by regulating a flow rate of the coolant in the cooler core 16 (the second TC control).

For example, the controller 60 regulates a heat exchange capability of cooler core 16, by regulating an air volume of the ventilation air in the cooler core 16 (the second TC control).

For example, the controller 60 regulates a heat transfer amount with the coolant in the second heat transfer device 13, 81, by regulating a flow rate of the coolant in the second heat transfer device 13, 81 (the third TC control, the first TH control).

For example, the controller 60 regulates a heat transfer amount with the coolant in the second heat transfer device 13, 81, by regulating a heating value (heating amount) of the second heat transfer device 13, 81 (the third TC control, the first TH control).

For example, the controller 60 regulates a heat exchange capability of the heater core 17, by regulating a flow rate of the coolant in the heater core 17 (the second TH control).

For example, the controller 60 regulates a heat exchange capability of the heater core 17, by regulating an air volume of the ventilation air in the heater core 17 (the second TH control).

In the present embodiment, when performing the first TC control, the second TC control or the third TC control and performing the first TH control, the second TH control or the third TH control, the controller 60 controls the number of revolutions of the compressor 22 within a predetermined range. Accordingly, while preventing the control hunting of the compressor 22, it is possible to appropriately control both the temperature of the cooler core 16 and the temperature of the heater core 17.

In the embodiment, the controller 60 controls the first TC control, the second TC control, the third TC control the first TH control, the second TH control or the third TH control such a manner that any one of a temperature (hereinafter referred to as the reference temperature) associated with the cooler core blowout temperature TC, a temperature associated with the heater core blowout temperature TH, and a temperature associated with the blowout air temperature TAV is closer to, or approaches the fourth target temperature TCO, THO, TAO, in case of that the controller 60 controls the flow rate of the refrigerant discharged from the compressor 22, or the controller 60 starts to controlling, a temperature except the reference temperature among a temperature associated with the temperature TC of the blown air cooled in the cooler core 16, a temperature associated with the temperature TH, TA, TV of the blown air heated in the heater core 17 and a temperature associated with the blowout air temperature TAV is close to, or approaches the fifth target temperature TCO, THO TAO.

Accordingly, since any one temperature of the cooler core blowout temperature TC, the heater core blowout temperature TH and the blowout air temperature TAV can be controlled by the refrigerant flow rate such that temperature followability is improved, air-conditioning comfort can be improved.

In the present embodiment, the first switching valve 18 and the second switching valve 19 are disposed to switch a state in which the heat medium cooled in the coolant-cooling heat exchanger 14 flows and a state in which the heat medium heated in the coolant-heating heat exchanger 15 flows in at least one heat transfer device of the first heat transfer device 13, 81 and the second heat transfer device 13, 81.

Accordingly, the heat-absorption operating mode to absorb heat from at least one of the heat transfer device, the waste heat transfer mode to transfer waste heat to at least one of the heat transfer device can be switched.

The first heat transfer device in the present embodiment, for example, is a coolant/coolant heat exchanger 81C which exchanges heat between coolant cooled in coolant-cooling heat exchanger 14 and engine coolant passing through the engine.

Accordingly, when the heat pump operation which absorbs waste heat of the engine 91 is performed, the temperature of the cooler core 16 can be appropriately controlled. Furthermore, since it is possible to moderately raise a coolant temperature in the coolant/cooler 14 even if outdoor air temperature is low, high efficiency (COP) heating can be realized.

The first heat transfer device in the present embodiment, for example, may be an engine 91 which has a flow passage where the coolant of which temperature controlled by coolant temperature control heat exchanger 14, 15 cooled in the coolant-cooling heat exchanger 14 flows.

In the present embodiment, the first switching valve 18 and the second switching valve 19 switch between a state in which the coolant cooled by coolant-cooling heat exchanger 14 flows in one side of the radiator 13 and the first heat transfer device 81 and does not flow in the opposite side, and vice versa, that is, a state in which the coolant flows in the above-mentioned opposite side of the radiator 13 and the first heat transfer device 81 and does not flow in the other side.

Accordingly, when the first transfer device 81 is heating the coolant, it is possible to switch between outside air heat-absorption heat pump mode and the device heat-absorption heat pump mode (engine heat-absorption heat pump mode).

In the present embodiment, the first switching valve 18 and the second switching valve 19 switch between a state in which the coolant having flowed through the first heat transfer device 81 flows in one side of the heater core 17 and the coolant-cooling heat exchanger 14 and does not flow in the opposite side, and vice versa, that is, a state in which the coolant flows in the above-mentioned opposite side of the heater core 17 and the coolant-cooling heat exchanger 14 and does not flow in the other side.

Accordingly, when the first heat transfer device 81 is heating the coolant, it is possible to switch between engine waste heat direct-utilization mode (device waste heat direct-utilization mode) and engine heat-absorption heat pump mode (device heat-absorption heat pump mode).

In the present embodiment, the first switching valve 18 and the second switching valve 19 switch between a state in which coolant is circulated between one heat transfer device 81 of the first heat transfer device 81 and the second heat transfer device 81 and the heater core 17, and a state in which the coolant cooled by coolant-cooling heat exchanger 14 flows in radiator 13.

As a result, it is possible to switch the engine waste heat direct-utilization mode (device waste heat direct-utilization mode) and the outside air heat-absorption heat pump mode.

Hereinafter, the heat exchange device 18, 31 in which heat transfer is performed with the coolant circulated by one of the first pump 11 and the second pump 12 is referred to as the first heat transfer device, and heat transfer by the other one is referred to as the second heat transfer device. Furthermore heat exchanger in which heat exchange is performed between the coolant is circulated by one of the cooler core 16 and the heater core 17 and the ventilation air is referred to as the first coolant air heat exchanger (first heat-medium air heat exchanger), and heat exchanger in which heat exchange is performed between the coolant is circulated by the other one of the cooler core 16 and the heater core 17 and the ventilation air is referred to as the second coolant air heat exchanger (Second heat-medium air heat exchanger).

In the present embodiment, the controller 60 is configured to regulate the heat transfer amount with the coolant in the first heat transfer device 13, 81 or the heat exchange capability of the coolant air heat exchanger 16, 17 such that a temperature associated with the temperature TC, TH of the ventilation air having temperature regulated by the first coolant air heat exchanger 16, 17 approaches the first target temperature TCO, THO.

Thus, it is possible to properly control the temperature of the first coolant air heat exchanger 16, 17.

For example, the controller 60 regulates the heat transfer amount of the coolant in the first heat transfer device 13, 81, by regulating the flow rate of the coolant in the first heat transfer device 13, 81 (the first TC control, the third TH control).

Accordingly, it is possible to control the blowout air temperature in the vehicle interior TAV without the use of the air mix door 55. Since it becomes possible to eliminate the air mix door 55, it is possible to downsize the indoor air-conditioning unit 50.

For example, the controller 60 is configured to adjust the heat transfer amount with the coolant in the first heat exchange equipment 13, 81, by adjusting the heat amount of the first heat transfer device 13, 81 (the first TC control, the first TH control).

For example, the controller 60 is configured to adjust the heat exchange capability of the coolant in the first coolant air heat exchanger 16, 17 by adjusting the flow rate of the first coolant air heat exchanger 16, 17 (the second TC control, the second TH control).

For example, the controller 60 is configured to regulate the heat exchange capacity of the first coolant air heat exchangers 16, 17 by regulating the air volume of the air blown in the first coolant air heat exchangers 16, 17 (the second TC control, the second TH control).

Specifically, when the first coolant air heat exchanger is a cooler core 16, controller 60 is configured to allow a temperature associated with the temperature TC of the ventilation air cooled by the first coolant air heat exchanger 16 to approach the first target temperature TCO (the first TC control, the second TC control).

Thus, it is possible to properly control the temperature of the cooler core 16.

Specifically, when the first coolant air heat exchanger is a heater core 17, the controller 60 configured to allow a temperature associated with the temperature TH, TA of the ventilation air heated by the first coolant air heat exchanger 17 to approach the first target temperature THO, TAO (the first TC control, the second TH control).

Thus, it is possible to properly control the temperature of the heater core 17.

The present embodiment includes a coolant flow mode, in which one of the coolant cooled by the coolant/cooler 14 of the refrigeration cycle 21 and the coolant heated the coolant/heater 15 of the refrigeration cycle 21 flows through the first coolant air heat exchangers 16, 17 and the first heat exchange device 18, 31, and the other one of the coolant flows through the second coolant air heat exchangers 16, 17 and the second heat exchanging device 18, 31.

In the coolant flow mode, the controller 60 regulates the heat transfer amount with the coolant in the second heat transfer device 13, 81 such that a temperature associated with the temperature TC, TH of the blown air, or ventilation air, having a temperature adjusted in the first coolant air heat exchangers 16, 17, is closer to, or approaches, the first target temperature TCO, THO (the third TC control, the third TH control).

Accordingly, even when the compressor 22 is operating regardless of the temperature of the first coolant air heat exchangers 16, 17, it is possible to appropriately control the temperature of the first coolant air heat exchangers 16.

In the embodiment, when the first TC control, the second TC control, the third TC control, the first TH control, the second TH control, or the third TH control is performing, the controller 60 controls the number of revolutions of the compressor 22 of the refrigeration cycle 21 within a predetermined range.

Accordingly, while preventing the control hunting of the compressor 22, it is possible to appropriately control the temperature of the first coolant air heat exchangers 16, 17.

In the present embodiment, the controller 60 is adapted to switch between a first control mode and a second control mode. The first control mode is a combination of the fourth TC control and the first to the third TH control or a combination of the fourth TH control and the first to the third TC control. The second control mode is a combination of the first to the third TC control and the first to the third TH control.

Accordingly, in the first control mode, since the temperature of the first coolant air heat exchangers 16, 17 and the temperature of the second coolant air heat exchanger 16, 17 can be controlled by the refrigerant flow rate such that the temperature followability is improved, the air-conditioning comfort can be improved.

In the second control mode, even when the compressor 22 is operating independent of the temperature of the first coolant air heat exchangers 16, 17 and the temperature of the second coolant air heat exchangers 16, 17, the temperature of the first temperature of the coolant-air heat exchanger 16, 17 and the temperature of the second coolant air heat exchanger 16, 17 can be properly controlled.

In the present embodiment, the first switching valve 18 and the second switching valve 19 is adapted to switch a state in which the heat medium cooled in the heat medium-cooling heat exchanger 14 flows and a state in which the heat medium heated in the heat medium-heating heat exchanger 15 flows in at least one heat transfer device of the first heat transfer device 13, 81 and second heat exchange devices 13, 81.

Accordingly, it is possible to switch between a state in which coolant absorbs heat from the first heat transfer device 13, 81, and a state in which coolant is radiated to the first heat transfer device 13, 81. Therefore, it is possible to switch between a operating mode (device heat-absorption heat pump mode) in which the vehicle interior is heated by utilizing waste heat of the first heat transfer device 13, 81 and a operating mode (device heating heat pump mode) in which the first heat transfer device 13, 81 is heated by utilizing other waste heat (for example, cooling waste heat).

For example, the first heat transfer device, is a coolant outside air heat exchanger 13 for sensible-heat exchange with a coolant cooled by the coolant-cooling heat exchanger 14 and the outside air, the second heat transfer device is a coolant/coolant heat exchanger 81C disposed to conduct heat exchange between a coolant heated in the coolant-cooling heat exchanger 15 and an engine coolant circulating an engine 91.

Accordingly, since it is possible to heat the engine 91 absorbing heat from the outside air, the engine warm-up performance is improved.

For example, the first heat exchange device is a coolant outside air heat exchanger 13 adapted to conduct sensible-heat exchange between the coolant cooled in the coolant-cooling heat exchanger 14 and outside air, the second heat transfer device is an engine 91 having a flow passage in which the coolant heated in the coolant-heating heat exchanger 15 flows.

Accordingly, since the engine 91 can be heated to absorb heat from the outside air, fuel efficiency can be improved by improving the engine warm-up performance.

In the present embodiment, the first coolant air heat exchanger 16 is adapted to cool the ventilation air by conducting sensible-heat exchange between the ventilation air and the coolant in the coolant-cooling heat exchanger 14. When at least one heat transfer device of the first heat transfer device 13, 81 and the second heat transfer device 13, 81 is disposed to conduct heat transfer with the coolant heated in the coolant-heating heat exchanger 15, the controller 60 is configured to regulate a flow rate of the refrigerant discharged by the compressor 22 such that the temperature associated with the temperature TC of the ventilation air cooled in the first coolant air heat exchanger 16 approaches the first target temperature TCO.

Accordingly, it is possible to heat the second heat transfer devices 13, 81 by cooling waste heat (heat added heat absorbed from the ventilation air blown into the vehicle interior, and electrical device waste heat and mechanical loss of the compressor 22). The temperature of the first coolant air heat exchanger 16 can be controlled by the flow rate of the refrigerant to enhance temperature followability, thereby to improve air-conditioning comfort.

In the present embodiment, the first coolant air heat exchanger 17 is disposed to heat the ventilation air, or blown air, by conducting sensible-heat exchange between the coolant heated in the coolant-heating heat exchanger 15 and ventilation air. When at least one heat transfer device of the first heat transfer device 13, 81 and second heat transfer device 13, 81 is disposed to conduct heat transfer with the coolant cooled in the coolant-cooling heat exchanger 14, the controller 60 is configured to regulate a flow rate of the refrigerant discharged from the compressor 22 such that the temperature associated with the temperature TH of the ventilation air heated in the first coolant air heat exchanger 17 approaches the first target temperature THO.

Thereby, the vehicle interior can be heated by utilizing heat absorbed from at least one of the heat exchange device. Since the temperature of the first coolant air heat exchanger 17 can be controlled by the flow rate of the refrigerant to enhance temperature followability, air-conditioning comfort may be improved.

In the present embodiment, the first coolant air heat exchanger 17 is disposed to heat the ventilation air by conducting sensible-heat exchange between the coolant heated in the coolant-heating heat exchanger 15 and the ventilation air, and the first heat transfer device 13 is a coolant air heat exchanger disposed to conduct heat exchange between the coolant and the ventilation air. When the second heat transfer device 81 is a device disposed to heat the coolant, the first switching valve 18 and the second switching valve 19 is disposed to switch between a state in which the coolant cooled by coolant-cooling heat exchanger 14 flows through the first heat transfer device 13, and a state in which the coolant cooled by coolant-cooling heat exchanger 14 flows through the second heat transfer device 81.

Thus, it is possible to switch the outside air heat-absorption heat pump mode configured to heat the vehicle interior by absorbing heat from the outside air, and a device heating heat pump mode configured to heat the vehicle interior by absorbing heat from the second heat transfer device 81.

In the present embodiment, when the first heat transfer device 81 is a device configured to heat the coolant, the first switching valve 18 and the second switching valve 19 is disposed to switch between a state in which the coolant is circulated between the second heat transfer device 81 and the first coolant air heat exchanger 17, and a state in which the coolant cooled by coolant-cooling heat exchanger 14 flows through the first heat transfer device 13, Thus, it can be switched between the device waste heat direct-utilization mode in which the coolant heated in the first heat transfer device 81 is disposed to directly flow through the first coolant air heat exchanger 17 such that the vehicle interior is heated, and the device heat-absorption heat pump mode in which the vehicle interior is heated by heat pump operation configured to pump up the waste heat of the first heat transfer device 81.

In the present embodiment, the first heat transfer device 13 is a coolant outside air heat exchanger disposed to conduct the sensible-heat exchange between the coolant and outside air. When the second heat transfer device 81 is a device disposed to heat the coolant, the first switching valve 18 and the second switching valve 19 is adapted to switch between a state in which the coolant cooled in the coolant-cooling heat exchanger 14 flows through the first heat transfer device 13, and a state in which the coolant is circulated between the second heat transfer device 81 and the coolant air heat exchanger 17.

Thus, it is possible to switch between the outside air heat-absorption heat pump mode in which the vehicle interior is heated by heat pump operation to pump up the outside air heat and the device waste heat direct-utilization mode in which the vehicle interior is heated by flowing coolant heated in the second heat transfer device 81 directly to the first coolant air heat exchanger 17

For example, the first heat transfer device 81 is a rear-seat heat exchanger disposed to conduct sensible heat exchange between a ventilation air blown to the occupants of the vehicle rear seat and the coolant.

Accordingly, since the ventilation air blown toward the occupants of the vehicle rear seat can be cooled and heated by one rear-seat heat exchanger 81, it is possible to simplify the structure, as compared with the case in which a heat exchanger for heating and the heat exchanger for cooling are separately provided. Moreover, it is possible to adjust the temperature without utilizing the air mix door.

For example, the first heat transfer device 81 is a battery temperature control heat exchanger disposed to regulate a temperature to conduct sensible exchange between the onboard battery in the vehicle and coolant by sensible-heat exchange to adjust the temperature of the battery.

Thus, since the battery can be cooled and heated by one battery temperature control heat exchanger 81, it is possible to simplify the structure, as compared with the case in which a heat transfer device for heating and the heat transfer device for cooling are separately provided.

In the present embodiment, while an example of a switching condition of the coolant flow mode is shown in FIGS. 24 to 28, each coolant flow mode may be switched in the following conditions.

(Engine Water Temperature Conditions)

When the engine water temperature is lower than a predetermined temperature (e.g. 40° C.), it may be switched to the engine heat pump mode. When the coolant temperature in the outlet side of the coolant/heater 15 is higher than the engine water temperature, it may be switched to the engine heat pump mode.

When the engine water temperature is equal to or higher than a predetermined temperature, it may be switched to the device heating mode. For example, when the engine water temperature is equal to or higher than 0° C., it may be switched to the device heating mode to warm up the battery. For example, when the engine water temperature is equal to or higher than the coolant temperature in coolant circuit of the coolant/heater 15 side, it may be switched to the device heating mode to preheat the coolant/heater.

When the engine water temperature is lower than a predetermined temperature (e.g. outside temperature+α° C.), it may be switched to the thermal mass utilization cooling mode.

When an increase amount per time of engine water temperature exceeds a predetermined amount in the outside air heat-absorption heat pump mode, it may be switched to the engine heat-absorption heat pump mode.

When a decrease amount per time of engine water temperature exceeds a predetermined amount in the engine heat-absorption heat pump mode, it may be switched to the outside air heat-absorption heat pump mode.

When the decrease amount per time of engine water temperature exceeds a predetermined amount in the engine waste heat direct-utilization mode, it may be switched to the engine heat-absorption heat pump mode.

(Engine Waste Heat Amount Condition)

If the heat amount given from the engine 91 to the coolant (hereinafter, referred to as engine waste heat amount.) is less than the predetermined amount (heat absorption amount required for the heat pump heating), it may be switched to the outside air heat-absorption heat pump mode.

When the engine waste heat amount is equal to or greater than a predetermined amount (heat absorption amount required for the heat pump heating), it may be switched to the engine heat-absorption heat pump mode.

When the engine waste heat amount is equal to or greater than a predetermined amount (heat absorption amount required for the heat pump heating), it may be switched to the device heating mode.

When the engine waste heat amount is less than a predetermined amount (heat absorption amount required for the heat pump heating), it may be switched to the thermal mass utilization cooling mode.

The following is an example of a method for calculating heat absorption amount required for the heat pump heating. For example, it is possible to estimate the heat absorption amount required for the heat pump heating from heating requirement heat amount. Specifically, it is possible to calculate the heating requirement heat amount from room temperature set value (manual setting by an occupant or automatic setting), cabin temperature, vehicle speed, outside air temperature or the like, further to calculate the heat absorption amount required for the heat pump heating on the basis of the vehicle speed (physical quantity associated with the wind speed in the radiator 13), the outside air temperature, the frost amount estimate, and the capability of the compressor 22.

It is possible to estimate the frost amount estimate on the basis of outside air temperature and the heating operation time, the coolant temperature in the radiator 13, air humidity or the like. The frost amount estimate may be on the basis of the frost determination map. The capacity value of the compressor 22 can be estimated on the basis of intake refrigerant temperature, discharge refrigerant temperature and rotation speed. The capacity value of the compressor 22 may be calculated based on the map.

The heat absorption amount required for the heat pump heating, may be calculated based on the map described in relation to outside air temperature, vehicle speed, coolant temperature, heating requirement, and current heating capacity.

It may be switched to each mode according to the heat amount of the device 81 in place of the engine waste heat amount.

The following is an example of a method for detecting the engine waste heat amount and heat amount of the device 81. The engine waste heat amount and the heat amount of the device 81 can be estimated on the basis of the detected value of one or two of the coolant temperature sensor. The coolant temperature sensor is, for example, a coolant temperature sensor in the engine 91 and a coolant temperature sensor in the coolant/heater 15.

The engine waste heat amount and the heat amount of the device 81 can be estimated based on the inclination of the variation amount of the coolant temperature. For example, when the variation amount of the coolant temperature in the engine 91 has a negative inclination and its inclination exceeds a predetermined value, the engine waste heat amount can be estimated to be below the heat absorption amount required for the heat pump heating.

The engine waste heat amount and the heat amount of the device 81 can be estimated from the traveling load. For example, the engine waste heat amount or the heat amount of the device 81 can be estimated from the vehicle traveling load.

The engine waste heat amount can be estimated based on the sensor information values associated with fuel consumption and combustion of the engine 91. When the device 81 is an electric device, the heat amount of the device 81 can be estimated from the energization amount (i.e. electric current amount) of the device 81. For example, the heat amount of the device 81 can be estimated on the basis of electric power conversion efficiency, resistance, and electric power-power conversion efficiency or the like.

(Engine Operating State Condition)

When warming up the engine 91, it may be switched to the outside air heat-absorption heat pump mode. After warm-up completion determination of the engine 91, it may be switched to the engine heat-absorption heat pump mode.

When an EV traveling mode in the engine stop, it may be switched to the outside air heat-absorption heat pump mode. The EV traveling mode is a travel mode to travel mainly by driving force of a traveling electric motor.

Plug-in hybrid vehicle is to be in the EV traveling mode to travel mainly by driving force of a traveling electric motor, when power storage residual quantity SOC of the battery, as in a time of vehicle travel starting, is equal to or greater than travel reference residual quantity of power storage, by charging the battery (vehicle battery) from the external electric-power source at the time of vehicle stopping prior to the vehicle traveling. On the other hand, when power storage residual quantity SOC of the battery is lower than travel reference residual quantity of power storage battery while the vehicle is traveling, the plug-in hybrid vehicle is to be in the HV travel mode to travel mainly by the driving force of the engine 91.

More specifically, EV travel mode is a travel mode for traveling the vehicle by the driving force mainly output from the traveling electric motor, and it is to assist the traveling electric motor by operating the engine 91 when the vehicle traveling load becomes high load. That is, the vehicle is to be in a travel mode in which traveling driving force output from the traveling electric motor (motor side driving force) becomes greater than the traveling driving force output from the engine 91 (engine-side driving force).

HV travel mode is a travel mode for traveling the vehicle by the driving force mainly output from the engine 91, and it is to assist the engine 91 by operating the traveling electric motor when the vehicle traveling load becomes high load. That is, the engine side driving force becomes greater than the electric motor side driving force.

In the plug-in hybrid vehicle of the present embodiment, the fuel consumption of the engine 91 regarding the normal vehicle obtaining a driving force for a vehicle traveling from only the engine 91 is to be restricted to improve the vehicle fuel economy, by switching EV travel mode and the HV travel mode. Switching between the EV travel mode and the HV travel mode is controlled by the driving force control unit (not shown).

When an idle stop state, it may be switched to the engine heat-absorption heat pump mode. The idle stop state is a state in which the engine 91 is temporarily stopped when the vehicle stopping, such as waiting for the stop signal to change a traffic signal.

When the time average rotational speed of the engine 91 exceeds a predetermined amount, it may be switched to the engine heat-absorption heat pump mode.

When pre-heating is performed while the vehicle is stopped (when engine 91 stopped), it may be switched to the engine waste heat direct-utilization mode. The pre-heating is to heat the vehicle interior before the start of the engine 91.

When the time average rotational speed of the engine 91 exceeds a predetermined amount, it may be switched to the engine waste heat direct-utilization mode.

When warming up the engine 91, it may be switched to the engine heating heat pump mode. While stopping the engine 91 (EV travel mode, the idle stop, charging or the like), it may be switched to the engine heating heat pump mode.

During operation of the engine 91, it may be switched to the device heating mode, during the stop of the engine 91 (when the vehicle is stopped), it may be switched to the engine waste heat direct-utilization mode.

When the engine 91 is overheated, it may be switched to the engine waste heat direct-utilization mode.
(Battery State of Charge SOC Conditions)

If the state of charge SOC of the battery is greater than a predetermined amount (when main EV running), it may be switched to the outside air heating heat pump mode, the engine heating heat pump mode or thermal mass utilization cooling mode.

If the state of charge SOC of the battery is lower than a predetermined amount (when main engine running), it may be switched to the engine heat-absorption heat pump mode, the engine waste heat direct-utilization mode or device heating mode.

(Outside Air Temperature Conditions)

When the outside air temperature is lower than the predetermined temperature (for example, extremely low temperature range such as −20° C. and temperature range except heat pump operating guarantee temperature), it may be switched to the engine heat-absorption heat pump mode.

When the outside air temperature is lower than the predetermined temperature, it may be switched to the engine heating heat pump mode.
(Low Temperature Side Water Temperature Conditions)

In the outside air heat-absorption heat pump mode, when the coolant temperature in the coolant circuit of coolant/cooler 14 side (hereinafter referred to as the low temperature side water temperature) is lower than a predetermined temperature (e.g., less than −25° C., frost and radiator capability shortfall determination), it may be switched to the engine heat-absorption heat pump mode.

In the engine heat-absorption heat pump mode, when the low temperature side water temperature is less than a predetermined temperature (less than the outside air temperature, suspicion of engine failure), it may be switched to the outside air heat-absorption heat pump mode or engine waste heat direct-utilization mode.
(Other Conditions)

When the radiator 13 is estimated or determined to be frosted, it may be switched to the engine heat-absorption heat pump mode.

When a configuration device of the refrigeration cycle 21 or a component of the coolant circuit of the coolant/heater 15 side has a failure, it may be switched to the engine waste heat direct-utilization mode.

According to a switching signal (manual switching signal) in manual mode, it may be switched the outside air heat-absorption heat pump mode, the engine heat-absorption heat pump mode, and the engine waste heat direct-utilization mode.

After start-up of the engine 91, the engine heating heat pump mode may be performed during a predetermined period of time. After the engine 91 start-up, until the engine water temperature reaches a predetermined temperature, the engine heating heat pump mode may be performed.

For a certain time before the warm-up operation, it may be executed the device heating mode. When the refrigeration cycle device has failure, and the device heating is requested, it may be switched to the device heating mode. When the coolant system of the radiator 13 is out of order, it may be switched to a thermal mass utilization cooling mode.
[Ninth Embodiment]

Figure 32:
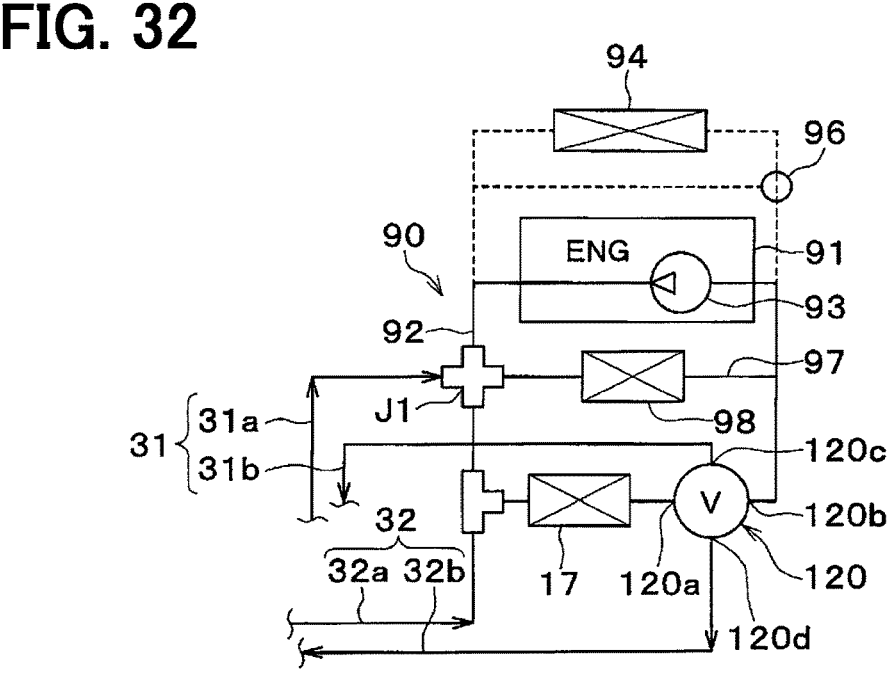
FIG. 32 is a diagram schematically illustrating a configuration of a vehicle thermal management system according to a ninth embodiment.

In the eighth embodiment, the engine cooling circuit 90 is in cooperation with the vehicle thermal management system 10 via a coolant/coolant heat exchanger 81C. In the present embodiment, the engine cooling circuit 90 is in cooperation with the vehicle thermal management system 10 via a connecting flow passage switching valve 120, as shown in FIG. 32.

The heater core 17 and the connecting flow passage switching valve 120 is disposed in the circulation flow passage 92 of the engine cooling circuit 90. The connecting flow passage switching valve 120 is composed of a four-way valve having a four coolant inlet and outlet 120a, 120b, 120c, 120d.

The flow passage switching valve 120 is disposed in the coolant outlet side of the heater core 17 and the coolant inlet side of the third pump 93 among the circulation flow passage 92. That is, the circulation flow passage 92 is connected to the first coolant inlet and outlet 120a and the second coolant inlet and outlet 120b of the flow passage switching valve 120.

An upstream side portion 31a of the first pump passage 31 is connected to a merging portion J1 joining a engine auxiliary flow passage 97 of the engine cooling circuit 90 and the circulation flow passage 92. A downstream side portion 31b of the first pump flow passage 31 is connected to the third coolant inlet and outlet 120c of the flow passage switching valve 120.

An upstream side portion 32a of the second pump flow passage 32 is connected to the coolant outlet side of the circulation flow passage 92 and the coolant inlet side of the heater core 17. A downstream side portion 32b of the second pump flow passage 32 is connected to the fourth coolant inlet and outlet 120d of the connecting flow passage switching valve 120.

Figure 33:
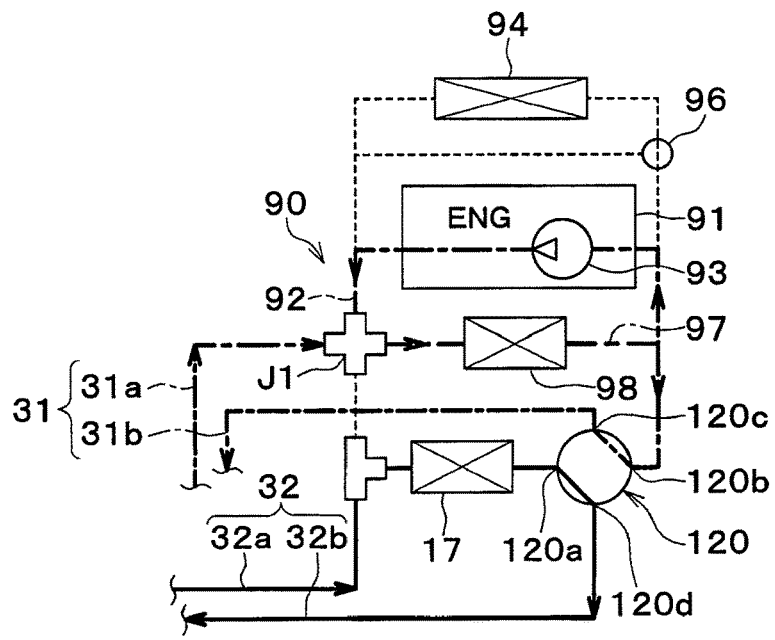
FIG. 33 is a diagram schematically illustrating a configuration of an engine heat-absorption heat pump mode in the vehicle thermal management system according to the ninth embodiment.

As shown in FIG. 33, in the engine heat-absorption heat pump mode, the flow passage switching valve 120 communicates the circulation flow passage 92 connected to the second coolant inlet and outlet 120b and the downstream side portion 31b of the first pump flow passage 31 such that the circulation flow passage 92 connected to the second coolant inlet and outlet 120b is communicated with the downstream side portion 31b of the second pump flow passage 32. Accordingly, the coolant flows as shown in the thick solid line and thick alternate long and short dash line arrows in FIG. 33.

Figure 34:
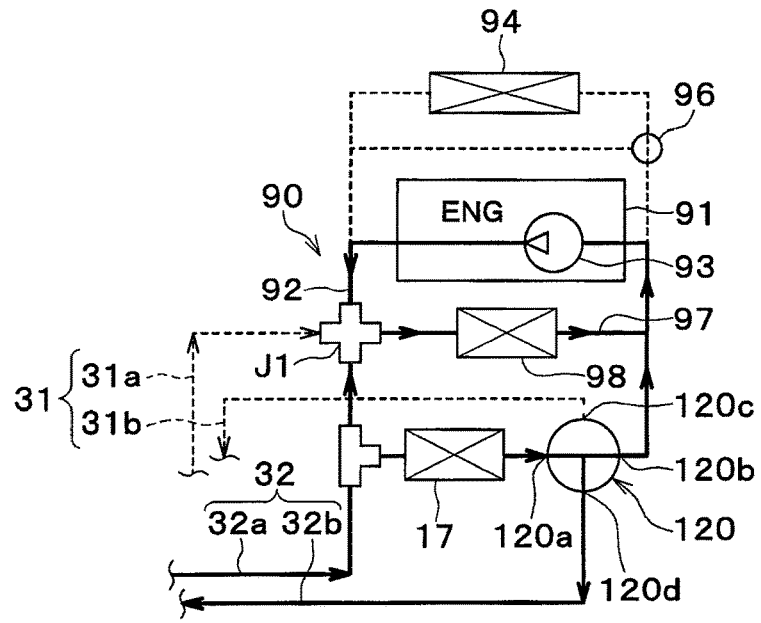
FIG. 34 is a diagram schematically illustrating a configuration of an engine-heating heat pump mode in the vehicle thermal management system according to the ninth embodiment.

As shown in FIG. 34, in the engine heating heat pump mode, the flow passage switching valve 120 communicates the circulation flow passage 92 and the downstream side portion 31b of the second pump flow passage 32 with each other to close the downstream side portion 31b of the flow passage 31.

Accordingly, the coolant flows, as shown in thick solid arrow in FIG. 33. Furthermore, the flow passage switching valve 120 adjusts the flow rate ratio of the coolant to be distributed to the circulation flow passage 92 side and the second pump flow passage 32 side.

Figure 35:
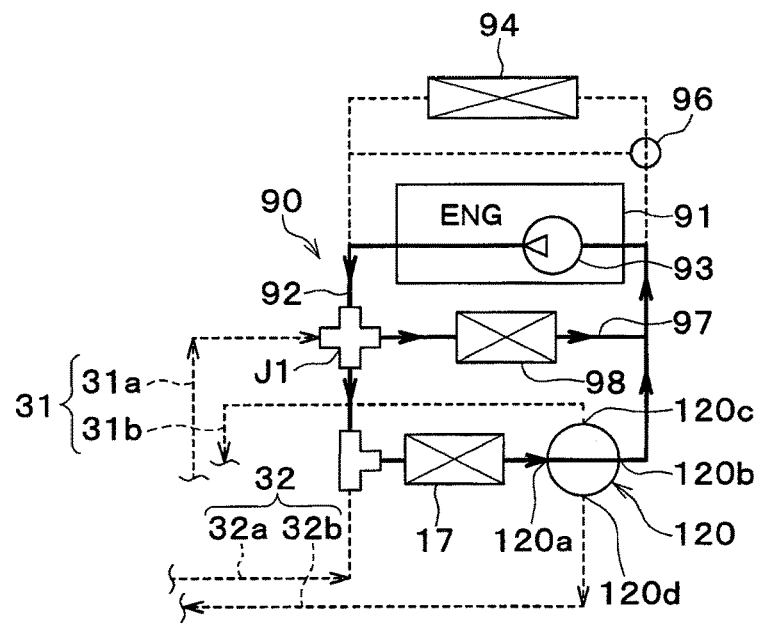
FIG. 35 is a diagram schematically illustrating a configuration of a direct engine waste heat utilization mode in the vehicle thermal management system according to the ninth embodiment.

As shown in FIG. 35, in the engine waste heat direct-utilization mode, the connecting flow passage switching valve 120 communicates with the circulation flow passage 92 so as to close the downstream side portion 31b of the first pump flow passage 31 and the downstream side portion 32b of the second pump flow passage 32. Accordingly, the coolant flows, as shown in thick solid arrow in FIG. 35.

The present embodiment has the same functional effects as the eighth embodiment.

[Tenth Embodiment]

Figure 36:
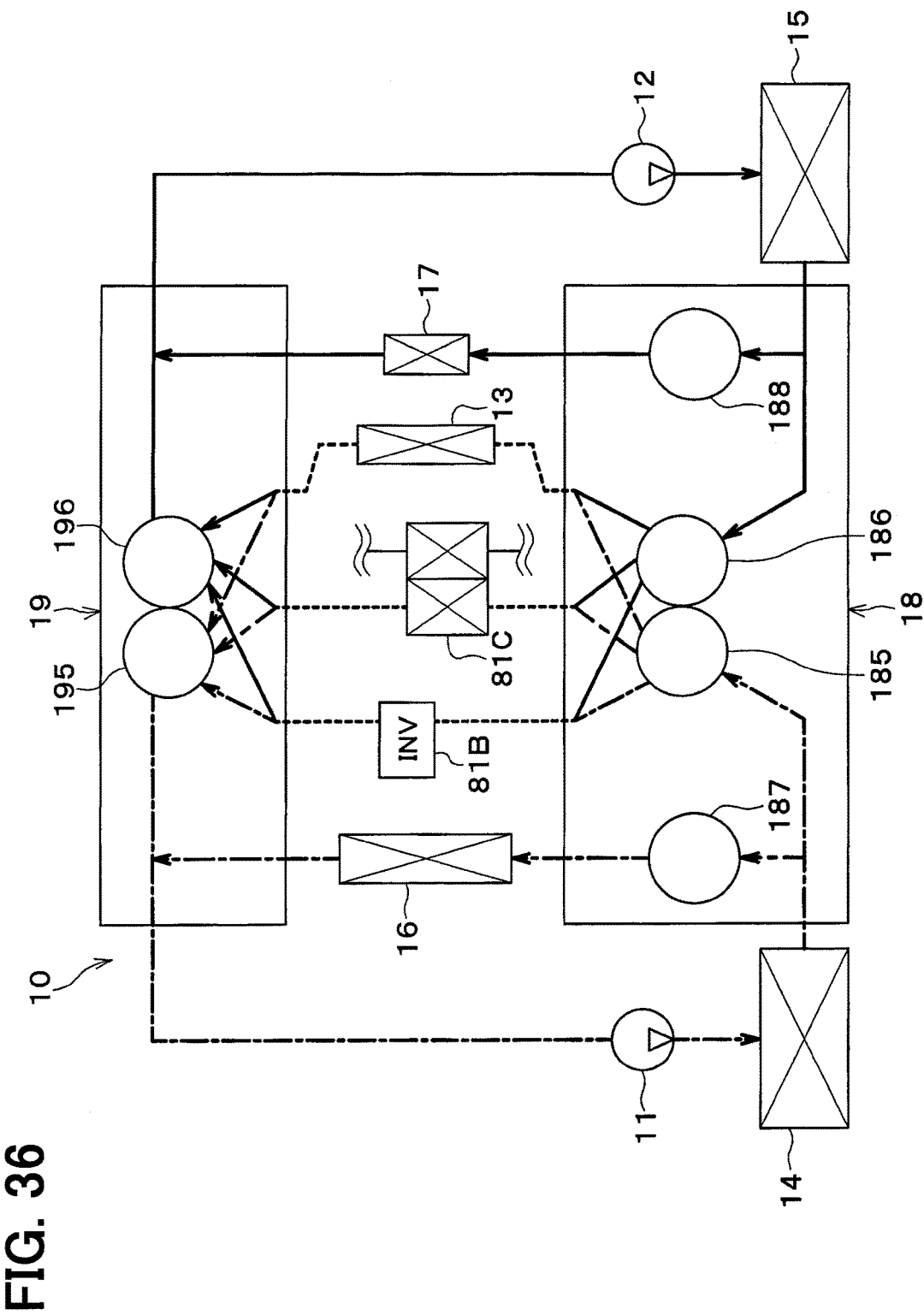
FIG. 36 is a diagram illustrating an overall configuration of a vehicle thermal management system according to a first example of a tenth embodiment.

In the embodiment, a modification of the first and second switching valves 18 and 19 is shown. The first switching valve 18 has a first pump side valve body 185, a second pump side valve body 186, a cooler core side valve body 187 and a heater core side valve body 188 in the first example illustrated in FIG. 36

The first pump side valve body 185 switches each of a inverter 81B, a coolant/coolant heat exchanger 81C and a radiator 13 between a state in which a coolant discharged from the first pump 11 flows in and a state in which a coolant discharged from the first pump 11 dose not flow in, and regulates a flow amount of the coolant.

The second pump side valve body 186 switches each of the inverter 81B, the coolant/coolant heat exchanger 81C and the radiator 13 between a state in which a coolant discharged from the second pump 12 flows in and a state in which a coolant discharged from the second pump 12 dose not flow in, and adjusts a flow amount of the coolant.

A cooler core side valve body 187 adjusts a flow amount of the coolant which flows into the cooler core 16. A heater core side valve body 188 adjusts a flow amount of the coolant which flows into the cooler core 17.

The second switching valves 19 has a first pump side valve body 195 and a second pump side valve body 196 in the first example.

The first pump side valve body 195 switches the coolant that has flowed out from the inverter 81B, the coolant that has flowed out from the coolant/coolant heat exchanger 81C and the coolant that has flowed out from the radiator 13 between a state in which the coolant flows out to the first pump 11 and a state in which the coolant does not flow out to the first pump 11, and adjusts the flow amount of the coolant.

The second pump side valve body 196 switches the coolant that has flowed out from the inverter 81B, the coolant that has flowed out from the coolant/coolant heat exchanger 81C and the coolant that has flowed out from the radiator 13 between a state in which the coolant flows out to the second pump 12 and a state in which the coolant does not flow out to the second pump 12, and adjusts the flow amount of the coolant.

The present example has the same functional effects as the embodiment.

Figure 37:
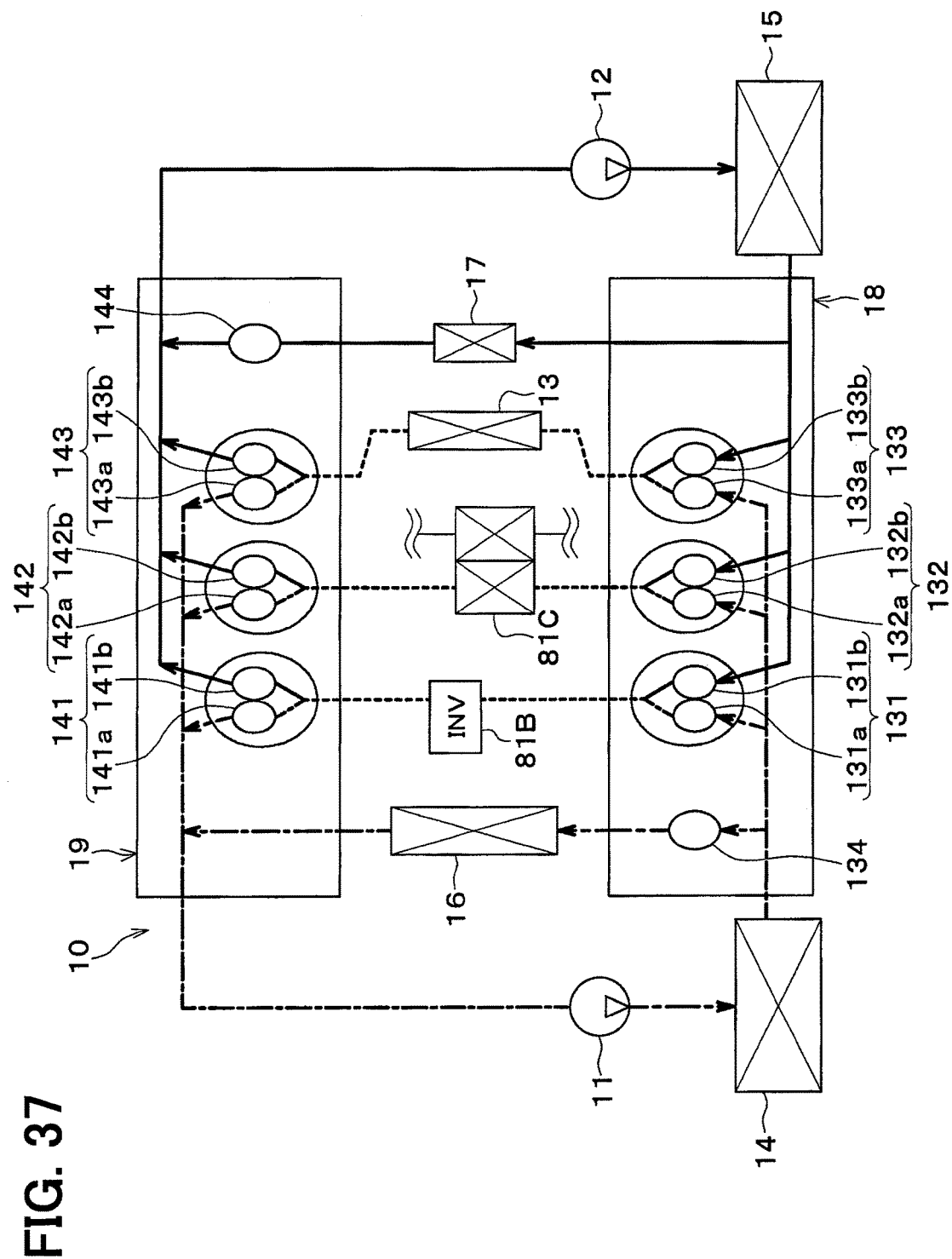
FIG. 37 is a diagram illustrating an overall configuration of a vehicle thermal management system according to a second example of a tenth embodiment.

The first switching valve 18 has an inverter switching valve 131, a coolant/coolant heat exchanger switching valve 132, a radiator switching valve 133 and a cooler core switching valve 134 in the second example illustrated in FIG. 37

Inverter switching valve 131 has a first pump-side valve body 131a and the second pump-side valve body 131b. The first pump-side valve body 131a interrupts the coolant flow to the inverter 81B from the first pump 11 and adjusts the coolant flow rate. The second pump-side valve body 131b interrupts the flow of coolant from the second pump 12 to the inverter 81B, and adjusts the coolant flow rate.

The coolant/coolant heat exchanger switching valve 132 has a first pump-side valve body 132a and the second pump-side valve body 132b. The first pump-side valve body 132a interrupts the coolant flow to the coolant/coolant heat exchanger 81C from the first pump 11, and adjusts the coolant flow rate. The second pump-side valve body 132b interrupts the coolant flow to the coolant/coolant heat exchanger 81C from the second pump 12 and adjusts the coolant flow rate.

The radiator switching valve 133 has a first pump-side valve body 133a and the second pump-side valve body 133b. The first pump-side valve body 133a interrupts the coolant flow to the radiator 13 from the first pump 11, and adjusts the coolant flow rate. The second pump-side valve body 133b interrupts the coolant flow to the radiator 13 from the second pump 12, and adjusts the coolant flow rate.

The cooler core switching valve 134 interrupts the coolant flow to the cooler core 16 from the second pump 12 and adjusts the coolant flow rate.

In the second example, the second switching valve 19 includes an inverter switching valve 141, a coolant/coolant heat exchanger switching valve 142, a radiator switching valve 143 and a heater core switching valve 144.

The inverter switching valve 141 has a first pump-side valve body 141a and a second pump-side valve body 141b. The first pump-side valve body 141a interrupts the coolant flow to the first pump 11 from the inverter 81B, and adjusts the coolant flow rate. The second pump-side valve body 141b interrupts the coolant flow from the inverter 81B to the second pump 12, and adjusts the coolant flow rate.

The coolant/coolant heat exchanger switching valve 142 has a first pump-side valve body 142a and a second pump-side valve body 142b. The first pump-side valve body 142a interrupts the coolant flow to the coolant/coolant heat exchanger 81C from the first pump 11, and adjusts the coolant flow rate. The second pump-side valve body 142b interrupts the coolant flow from the coolant/coolant heat exchanger 81C to the second pump 12, adjusts the coolant flow rate.

The radiator switching valve 143 includes a first pump-side valve body 143a and the second pump-side valve body 143b. The first pump-side valve body 143a interrupts the coolant flow from the radiator 13 to the first pump 11, and adjusts the coolant flow rate. The second pump-side valve body 143b interrupts the coolant flow from the radiator 13 to the second pump 12, and adjusts the coolant flow rate.

Heater core switching valve 144 interrupts the coolant flow from the heater core 17 to the second pump 12, and adjusts the coolant flow rate.

The present embodiment has the same functional effects as the above embodiments.

[Eleventh Embodiment]

In this embodiment, described are methods of controlling temperatures of a heat transfer device 81 and a heat exchanger when the heat transfer device 81 is connected to one heat exchanger of the cooler core 16 and the heater core 17.

Figure 38:
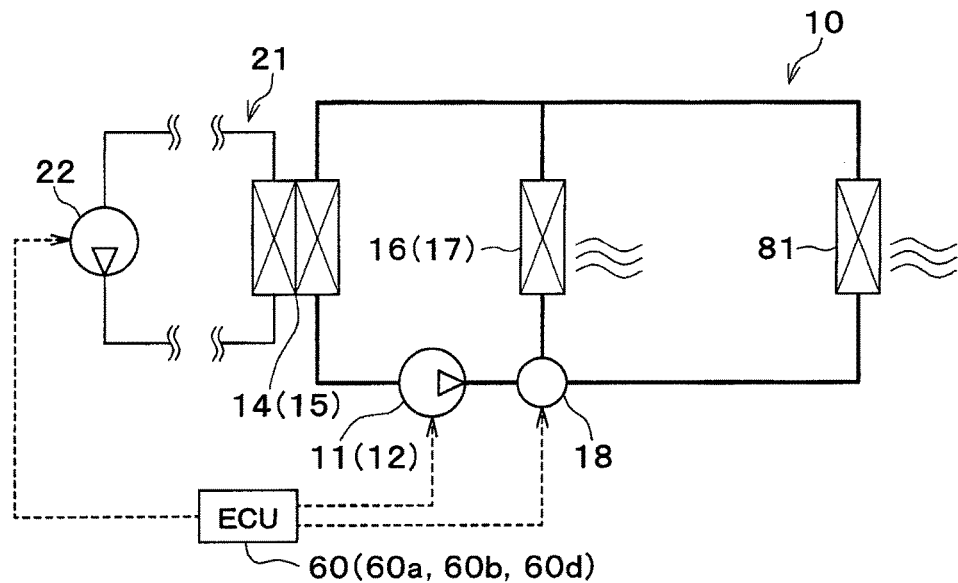
FIG. 38 is a diagram schematically illustrating a configuration of a vehicle thermal management system according to an eleventh embodiment.

FIG. 38 illustrates a simplified configuration of the vehicle thermal management system 10 in case that the heat transfer device 81 is connected to the cooler core 16. Numbers in parentheses shown in FIG. 38 denote reference numbers corresponding to a configuration that the heat transfer device 81 is connected to the heater core 17.

The heat transfer device 81 is a coolant-air heat exchanger that regulates the temperature of the ventilation air blown into the vehicle interior by exchanging heat between, for example, the coolant and the ventilation air. More specifically, the heat transfer device 81 may be a rear seat heat exchanger that exchanges heat (sensible heat) between the coolant and the ventilation air blown to an occupant in a rear seat.

The heat transfer device 81 may be a heat exchanger for regulating battery temperature, as well, which regulates the temperature of the battery installed in the vehicle by exchanging sensible heat between the battery and the coolant.

First, a method of controlling the temperatures of the heat transfer device 81 and the cooler core 16 is described when the heat transfer device 81 is connected to the cooler core 16 and the coolant/cooler 14.

The controller 60 makes a cooler core blowout temperature TC approach a cooler core blowout target temperature TCO, and makes a temperature TC2 of the heat transfer device 81 approach a heat transfer device target temperature TCO2. When the heat transfer device 81 is a coolant-air heat exchanger, the temperature TC2 of the heat transfer device 81 is the temperature of the blown air that is heat-exchanged in the heat transfer device 81.

When the target temperature TCO of the cooler core 16 is different from the target temperature TCO2 of the heat transfer device 81, a temperature of a lower target temperature side device is controlled by a flow rate of the refrigerant and a temperature of a higher target temperature side device is controlled by a flow rate of the coolant.

Accordingly, a temperature of the lower target temperature side device is preferentially controlled since the control of the flow rate of the refrigerant is highly responsive compared with the control of the flow rate of the coolant.

When the target temperature TCO of the cooler core 16 is the same as the target temperature TCO2 of the heat transfer device 81, a device controlled by the flow rate of the refrigerant and another device controlled by the flow rate of the coolant are determined based on a deviation $\Delta T1$ between the cooler core temperature TC and the cooler core target temperature TCO, a deviation $\Delta T2$ between the heat transfer device temperature TC2 and the heat transfer device target temperature TCO2, and absolute values of the deviations $\Delta T1$ and $\Delta T2$ (hereinafter, referred to as 'deviation amounts').

Each of the deviations $\Delta T1$ and $\Delta T2$ may be obtained from following equations F4 and F5:

$$\Delta T1 = TC - TCO \tag{F4}$$

$$\Delta T2 = TC2 - TCO2 \tag{F5}$$

In the present embodiment, one of the following control methods (1) through (16) is chosen according to the deviations $\Delta T1$ and $\Delta T2$, and the deviation amounts.

(1) If both the deviations $\Delta T1$ and $\Delta T2$ are positive values, the temperature of the device of a greater deviation amount is controlled by the flow rate of the refrigerant, and the flow rates of the coolant in the two devices are regulated to be greater than or equal to a certain value.

(2) If the deviation $\Delta T1$ is a positive value but the deviation $\Delta T2$ is a negative value, the temperature of the device of deviation $\Delta T1$ side is controlled by the flow rate of the refrigerant, and the temperature of the device of deviation $\Delta T2$ side is controlled by the flow rate of the coolant.

(3) If the deviation $\Delta T1$ is a negative value but the deviation $\Delta T2$ is a positive value, the temperature of the device of deviation $\Delta T2$ side is controlled by the flow rate of the refrigerant, and the temperature of the device of deviation $\Delta T1$ side is controlled by the flow rate of the coolant.

(4) If both the deviations $\Delta T1$ and $\Delta T2$ are negative values, the temperature of the device of a greater deviation amount is controlled by the flow rate of the refrigerant, and the temperature of the device of a smaller deviation amount is controlled by the flow rate of the coolant.

(5) If the deviation $\Delta T1$ is a positive value and the deviation $\Delta T2$ crosses from a positive value to a negative value, the temperature of the device of deviation $\Delta T1$ side is controlled by the flow rate of the refrigerant, and the flow rate of the device of deviation $\Delta T2$ side begins to be throttled.

(6) If the deviation $\Delta T1$ is a positive value and the deviation $\Delta T2$ crosses from a negative value to a positive value, the temperature of the device of a greater deviation amount is controlled by the flow rate of the refrigerant, and the temperature of the device of a smaller deviation amount is controlled by the flow rate of the coolant.

(7) If the deviation $\Delta T1$ crosses from a positive value to a negative value and the deviation $\Delta T2$ is a positive value, the temperature of the device of deviation $\Delta T2$ side is controlled by the flow rate of the refrigerant, and the temperature of the device of deviation $\Delta T1$ side begins to be throttled.

(8) If both the deviations $\Delta T1$ and $\Delta T2$ cross from positive values to negative values, the temperature of the device of a greater deviation amount is controlled by the flow rate of the refrigerant, and the temperature of the device of a smaller deviation amount is controlled by the flow rate of the coolant.

(9) If the deviation $\Delta T1$ crosses from a positive value to a negative value and the deviation $\Delta T2$ crosses from a negative value to a positive value, the temperature of the device of deviation $\Delta T2$ side is controlled by the flow rate of the refrigerant and the temperature of the device of the deviation $\Delta T1$ side is controlled by the flow rate of the coolant when the flow rate of the coolant in the device of deviation $\Delta T2$ side is greater than or equal to a certain amount, but the temperature of the device of deviation $\Delta T1$ side is controlled by the flow rate of the refrigerant and the temperature of the device of deviation $\Delta T2$ side is controlled by the flow rate of the coolant when the flow rate of the coolant in the device of deviation $\Delta T2$ side is less than the certain amount.

(10) If the deviation $\Delta T1$ crosses from a positive value to a negative value and the deviation $\Delta T2$ is a negative value, the temperature of the device of the greater deviation amount is controlled by the flow rate of the refrigerant and the temperature of the device of the smaller deviation amount is controlled by the flow rate of the coolant when the flow rate of the coolant in the device of deviation $\Delta T2$ side is greater than or equal to a certain amount, but the temperature of the device of deviation $\Delta T1$ side is controlled by the flow rate of the refrigerant and the temperature of the device of deviation $\Delta T2$ side is controlled by the flow rate of the coolant when the flow rate of the coolant in the device of deviation $\Delta T2$ side is less than the certain amount.

(11) If the deviation $\Delta T1$ crosses from a positive value to a negative value and the deviation $\Delta T2$ is a positive value, the temperature of the device of the greater deviation amount is controlled by the flow rate of the refrigerant and the flow rates of the coolant in the two devices are regulated to be greater than or equal to a certain value the temperature of the device of the smaller deviation amount is controlled by the flow rate of the coolant when the flow rate of the coolant in the device of deviation $\Delta T1$ side is greater than or equal to a certain amount, but the temperature of the device of deviation $\Delta T2$ side is controlled by the flow rate of the refrigerant and the temperature of the device of deviation $\Delta T1$ side is controlled by the flow rate of the coolant when the flow rate of the coolant in the device of deviation $\Delta T1$ side is less than the certain amount.

(12) If the deviation $\Delta T1$ crosses from a negative value to a positive value and the deviation $\Delta T2$ crosses from a positive value to a negative value, the temperature of the device of deviation $\Delta T1$ side is controlled by the flow rate of the refrigerant and the temperature of the device of deviation $\Delta T2$ side is controlled by the flow rate of the coolant when the flow rate of the coolant in the device of deviation $\Delta T1$ side is greater than or equal to a certain amount, but the temperature of the device of deviation $\Delta T2$ side is controlled by the flow rate of the refrigerant and the temperature of the device of deviation $\Delta T1$ side is controlled by the flow rate of the coolant when the flow rate of the coolant in the device of deviation $\Delta T1$ side is less than the certain amount.

(13) If both the deviations $\Delta T1$ and $\Delta T2$ cross from negative values to positive values, the temperature of the device of a greater deviation amount is controlled by the flow rate of the refrigerant, and the temperature of the device of a smaller deviation amount is controlled by the flow rate of the coolant.

(14) If the deviation $\Delta T1$ crosses from a negative value to a positive value and the deviation $\Delta T2$ is a negative value, the temperature of the device of deviation $\Delta T1$ side is controlled by the flow rate of the refrigerant and the temperature of the device of deviation $\Delta T2$ side is controlled by the flow rate of the coolant when the flow rate of the coolant in the device of deviation $\Delta T1$ side is greater than or equal to a certain amount, but the device of deviation $\Delta T2$ side is controlled by the flow rate of the refrigerant and the temperature of the device of deviation $\Delta T1$ side is controlled by the flow rate of the coolant when the flow rate of the coolant in the device of deviation $\Delta T1$ side is less than the certain amount.

(15) If the deviation $\Delta T1$ is a negative value and the deviation $\Delta T2$ crosses from a positive value to a negative value, the temperature of the device of the greater deviation amount is controlled by the flow rate of the refrigerant and the temperature of the device of the smaller deviation amount is controlled by the flow rate of the coolant when the flow rate of the coolant in the device of deviation $\Delta T1$ side is greater than or equal to a certain amount, but the temperature of the device of deviation $\Delta T2$ side is controlled by the flow rate of the refrigerant and the temperature of the device of deviation $\Delta T1$ side is controlled by the flow rate of the coolant when the flow rate of the coolant in the device of deviation $\Delta T1$ side is less than the certain amount.

(16) If the deviation $\Delta T1$ is a negative value and the deviation $\Delta T2$ crosses from a negative value to a positive value, the temperature of the device of deviation $\Delta T2$ side is controlled by the flow rate of the refrigerant and the temperature of the device of deviation $\Delta T1$ side is controlled by the flow rate of the coolant when the flow rate of the coolant in the device of deviation $\Delta T2$ side is greater than or equal to a certain amount, but the temperature of the device of deviation $\Delta T1$ side is controlled by the flow rate of the refrigerant and the temperature of the device of deviation $\Delta T2$ side is controlled by the flow rate of the coolant when the flow rate of the coolant in the device of deviation $\Delta T2$ side is less than the certain amount.

When the target temperature TCO of the cooler core 16 is the same as the target temperature TCO2 of the heat transfer device 81, the temperature of one device determined arbitrarily or set previously from the cooler core 16 and the heat transfer device 81 may be controlled by the flow rate of the refrigerant while the temperature of the other device is controlled by the flow rate of the coolant.

When the target temperature TCO of the cooler core 16 is the same as the target temperature TCO2 of the heat transfer device 81, the temperature of one device of higher thermal load may be controlled by the flow rate of the refrigerant while the temperature of the other device of lower thermal load is controlled by the flow rate of the coolant.

Next, described are methods of controlling temperatures of the heat transfer device 81 and the heater core 17 when the heat transfer device 81 is connected to the heater core 17 and the coolant/heater 15.

The controller 60 makes a heater core blowout temperature TH approach a heater core blowout target temperature THO, and makes a temperature TH2 of the heat transfer device 81 approach a heat transfer device target temperature THO2. When the heat transfer device 81 is a coolant-air heat exchanger, the temperature TH2 of the heat transfer device 81 is the temperature of the blown air that is heat-exchanged in the heat transfer device 81.

When the target temperature THO of the heater core 17 is different from the target temperature THO2 of the heat transfer device 81, a temperature of a higher target temperature side device is controlled by a flow rate of the refrigerant and a temperature of a lower target temperature side device is controlled by a flow rate of the coolant.

Accordingly, a temperature of the higher target temperature side device is preferentially controlled since the control of the flow rate of the refrigerant is highly responsive compared with the control of the flow rate of the coolant.

When the target temperature THO of the heater core 17 is the same as the target temperature THO2 of the heat transfer device 81, a device controlled by the flow rate of the refrigerant and another device controlled by the flow rate of the coolant are determined based on a deviation $\Delta T1$ between the heater core temperature TH and the heater core target temperature THO, a deviation $\Delta T2$ between the heat transfer device temperature TH2 and the heat transfer device target temperature THO2, and absolute values of the deviations $\Delta T1$ and $\Delta T2$ (hereinafter, referred to as 'deviation amounts').

Each of the deviations $\Delta T1$ and $\Delta T2$ may be obtained from following equations F6 and F7:

$$\Delta T1 = THO - TH \tag{F6}$$

$$\Delta T2 = THO2 - TH2 \tag{F7}$$

In the present embodiment, one of the above control methods (1) through (16) is chosen according to the deviations $\Delta T1$ and $\Delta T2$, and the deviation amounts.

When the target temperature THO of the heater core 17 is the same as the target temperature THO2 of the heat transfer device 81, the temperature of one device determined arbitrarily or set previously from the heater core 17 and the heat transfer device 81 may be controlled by the flow rate of the refrigerant while the temperature of the other device is controlled by the flow rate of the coolant.

When the target temperature THO of the heater core 17 is the same as the target temperature THO2 of the heat transfer device 81, the temperature of one device of higher thermal load may be controlled by the flow rate of the refrigerant while the temperature of the other device of lower thermal load is controlled by the flow rate of the coolant.

Hereinafter, the cooler core 16 or the heater core 17 is referred to as a first coolant-air heat exchanger, and the heat transfer device 13 or 81 connected to the first coolant-air heat exchanger 16 or 17 is referred to as a first heat transfer device.

In the present embodiment, the controller 60 regulates the flow rate of the refrigerant such that a temperature associated with the temperature TC or TH of the ventilation air that is sensible-heat exchanged in the first coolant-air heat exchanger 16 or 17 approaches the first target temperature TCO or THO, and regulates the flow rate of the coolant such that a temperature associated with the temperature TC2 or TH2 of the first heat transfer device 13 or 81 approaches a second target temperature TCO2 or THO2.

As a result, both the temperatures of the first coolant-air heat exchanger 16 or 17 and the first heat transfer device 13 or 81 may be regulated properly even though the first coolant-air heat exchanger 16 or 17 is disposed in the same coolant circuit as the first heat transfer device 13 or 81.

For example, in case that the first coolant-air heat exchanger is the heater core 17 heating the ventilation air, when the first target temperature THO is higher than the second target temperature THO2, the controller 60 regulates the flow rate of the refrigerant such that the temperature associated with the temperature TH of the ventilation air heated in the heater core 17 approaches the first target temperature THO while regulating the flow rate of the coolant such that the temperature associated with the temperature TH2 of the first heat transfer device 13 or 81 approaches the second target temperature THO2.

Meanwhile, when the second target temperature THO2 is higher than the first target temperature THO, the controller 60 regulates the flow rate of the refrigerant such that the temperature associated with the temperature TH2 of the first heat transfer device 13 or 81 approaches the second target temperature THO2 while regulating the flow rate of the coolant such that the temperature associated with the temperature TH of the ventilation air heated in the heater core 17 approaches the first target temperature THO.

Thus, a device that requires higher temperature followability, of the heater core 17 and the first heat transfer device 13 or 81, may be controlled by the flow rate of the refrigerant.

For example, in case that the first coolant-air heat exchanger is the cooler core 16 cooling the ventilation air, when the first target temperature TCO is lower than the second target temperature TCO2, the controller 60 regulates the flow rate of the refrigerant such that the temperature associated with the temperature TC of the ventilation air cooled in the cooler core 16 approaches the first target temperature TCO while regulating the flow rate of the coolant such that the temperature associated with the temperature TC2 of the first heat transfer device 13 or 81 approaches the second target temperature TCO2.

Meanwhile, when the second target temperature TCO2 is lower than the first target temperature TCO, the controller 60 regulates the flow rate of the refrigerant such that the temperature associated with the temperature TC2 of the first heat transfer device 13 or 81 approaches the second target temperature TCO2 while regulating the flow rate of the coolant such that the temperature associated with the temperature TC of the ventilation air cooled in the coolant-air heat exchanger 16 approaches the first target temperature TCO.

Thus, a device that requires higher temperature followability, of the cooler core 16 and the first heat transfer device 13 or 81, may be controlled by the flow rate of the refrigerant.

For example, the controller 60 regulates the flow rate of the refrigerant such that the temperature associated with the temperature TC or TH of the ventilation air that is sensible-heat exchanged in the first coolant-air heat exchanger 16 or 17 approaches the first target temperature TCO or THO, and regulates the flow rate of the coolant such that the temperature associated with the temperature TC2 or TH2 of the first heat transfer device 13 or 81 approaches the second target temperature TCO2 or THO2.

Thus, the temperature of the first coolant-air heat exchanger 16 or 17 may be controlled preferentially than first heat transfer device 13 or 81.

For example, the controller 60 may switch the control mode between the first control mode and the second control mode according to a sign, i.e. positive and negative, of the first deviation $\Delta T1$ and positive and negative of the second deviation $\Delta T2$.

In the first control mode, the controller 60 regulates the flow rate of the refrigerant such that the temperature associated with the temperature TC or TH of the ventilation air that is sensible-heat exchanged in the first coolant-air heat exchanger 16 or 17 approaches the first target temperature TCO or THO, and regulates the flow rate of the coolant such that the temperature associated with the temperature TC2 or TH2 of the first heat transfer device 13 or 81 approaches the second target temperature TCO2 or THO2.

In the second control mode, the controller 60 regulates the flow rate of the refrigerant such that the temperature associated with the temperature TC2 or TH2 of the first heat transfer device 13 or 81 approaches the second target temperature TCO2 or THO2, and regulates the flow rate of the coolant such that the temperature TC or TH of the ventilation air that is sensible-heat exchanged in the first coolant-air heat exchanger 16 or 17 approaches the first target temperature TCO or THO.

When the ventilation air is cooled in the first coolant-air heat exchanger 16 or 17, the first deviation $\Delta T1$ is the deviation that the first target temperature TCO is subtracted from the temperature associated with the temperature TC of the ventilation air that is sensible-heat exchanged in the first coolant-air heat exchanger 16 or 17.

When the ventilation air is heated in the first coolant-air heat exchanger 16 or 17, the first deviation $\Delta T1$ is the deviation that the temperature associated with the temperature TH of the ventilation air that is sensible-heat exchanged in the first coolant-air heat exchanger 16 or 17 is subtracted from the first target temperature THO.

When the coolant receives heat in the first heat transfer device 13 or 81, the second deviation $\Delta T2$ is the deviation that the second target temperature TCO2 is subtracted from the temperature associated with the temperature TC2 of the first heat transfer device 13 or 81.

When the coolant releases heat in the first heat transfer device 13 or 81, the second deviation $\Delta T2$ is the deviation that the temperature associated with the temperature TC2 of the first heat transfer device 13 or 81 is subtracted from the second target temperature TCO2.

Thus, a device that requires higher temperature followability, of the first coolant-air heat exchanger 16 or 17 and the first heat transfer device 13 or 81, may be controlled by the flow rate of the refrigerant.

Specifically, if the sign of the first deviation $\Delta T1$ is the same as the second deviation $\Delta T2$, if both the first and second deviations $\Delta T1$ and $\Delta T2$ changed from positive values to negative values, if both the first and second deviations $\Delta T1$ and $\Delta T2$ changed from negative values to positive values, or if the first deviation $\Delta T1$ is a positive value and the second deviation $\Delta T2$ changed from a negative value to a positive value, the first control mode is carried out when an absolute value of the first deviation $\Delta T1$ is greater than an absolute value of the second deviation $\Delta T2$ while the second control mode is carried out when the absolute value of the second deviation $\Delta T2$ is greater than the absolute value of the first deviation $\Delta T1$.

If the first deviation $\Delta T1$ is a positive value and the second deviation $\Delta T2$ is a negative value, the first control mode is carried out. If the first deviation $\Delta T1$ is a negative value and the second deviation $\Delta T2$ is a positive value, the second control mode is carried out.

If the first deviation $\Delta T1$ is a positive value and the second deviation $\Delta T2$ changed from a positive value to a negative value, the first control mode is carried out. If the first deviation $\Delta T1$ changed from a positive value to a negative value and the second deviation $\Delta T2$ is a positive value, the second control mode is carried out.

If the first deviation $\Delta T1$ changed from a negative value to a positive value, and the second deviation $\Delta T2$ is a positive value, and the flow rate of the coolant in the first coolant-air heat exchanger 16 or 17 is greater than or equal to a first certain amount, the first control mode is carried out when the absolute value of the first deviation $\Delta T1$ is greater than the absolute value of the second deviation $\Delta T2$ but the second control mode is carried out when the absolute value of the second deviation $\Delta T2$ is greater than the absolute value of the first deviation $\Delta T1$.

If the first deviation $\Delta T1$ changed from a negative value to a positive value, the second deviation $\Delta T2$ is a positive value, and the flow rate of the coolant in the first coolant-air heat exchanger 16 or 17 is less than the first certain amount, the second control mode is carried out.

If the first deviation $\Delta T1$ changed from a negative value to a positive value and the second deviation $\Delta T2$ changed from a positive value to a negative value, or if the first deviation $\Delta T1$ changed from a negative value to a positive value and the second deviation $\Delta T2$ is a negative value, the first control mode is carried out when the flow rate of the coolant in the first coolant-air heat exchanger 16 or 17 is greater than or equal to a second certain amount.

If the first deviation $\Delta T1$ changed from a negative value to a positive value and the second deviation $\Delta T2$ changed from a positive value to a negative value, or if the first deviation $\Delta T1$ changed from a negative value to a positive value and the second deviation $\Delta T2$ is a negative value, the second control mode is carried out when the flow rate of the coolant in the first coolant-air heat exchanger 16 or 17 is less than the second certain amount.

If the first deviation $\Delta T1$ changed from a positive value to a negative value and the second deviation $\Delta T2$ changed from a negative value to a positive value, or if the first deviation $\Delta T1$ is a negative value and the second deviation $\Delta T2$ changed from a negative value to a positive value, the second control mode is carried out when the flow rate of the coolant in the first heat transfer device 13 or 81 is greater than or equal to a third certain amount.

If the first deviation $\Delta T1$ changed from a positive value to a negative value and the second deviation $\Delta T2$ changed from a negative value to a positive value, or if the first deviation $\Delta T1$ is a negative value and the second deviation $\Delta T2$ changed from a negative value to a positive value, the first control mode is carried out when the flow rate of the coolant in the first heat transfer device 13 or 81 is less than the third certain amount.

If the first deviation $\Delta T1$ is a negative value, the second deviation $\Delta T2$ changed from a positive value to a negative value, and the flow rate of the coolant in the first coolant-air heat exchanger 16 or 17 is greater than or equal to a fourth certain amount, the first control mode is carried out when the absolute value of the first deviation $\Delta T1$ is greater than the absolute value of the second deviation $\Delta T2$ but the second control mode is carried out when the absolute value of the second deviation $\Delta T2$ is greater than the absolute value of the first deviation $\Delta T1$.

If the first deviation $\Delta T1$ is a negative value, the second deviation $\Delta T2$ changed from a positive value to a negative value, and the flow rate of the coolant in the first coolant-air heat exchanger 16 or 17 is less than the fourth certain amount, the second control mode is carried out.

If the first deviation $\Delta T1$ changed from a positive value to a negative value, the second deviation $\Delta T2$ is a negative value, and the flow rate of the coolant in the first heat transfer device 13 or 81 is greater than or equal to a fifth certain amount, the first control mode is carried out when the absolute value of the first deviation $\Delta T1$ is greater than the absolute value of the second deviation $\Delta T2$ but the second control mode is carried out when the absolute value of the second deviation $\Delta T2$ is greater than the absolute value of the first deviation $\Delta T1$.

If the first deviation $\Delta T1$ changed from a positive value to a negative value, the second deviation $\Delta T2$ is a negative value, and the flow rate of the coolant in the first heat transfer device 13 or 81 is less than the fifth certain amount, the first control mode is carried out.

For example, the controller 60 switches the control mode between the first and second control modes according to an amount of heat exchange or heat exchange demand between the coolant and the ventilation air in the first coolant-air heat exchanger 16 or 17 and a heat transfer amount or heat transfer demand with the coolant in the first heat transfer device 13 or 81.

If the amount of heat exchange or heat exchange demand between the coolant and the ventilation air in the first coolant-air heat exchanger 16 or 17 is higher or presumed to be higher than the amount of heat transfer or heat transfer demand with the coolant in the first heat transfer device 13 or 81, the controller 60 regulates the flow rate of the refrigerant such that the temperature associated with the temperature TC or TH of the ventilation air that is sensible-heat exchanged in the first coolant-air heat exchanger 16 or 17 approaches the first target temperature TCO or THO, and regulates the flow rate of the coolant such that the temperature associated with the temperature TC2 or TH2 of the first heat transfer device 13 or 81 approaches the second target temperature TCO2 or THO2.

If the amount of heat transfer or heat transfer demand with the coolant in the first heat transfer device 13 or 81 is higher or presumed to be higher than the amount of heat exchange or heat exchange demand between the coolant and the ventilation air in the first coolant-air heat exchanger 16 or 17, the controller 60 regulates the flow rate of the refrigerant such that the temperature associated with the temperature TC2 or TH2 of the first heat transfer device 13 or 81 approaches the second target temperature TCO2 or THO2, and regulates the flow rate of the coolant such that the temperature TH of the ventilation air that is sensible-heat exchanged in the first coolant-air heat exchanger 16 or 17 approaches the first target temperature THO.

Thus, the temperature of one device, of the first coolant-air heat exchanger 16 or 17 and the first heat transfer device 13 or 81, of which thermal load is higher or presumed to be higher may be controlled by the flow rate of the refrigerant to enhance temperature followability.

[Other Embodiments]

The above embodiments may be combined appropriately. The above embodiments may be modified in various manners, for example, as follows.

(1) Although the volume of the outside air flowing through the radiator 13 is regulated by controlling the operation of the exterior blower 20 in the above embodiments, the volume of the outside air flowing through the radiator 13 may be regulated by controlling the operation of a radiator shutter (not shown). The radiator shutter is an outside air passage opening-closing part that opens and closes the passage of the outside air.

(2) Although the coolant is used for heat medium for regulating the temperatures of the devices of which temperatures are to be regulated, other types of media such as oil may be used for heat medium as well.

Nanofluid may be used for the heat medium as well. The nanofluid is a fluid containing nanoparticles of which diameters are nanometer-sized. Mixing of nanoparticles into heat medium brings about following advantageous effects in addition to an advantageous effect of lowering a freezing point like an antifreeze containing ethylene glycol.

In other words, the mixing of the nanoparticles into heat medium causes advantageous effects of: increasing thermal conductivity in a specific temperature range, increasing heat capacity of heat medium, anti-corrosion of metal pipes and preventing deterioration of rubber piping, and enhancing fluidity of heat medium in extremely low temperatures.

Such advantageous effects may change depending on composition, shape, and mixing ratio of the nanoparticles, and additives.

Owing to the increased thermal conductivity, the use of the nanofluid enables to obtain the same cooling efficiency with less amount of heat medium compared with the antifreeze containing the ethylene glycol.

Due to the increased heat capacity, the use of the nanofluid may increase cold heat storage amount, i.e. cold sensitive heat storage amount, of heat medium itself.

The increase of the cold heat storage amount allows power saving in the vehicle thermal management system since the stored cold heat enables cooling of devices or regulation of heating temperature for some time even when the compressor 22 is not being operated.

Preferably, an aspect ratio of the nanoparticles is 50 or higher. Such aspect ratio allows a sufficient thermal conductivity. The aspect ratio is a shape index representing the ratio of a length to a width of the nanoparticle.

The nanoparticles may contain at least one of: gold (Au), silver (Ag), copper (Cu) and carbon (C). Specifically, Au nanoparticles, Ag nanowires, carbon nanotube (CNT), graphene, graphite core shell nanoparticles (particles having a structure such as the carbon nanotubes surrounding the atoms above), CNT containing the Au nanoparticles, and so on may be used for the constituent atoms of the nanoparticles.

(3) Although the HFC refrigerant is used for the refrigerant in the refrigeration cycle 21 according to the embodiments discussed above, the type of the refrigerant is not limited thereto and natural refrigerants such as carbon dioxide or hydrocarbon-based refrigerants may be used for the refrigerant as well.

Although the refrigeration cycle 21 according to the embodiments discussed above constitutes the subcritical refrigeration cycle in which the high-pressure side refrigerant pressure does not exceed the critical pressure of the refrigerant, a supercritical refrigeration cycle in which the high-pressure side refrigerant pressure exceeds the critical pressure of the refrigerant may be constituted as well.

(4) Although examples that the heat management system 10 and the vehicle air conditioner are applied to the hybrid vehicle were described regarding the embodiments discussed above, the heat management system 10 and the vehicle air conditioner may also be applied to an electric vehicle or the like that obtains a driving force from a electric driving motor without an engine.

Figure 39:
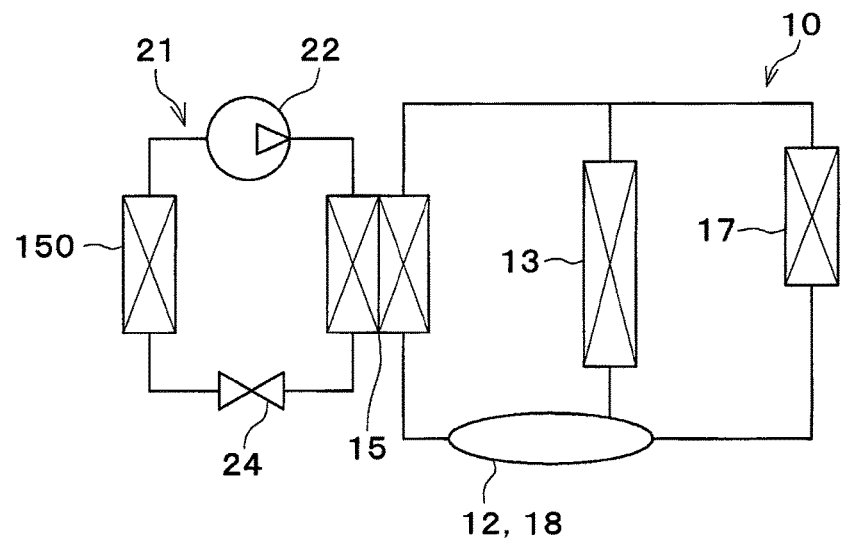
FIG. 39 is a diagram illustrating an overall configuration of a vehicle thermal management system according to another embodiment.

(5) As shown in FIG. 39, an evaporator 151 may be provided instead of the coolant/cooler 14 and the cooler core 16 of the embodiments discussed above. The evaporator 151 is an air-cooling heat exchanger that exchanges heat between the low-pressure side refrigerant and the ventilation air blown into the interior space to cool the ventilation air blown into the vehicle interior.

What is claimed is:

1. An air conditioner for a vehicle, comprising:
a pump configured to take in and discharge a heat medium;
a heat medium/air heat exchanger that regulates a temperature of ventilation air blown into a vehicle interior by conducting sensible-heat exchange between the ventilation air and the heat medium circulated by the pump;
a heat transfer device having a passage through which the heat medium flows and configured to conduct heat transfer with the heat medium circulated by the pump;
a compressor disposed to take in and discharge a refrigerant in a refrigeration cycle;
a heat medium/refrigerant heat exchanger configured to perform heat exchange between the heat medium circulated by the pump and the refrigerant in the refrigeration cycle to regulate a temperature of the heat medium circulated by the pump; and a controller configured to control a heat transfer amount with the heat medium in the heat transfer device or heat exchange capability of the heat medium/air heat exchanger such that a temperature of the ventilation air regulated by the heat medium/air heat exchanger approaches a first target temperature, wherein the heat medium/refrigerant heat exchanger is disposed to heat the heat medium by performing heat exchange between the refrigerant discharged by the compressor and the heat medium, the heat medium/air heat exchanger is disposed to heat the ventilation air by conducting sensible-heat exchange between the heat medium heated in the heat medium/refrigerant heat exchanger and the ventilation air, and the controller is configured to regulate a flow rate of the heat medium in at least one of the heat medium/air heat exchanger and the heat transfer device, and regulate one of a flow rate of the refrigerant or the flow rate of the heat mediums such that the temperature of the ventilation air approaches the first target temperature, and regulate the other one of the flow rate of the refrigerant or the flow rate of the heat medium such that a temperature of the heat transfer device approaches a second target temperature, when the first target temperature is higher than the second target temperature, the controller regulates the flow rate of the refrigerant such that the temperature of the ventilation air heated in the heat medium/air heat exchanger approaches the first target temperature, and the controller regulates the flow rate of the heat medium such that the temperature of the heat transfer device approaches the second target temperature, and when the second target temperature is higher than the first target temperature, the controller regulates the flow rate of the refrigerant such that the temperature of the heat transfer device approaches the second target temperature, and the controller regulates the flow rate of the heat medium such that the temperature of the ventilation air heated in the heat medium/air heat exchanger approaches the first target temperature.

2. The air conditioner for a vehicle of claim 1, wherein the controller regulates the amount of the heat transfer with the heat medium in the heat transfer device by regulating the flow rate of the heat medium in the heat transfer device.

3. The air conditioner for a vehicle of claim 1, wherein the heat transfer device is a heat generating device, and the controller regulates the amount of the heat transfer with the heat medium in the heat transfer device by regulating a heat generating amount of the heat generating device.

4. The air conditioner for a vehicle of claim 1, wherein the controller regulates the heat exchange capability of the heat medium/air heat exchanger by regulating the flow rate of the heat medium in the heat medium/air heat exchanger.

5. The air conditioner for a vehicle of claim 1, wherein the controller regulates the heat exchange capability of the heat medium/air heat exchanger by regulating an air volume of the ventilation air in the heat medium/air heat exchanger.

6. The air conditioner for a vehicle of claim 1, wherein the controller regulates the flow rate of the refrigerant such that the temperature of the ventilation air approaches the first target temperature, and the controller regulates the flow rate of the heat medium such that the temperature of the heat transfer device approaches the second target temperature.

7. The air conditioner for a vehicle of claim 1, further comprising:

an air-cooling heat exchanger disposed to cool the ventilation air;

an air-heating heat exchanger disposed to heat the ventilation air, wherein the heat medium/air heat exchanger is the air-cooling heat exchanger or the air-heating heat exchanger; and an air volume ratio adjuster configured to adjust a volume ratio of a first portion of the ventilation air flowing in the air-heating heat exchanger to a second portion of the ventilation air by passing the air-heating heat exchanger among the ventilation air cooled in the air-cooling heat exchanger such that the temperature of the ventilation air regulated by at least one of the air-cooling heat exchanger and the air-heating heat exchanger and blown into the vehicle interior approaches a third target temperature.

8. The air conditioner for a vehicle of claim 1, further comprising:

an air-cooling heat exchanger disposed to cool the ventilation air;

an air-heating heat exchanger disposed to heat the ventilation air, wherein the heat medium/air heat exchanger is the air-cooling heat exchanger or the air-heating heat exchanger; and an air volume controller configured to control an air volume of the ventilation air such that the temperature of the ventilation air regulated by at least one of the air-cooling heat exchanger and the air-heating heat exchanger and blown into the vehicle interior approaches a third target temperature.

9. The air conditioner for a vehicle of claim 1, wherein the heat transfer device is a rear seat heat exchanger disposed to conduct sensible-heat exchange between the heat medium and the ventilation air to be blown into a rear-seat occupant.

10. The air conditioner for a vehicle of claim 1, wherein the heat transfer device is a battery temperature regulation heat exchanger disposed to regulate a temperature of a battery equipped in the vehicle by conducting sensible-heat exchange between the battery and the heat medium.

11. An air conditioner for a vehicle, comprising:

a pump configured to take in and discharge a heat medium;

a heat medium/air heat exchanger that regulates a temperature of ventilation air blown into a vehicle interior by conducting sensible-heat exchange between the ventilation air and the heat medium circulated by the pump;

a heat transfer device having a passage through which the heat medium flows and configured to conduct heat transfer with the heat medium circulated by the pump;

a compressor disposed to take in and discharge a refrigerant in a refrigeration cycle;

a heat medium/refrigerant heat exchanger configured to perform heat exchange between the heat medium circulated by the pump and the refrigerant in the refrigeration cycle to regulate a temperature of the heat medium circulated by the pump; and a controller configured to control a heat transfer amount with the heat medium in the heat transfer device or heat exchange capability of the heat medium/air heat exchanger such that a temperature of the ventilation air regulated by the heat medium/air heat exchanger approaches a first target temperature, wherein the heat medium/refrigerant heat exchanger is disposed to cool the heat medium by performing heat exchange between the refrigerant decompressed and expanded in a decompression device and the heat medium, the heat medium/air heat exchanger is disposed to cool the ventilation air by conducting sensible-heat exchange between the heat medium cooled in the heat medium/refrigerant heat exchanger and the ventilation air, and the controller is configured to regulate a flow rate of the heat medium in at least one of the heat medium/air heat exchanger and the heat transfer device, and regulate one of a flow rate of the refrigerant or the flow rate of the heat medium such that the temperature of the ventilation air approaches the first target temperature, and regulate the other one of the flow rate of the refrigerant or the flow rate of the heat medium such that a temperature of the heat transfer device approaches a second target temperature, when the first target temperature is lower than the second target temperature, the controller regulates the flow rate of the refrigerant such that the temperature of the ventilation air cooled in the heat medium/air heat exchanger approaches the first target temperature, and the controller regulates the flow rate of the heat medium such that the temperature of the heat transfer device approaches the second target temperature, and when the second target temperature is lower than the first target temperature, the controller regulates the flow rate of the refrigerant such that the temperature of the heat transfer device approaches the second target temperature, and the controller regulates the flow rate of the heat medium such that the temperature of the ventilation air cooled in the heat medium/air heat exchanger approaches the first target temperature.

12. An air conditioner for a vehicle, comprising:

a pump configured to take in and discharge a heat medium;

a heat medium/air heat exchanger that regulates a temperature of ventilation air blown into a vehicle interior by conducting sensible-heat exchange between the ventilation air and the heat medium circulated by the pump;

a heat transfer device having a passage through which the heat medium flows and configured to conduct heat transfer with the heat medium circulated by the pump;

a compressor disposed to take in and discharge a refrigerant in a refrigeration cycle;

a heat medium/refrigerant heat exchanger configured to perform heat exchange between the heat medium circulated by the pump and the refrigerant in the refrigeration cycle to regulate a temperature of the heat medium circulated by the pump; and a controller configured to control a heat transfer amount with the heat medium in the heat transfer device or heat exchange capability of the heat medium/air heat exchanger such that a temperature of the ventilation air regulated by the heat medium/air heat exchanger approaches a first target temperature, wherein the heat medium/refrigerant heat exchanger is disposed to cool or heat the heat medium by conducting heat exchange between the heat medium circulated by the pump and the refrigerant, and the controller is configured to regulate a flow rate of the heat medium in at least one of the heat medium/air heat exchanger and the heat transfer device, and regulate one of a flow rate of the refrigerant or the flow rate of the heat medium such that the temperature of the ventilation air approaches the first target temperature, and regulate the other one of the flow rate of the refrigerant or the flow rate of the heat medium such that a temperature of the heat transfer device approaches a second target temperature, and further comprising:

a first control mode in which the controller regulates the flow rate of the refrigerant such that the temperature of the ventilation air approaches the first target temperature, and the controller regulates the flow rate of the heat medium such that the temperature of the heat transfer device approaches the second target temperature, and a second control mode in which the controller regulates the flow rate of the refrigerant such that the temperature of the heat transfer device approaches the second target temperature, and the controller regulates the flow rate of the heat medium such that the temperature of the ventilation air approaches the first target temperature, wherein the controller switches between the first and second control modes based on weather the first deviation is positive or negative and the second deviation is positive or negative, (i) when the first deviation denotes a difference that the first target temperature is subtracted from the temperature of the ventilation air in a case where the ventilation air is being cooled in the heat medium/air, heat exchanger, or a difference that the temperature of the ventilation air is subtracted from the first target temperature in a case where the ventilation air is being heated in the heat medium/air heat exchanger; and (ii) when the second deviation denotes a difference that the second target temperature is subtracted from the temperature of the heat transfer device in a case where the heat medium is receiving heat in the heat transfer device, or a difference that the temperature of the heat transfer device is subtracted from the second target temperature in a case where the heat medium is releasing heat in the heat transfer device.

13. The air conditioner for a vehicle of claim 12, wherein in a case (i) where the first deviation and second deviation are either both negative or both positive, or (ii) where both the first and second deviations change from positive values to negative values, or (iii) where both the first and second deviations change from negative values to positive values, or (iv) where the first deviation is a positive value and the second deviation changes from a negative value to a positive value, the first control mode is carried out when an absolute value of the first deviation is greater than an absolute value of the second deviation, and the second control mode is carried out when an absolute value of the second deviation is greater than an absolute value of the first deviation.

14. The air conditioner for a vehicle of claim 12, wherein the first control mode is carried out when the first deviation is a positive value and the second deviation is a negative value, and the second control mode is carried out when the first deviation is a negative value and the second deviation is a positive value.

15. The air conditioner for a vehicle of claim 12, wherein
when the first deviation is a positive value and the second deviation changes from a positive value to a negative value, the first control mode is carried out, and
when the first deviation changes from a positive value to a negative value and the second deviation is a positive value, the second control mode is carried out.

16. The air conditioner for a vehicle of claim 12, wherein
in a case where (i) the first deviation changes from a negative value to a positive value, (ii) the second deviation is a positive value, and (iii) the flow rate of the heat medium in the heat medium/air heat exchanger is greater than or equal to a predetermined amount, the first control mode is carried out when the absolute value of the first deviation is greater than the absolute value of the second deviation, and the second control mode is carried out when the absolute value of the second deviation is greater than the absolute value of the first deviation, and
when the flow rate of the heat medium in the heat medium/air heat exchanger is less than the predetermined amount in a case where the first deviation changes from a negative value to a positive value and the second deviation is a positive value, the second control mode is carried out.

17. The air conditioner for a vehicle of claim 12, wherein
in a case where the first deviation changes from a negative value to a positive value and the second deviation changes from a positive value to a negative value, or in a case where the first deviation changes from a negative value to a positive value and the second deviation is a negative value, the first control mode is carried out when the flow rate of the heat medium in the heat medium/air heat exchanger is greater than or equal to a predetermined amount, and
in a case where the first deviation changes from a negative value to a positive value and the second deviation changes from a positive value to a negative value, or in a case where the first deviation changed from a negative value to a positive value and the second deviation is a negative value, the second control mode is carried out when the flow rate of the heat medium in the heat medium/air heat exchanger is less than the predetermined amount.

18. The air conditioner for a vehicle of claim 12, wherein
in a case where the first deviation changes from a positive value to a negative value and the second deviation changes from a negative value to a positive value, or in a case where the first deviation is a negative value and the second deviation changes from a negative value to a positive value, the second control mode is carried out when the flow rate of the heat medium in the heat transfer device is greater than or equal to a predetermined amount, and
in a case where the first deviation changes from a positive value to a negative value and the second deviation changes from a negative value to a positive value, or in a case where the first deviation is a negative value and the second deviation changes from a negative value to a positive value, the first control mode is carried out when the flow rate of the heat medium in the heat transfer device is less than the predetermined amount.

19. The air conditioner for a vehicle of claim 12, wherein
in a case where the first deviation is a negative value, the second deviation changes from a positive value to a negative value, and the flow rate of the heat medium in the heat medium/air heat exchanger is greater than or equal to a predetermined amount, the first control mode is carried out when an absolute value of the first deviation is greater than the absolute value of the second deviation, and the second control mode is carried out when the absolute value of the second deviation is greater than the absolute value of the first deviation, and
in a case where the first deviation is a negative value, the second deviation changed from a positive value to a negative value, and the flow rate of the heat medium in the heat medium/air heat exchanger is less than the predetermined amount, the second control mode is carried out.

20. The air conditioner for a vehicle of claim 12, wherein
in a case where the first deviation changes from a positive value to a negative value, the second deviation is a negative value, and the flow rate of the heat medium in the heat transfer device is greater than or equal to a predetermined amount, the first control mode is carried out when the absolute value of the first deviation is greater than the absolute value of the second deviation, and the second control mode is carried out when the absolute value of the second deviation is greater than the absolute value of the first deviation, and
in a case where the first deviation changes from a positive value to a negative value, the second deviation is a negative value, and the flow rate of the heat medium in the heat transfer device is less than the predetermined amount, the first control mode is carried out.

21. An air conditioner for a vehicle, comprising:
a pump configured to take in and discharge a heat medium;
a heat medium/air heat exchanger that regulates a temperature of ventilation air blown into a vehicle interior by conducting sensible-heat exchange between the ventilation air and the heat medium circulated by the pump;
a heat transfer device having a passage through which the heat medium flows and configured to conduct heat transfer with the heat medium circulated by the pump;
a compressor disposed to take in and discharge a refrigerant in a refrigeration cycle;
a heat medium/refrigerant heat exchanger configured to perform heat exchange between the heat medium circulated by the pump and the refrigerant in the refrigeration cycle to regulate a temperature of the heat medium circulated by the pump; and
a controller configured to control a heat transfer amount with the heat medium in the heat transfer device or heat exchange capability of the heat medium/air heat exchanger such that a temperature of the ventilation air regulated by the heat medium/air heat exchanger approaches a first target temperature, wherein
the heat medium/refrigerant heat exchanger is disposed to cool or heat the heat medium by conducting heat exchange between the heat medium circulated by the pump and the refrigerant, and
the controller is configured to
regulate a flow rate of the heat medium in at least one of the heat medium/air heat exchanger and the heat transfer device, and
regulate one of a flow rate of the refrigerant or the flow rate of the heat medium such that the temperature of the ventilation air approaches the first target temperature, and regulate the other one of the flow rate of the refrigerant or the flow rate of the heat medium such that a temperature of the heat transfer device approaches a second target temperature, in a case where an amount of heat exchange or a heat exchange demand between the heat medium and the ventilation air in the heat medium/air heat exchanger is higher than the heat transfer amount or a heat transfer demand with the heat medium in the heat transfer device, the controller regulates the flow rate of the refrigerant such that the temperature of the ventilation air approaches the first target temperature, and the controller regulates the flow rate of the heat medium such that the temperature of the heat transfer device approaches the second target temperature, and in a case where the heat transfer amount or the heat transfer demand with the heat medium in the heat transfer device is higher or presumed to be higher than the amount of heat exchange or the heat exchange demand between the heat medium and the ventilation air in the heat medium/air heat exchanger, the controller regulates the flow rate of the refrigerant such that the temperature of the heat transfer device approaches the second target temperature, and the controller regulates the flow rate of the heat medium such that the temperature of the ventilation air approaches the first target temperature.

* * * * *